(12) United States Patent
Nakao

(10) Patent No.: US 10,673,263 B2
(45) Date of Patent: Jun. 2, 2020

(54) CONTROL DEVICE, CONTROL SYSTEM, ELECTRIC STORAGE DEVICE AND COMPUTER-READABLE MEDIUM

(71) Applicant: NExT-e Solutions Inc., Tokyo (JP)

(72) Inventor: Fumiaki Nakao, Shizuoka (JP)

(73) Assignee: NExT-e Solutions Inc., Tokyo (JP)

( * ) Notice: Subject to any disclaimer, the term of this patent is extended or adjusted under 35 U.S.C. 154(b) by 373 days.

(21) Appl. No.: 15/841,285

(22) Filed: Dec. 13, 2017

(65) Prior Publication Data

US 2019/0148963 A1 May 16, 2019

(30) Foreign Application Priority Data

Nov. 13, 2017 (JP) .................................. 2017-218381

(51) Int. Cl.
*H02J 7/00* (2006.01)
*B60L 50/60* (2019.01)

(52) U.S. Cl.
CPC ............ *H02J 7/0068* (2013.01); *B60L 50/66* (2019.02); *H02J 7/008* (2013.01); *H02J 7/0014* (2013.01); *H02J 7/0026* (2013.01); *H02J 7/0031* (2013.01); *H02J 7/00304* (2020.01)

(58) Field of Classification Search
CPC ...... H02J 7/0068; H02J 7/0026; H02J 7/0014; H02J 7/008; H02J 7/0031; H02J 7/00304; B60L 50/66
USPC .......................................................... 320/134
See application file for complete search history.

(56) References Cited

U.S. PATENT DOCUMENTS

| 5,115,193 | A | * | 5/1992 | Bean | G01D 3/0365 324/207.12 |
| 6,118,250 | A | * | 9/2000 | Hutchison, IV | H02J 7/0024 320/110 |
| 2010/0231178 | A1 | * | 9/2010 | Handa | H02J 2207/20 320/163 |
| 2011/0089898 | A1 | * | 4/2011 | Lee | H02J 7/0016 320/116 |
| 2012/0249074 | A1 | * | 10/2012 | Tsuchiya | G01R 31/3835 320/116 |
| 2014/0009092 | A1 | * | 1/2014 | Ma | B60L 58/15 318/139 |
| 2015/0002084 | A1 | * | 1/2015 | Nakao | H01M 10/44 320/107 |

(Continued)

FOREIGN PATENT DOCUMENTS

| JP | H11-98708 A | 4/1999 |
| WO | 2017/086348 A1 | 5/2017 |

*Primary Examiner* — M Baye Diao

(57) ABSTRACT

The control device controls an adjusting unit that adjusts current flowing between an electric storage unit of an electric storage device configured such that the electric storage device can be connected in parallel with a distinct power supply device, and a wire that electrically connects the electric storage device and the distinct power supply device. The control device includes a current detecting unit that detects (i) current flowing between the wire and the electric storage unit in the second direction or (ii) current flowing between the wire and the electric storage unit when the first current adjusting unit electrically disconnects the wire and the electric storage unit, and an operation control unit that controls operation of the first current adjusting unit based on (i) voltage or SOC of the electric storage unit and (ii) a detection result of the current detecting unit.

18 Claims, 17 Drawing Sheets

(56) References Cited

U.S. PATENT DOCUMENTS

2015/0283964 A1\* 10/2015 Janarthanam ........ B60R 16/033
307/9.1

\* cited by examiner

CONTROL DEVICE, CONTROL SYSTEM, ELECTRIC STORAGE DEVICE AND COMPUTER-READABLE MEDIUM

The contents of the following Japanese patent application are incorporated herein by reference:
NO. 2017-218381 filed on Nov. 13, 2017.

BACKGROUND

1. Technical Field

The present invention relates to a control device, a control system, an electric storage device and a computer-readable medium.

2. Related Art

In an electric storage system including a plurality of electric storage modules, the electric storage modules may be connected in parallel in some cases (for example, see Patent Document 1). Patent document 2 discloses an electric storage system that enables hot-swapping electric storage modules.

PATENT DOCUMENTS

Patent Document 1: Japanese Patent Application Publication No. H11-98708
Patent Document 2: International Publication WO 2017/086349

If the electric storage system has a hot-swap function and a protection function for electric storage cells, charging and discharging of the electric storage system may become inefficient.

SUMMARY

A first aspect of the present invention provides a control device. The above described control device controls an adjusting unit, for example. In the above described control device, the adjusting unit, for example, adjusts current flowing between an electric storage unit of an electric storage device configured such that the electric storage device can be connected in parallel with a distinct power supply device, and a wire that electrically connects the electric storage device and the distinct power supply device. In the above described control device, the adjusting unit, for example, includes a first current adjusting unit (i) one end of which is electrically connected to the wire, (ii) other end of which is electrically connected to the electric storage unit, and (iii) that adjusts at least magnitude of current flowing between the wire and the electric storage unit in a first direction. In the above described control device, the adjusting unit, for example, includes a first bypass unit that is connected in parallel with the first current adjusting unit between the wire and the electric storage unit. In the above described control device, the first bypass unit allows passage of current flowing between the wire and the electric storage unit in a second direction. In the above described control device, the first bypass unit suppresses flow of current between the wire and the electric storage unit in the first direction via the first bypass unit. In the above described control device, the second direction is a direction opposite to the first direction. The above described control device, for example, includes a current detecting unit that detects (i) current flowing between the wire and the electric storage unit in the second direction or (ii) current flowing between the wire and the electric storage unit when the first current adjusting unit electrically disconnects the wire and the electric storage unit. The above described control device, for example, includes an operation control unit that controls operation of the first current adjusting unit based on (i) voltage or SOC of the electric storage unit and (ii) a detection result of the current detecting unit.

In the above described control device, the operation control unit may (a) control the first current adjusting unit such that the first current adjusting unit electrically connects the wire and the electric storage unit if the voltage or SOC of the electric storage unit satisfies a condition related to a battery characteristic of the electric storage unit. In the above described control device, the operation control unit may (b) control the first current adjusting unit such that magnitude of current flowing in the first direction becomes smaller than in a case in which the first current adjusting unit electrically disconnects the wire and the electric storage unit, or in which the voltage or SOC of the electric storage unit satisfies the condition related to the battery characteristic, if the voltage or SOC of the electric storage unit does not satisfy the condition related to the battery characteristic and if the current detecting unit has not detected the current. In the above described control device, the operation control unit may (c) control the first current adjusting unit such that the first current adjusting unit electrically connects the wire and the electric storage unit or such that magnitude of current flowing between the wire and the electric storage unit becomes larger if the current detecting unit has detected the current in a state that the first current adjusting unit electrically disconnects the wire and the electric storage unit, or in a state that the first current adjusting unit is controlled such that magnitude of current flowing in the first direction becomes smaller than in a case in which the voltage or SOC of the electric storage unit satisfies the condition related to the battery characteristic.

In the above described control device, the operation control unit may control operation of the first current adjusting unit based on (i) the voltage or SOC of the electric storage unit, (ii) the detection result of the current detecting unit, and (iii) terminal voltage of the adjusting unit. In the above described control device, the operation control unit may (a) control the first current adjusting unit such that the first current adjusting unit electrically connects the wire and the electric storage unit if the terminal voltage of the adjusting unit satisfies a condition related to hot-swap of the electric storage device. In the above described control device, the operation control unit may (b) control the first current adjusting unit such that the first current adjusting unit electrically disconnects the wire and the electric storage unit if the terminal voltage of the adjusting unit does not satisfy the condition related to the hot-swap and if the current detecting unit has not detected the current. In the above described control device, the operation control unit may (c) control the first current adjusting unit such that the first current adjusting unit electrically connects the wire and the electric storage unit at least until the terminal voltage of the adjusting unit satisfies the condition related to the hot-swap if the current detecting unit has detected the current in a state that the terminal voltage of the adjusting unit does not satisfy the condition related to the hot-swap.

In the above described control device, the adjusting unit may include a second current adjusting unit that is arranged between the wire and the electric storage unit and adjusts at least magnitude of current flowing between the wire and the electric storage unit in the second direction. In the above described control device, the adjusting unit may include a second bypass unit that is connected in parallel with the second current adjusting unit between the wire and the electric storage unit. In the above described control device, the second bypass unit may allow passage of current flowing between the wire and the electric storage unit in the first direction. In the above described control device, the second bypass unit may suppress flow of current between the wire and the electric storage unit in the second direction via the first bypass unit. In the above described control device, the second current adjusting unit may be connected in series with the first current adjusting unit and the first bypass unit between the wire and the electric storage unit. In the above described control device, the second bypass unit may be connected in series with the first current adjusting unit and the first bypass unit between the wire and the electric storage unit. In the above described control device, the current detecting unit may further detect (i) current flowing between the wire and the electric storage unit in the first direction or (ii) current flowing between the wire and the electric storage unit when the second current adjusting unit electrically disconnects the wire and the electric storage unit. In the above described control device, the operation control unit may control operation of at least one of the first current adjusting unit and the second current adjusting unit based on (i) the voltage or SOC of the electric storage unit and (ii) the detection result of the current detecting unit. In the above described control device, the operation control unit may have a first deciding unit that decides whether or not the voltage or SOC of the electric storage unit matches a first condition. In the above described control device, the operation control unit may have a second deciding unit that decides whether or not the voltage or SOC of the electric storage unit matches a second condition. In the above described control device, the operation control unit may have a third deciding unit that decides whether or not terminal voltage of the adjusting unit matches a third condition. In the above described control device, the operation control unit may have an output unit that outputs a signal for controlling operation of at least one of the first current adjusting unit and the second current adjusting unit based on (i) a decision result of at least one of the first deciding unit and the second deciding unit, (ii) a decision result of the third deciding unit, and (iii) the detection result of the current detecting unit. In the above described control device, the second condition may be a condition different from the first condition.

In the above described control device, the output unit may (a) output to the first current adjusting unit a signal for executing operation for electrically disconnecting the wire and the electric storage unit or operation for reducing current flowing between the wire and the electric storage unit in the first direction if the first deciding unit has decided that the voltage or SOC of the electric storage unit matches the first condition. In the above described control device, the output unit may (b) output to the second current adjusting unit a signal for executing operation for electrically disconnecting the wire and the electric storage unit or operation for reducing current flowing between the wire and the electric storage unit in the second direction if the second deciding unit has decided that the voltage or SOC of the electric storage unit matches the second condition. In the above described control device, the output unit may (c-1) output to the first current adjusting unit and the second current adjusting unit a signal for executing operation for electrically connecting the wire and the electric storage unit or operation for increasing current flowing between the wire and the electric storage unit, regardless of the decision result of the first deciding unit and the second deciding unit if the third deciding unit has decided that the terminal voltage of the adjusting unit matches the third condition.

In the above described control device, the output unit may (c-2-1) output to the first current adjusting unit a signal for executing operation for electrically connecting the wire and the electric storage unit or operation for increasing current flowing between the wire and the electric storage unit, regardless of the decision result of the first deciding unit if the current detecting unit has detected (i) current flowing between the wire and the electric storage unit in the second direction or (ii) current flowing between the wire and the electric storage unit when the first current adjusting unit electrically disconnects the wire and the electric storage unit, in a case in which the third deciding unit has decided that the terminal voltage of the adjusting unit does not match the third condition. In the above described control device, the output unit may (c-2-2) output to the second current adjusting unit a signal for executing operation for electrically connecting the wire and the electric storage unit or operation for increasing current flowing between the wire and the electric storage unit, regardless of the decision result of the second deciding unit if the current detecting unit has detected (i) current flowing between the wire and the electric storage unit in the first direction or (ii) current flowing between the wire and the electric storage unit when the second current adjusting unit electrically disconnects the wire and the electric storage unit, in a case in which the third deciding unit has decided that the terminal voltage of the adjusting unit does not match the third condition.

In the above described control device, the first condition may be (i) a condition indicating that the voltage or SOC of the electric storage unit is outside a predetermined first numerical range, (ii) a condition indicating that the voltage or SOC of the electric storage unit is higher than a predetermined first threshold, or (iii) a condition indicating that the voltage or SOC of the electric storage unit is equal to or higher than the first threshold. In the above described control device, the second condition may be (i) a condition indicating that the voltage or SOC of the electric storage unit is outside a predetermined second numerical range, (ii) a condition indicating that the voltage or SOC of the electric storage unit is lower than a predetermined second threshold, or (iii) a condition indicating that the voltage or SOC of the electric storage unit is equal to or lower than the second threshold. In the above described control device, the third condition may be (i) a condition indicating that the terminal voltage of the adjusting unit is within a predetermined third numerical range, (ii) a condition indicating that the terminal voltage of the adjusting unit is lower than a predetermined third threshold, or (iii) a condition indicating that the terminal voltage of the adjusting unit is equal to or lower than the third threshold.

In the above described control device, the third deciding unit may further decide whether or not the terminal voltage of the adjusting unit matches a fourth condition. In the above described control device, the output unit may output to at least one of the first current adjusting unit and the second current adjusting unit a signal for executing operation for electrically disconnecting the wire and the electric storage unit or operation for reducing current flowing between the wire and the electric storage unit if the third deciding unit has decided that the terminal voltage of the adjusting unit matches the fourth condition. In the above described control device, the fourth condition may be (i) a condition indicating that the terminal voltage of the adjusting unit is outside a predetermined fourth numerical range, (ii) a condition indicating that the terminal voltage of the adjusting unit is higher than a predetermined fourth threshold, or (iii) a condition indicating that the terminal voltage of the adjusting unit is equal to or higher than the fourth threshold.

In the above described control device, one end of the adjusting unit may be electrically connected to the wire. In the above described control device, other end of the adjusting unit may be electrically connected to one end of the electric storage unit. In the above described control device, the operation control unit may further control operation of a first switching element connected in parallel with the adjusting unit between the wire and the electric storage unit. In the above described control device, the operation control unit may control operation of the first switching element based on (i) the voltage or SOC of the electric storage unit, (ii) potential of the wire or voltage applied to the wire, and (iii) potential of the one end of the electric storage unit or voltage applied to the one end of the electric storage unit.

In the above described control device, one end of the adjusting unit may be electrically connected to the wire. In the above described control device, other end of the adjusting unit may be electrically connected to one end of the electric storage unit. In the above described control device, the operation control unit may further control operation of a second switching element, one end of which is electrically connected to the one end of the electric storage unit and other end of which is electrically connected to other end of the electric storage unit or reference potential. In the above described control device, the operation control unit may control operation of the second switching element based on (i) the voltage or SOC of the electric storage unit, (ii) potential of the wire or voltage applied to the wire, and (iii) potential of the one end of the electric storage unit or voltage applied to the one end of the electric storage unit.

In the above described control device, one end of the adjusting unit may be electrically connected to the wire. In the above described control device, other end of the adjusting unit may be electrically connected to one end of the electric storage unit.

In the above described control device, the operation control unit may further control operation of a bi-directional DC-DC converter connected in parallel with the adjusting unit between the wire and the electric storage unit, based on (i) the voltage or SOC of the electric storage unit, (ii) potential of the wire or voltage applied to the wire, and (iii) potential of the one end of the electric storage unit or voltage applied to the one end of the electric storage unit.

A second aspect of the present invention provides an electric storage device. The above described electric storage device, for example, includes the above described control device. The above described electric storage device, for example, includes an electric storage unit.

A third aspect of the present invention provides a control system. The above described control system, for example, includes the above described control device. The above described control system, for example, includes the adjusting unit.

A fourth aspect of the present invention provides an electric storage device. The above described electric storage device, for example, includes the above described control system. The above described electric storage device, for example, includes the electric storage unit.

A fifth aspect of the present invention provides a program. The above described program may cause a computer to function as the above described control device. The above described program may cause a computer to execute one or more procedures related to information processing in the above described control device. A non-transitory computer-readable medium for storing the above described program may also be provided.

The summary clause does not necessarily describe all necessary features of the embodiments of the present invention. The present invention may also be a sub-combination of the features described above.

DESCRIPTION OF EXEMPLARY EMBODIMENTS

Figure 1:
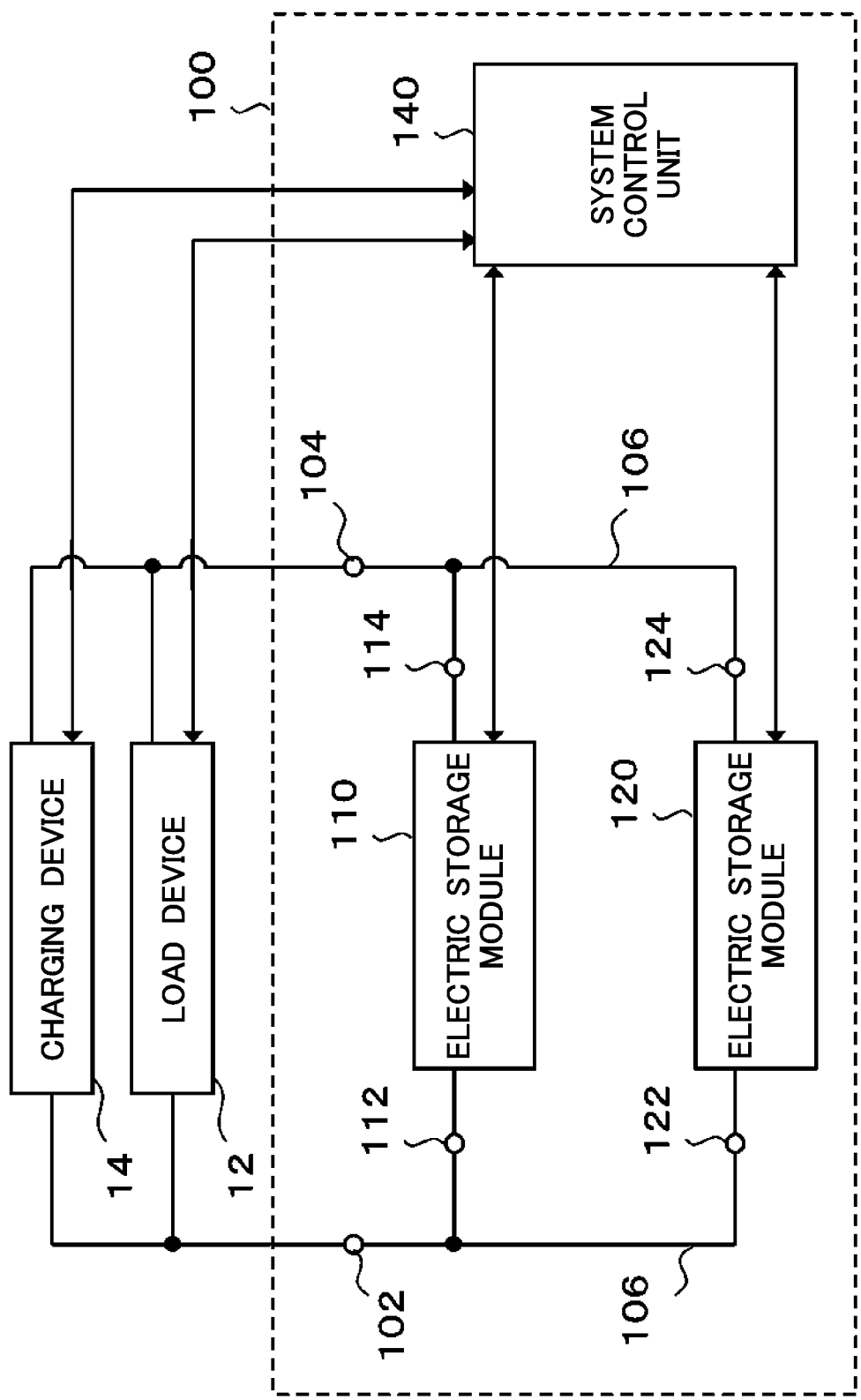
FIG. 1 schematically shows an example of a system configuration of an electric storage system 100.

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. Also, the embodiment(s) will be described with reference to the drawings. The identical or similar parts in the drawings may be given the same reference numerals to omit the description that could otherwise overlap.

FIG. 1 schematically shows an example of a system configuration of an electric storage system 100. In an embodiment, the electric storage system 100 is electrically connected to a load device 12 and supplies power to the load device 12 (in some cases, this is referred to as discharge from the electric storage system 100). In another embodiment, the electric storage system 100 is electrically connected to a charging device 14 to accumulate electrical energy (in some cases, this is referred to as charge of the electric storage system). The electric storage system 100 may be used, for example, in electric storage devices, electrical appliances, and transport equipment. Examples of the transport equipment include electric vehicles, hybrid cars, electric two-wheeled vehicles, railway vehicles, airplanes, elevators, and cranes.

In the present embodiment, the electric storage system 100 includes a connection terminal 102, a connection terminal 104, a wire 106 electrically connecting the connection terminal 102 and the connection terminal 104, an electric storage module 110 having a positive terminal 112 and a negative terminal 114, an electric storage module 120 having a positive terminal 122 and a negative terminal 124, and a system control unit 140. The electric storage module 110 and the electric storage module 120 may be examples of the electric storage devices configured such that they can be connected in parallel. For example, the electric storage module 110 may be an example of an electric storage device, and the electric storage module 120 may be an example of a distinct electric storage device. The electric storage device may be an example of a power supply device. The system control unit 140 may be an example of a battery characteristic acquiring unit. The system control unit 140 may be an example of an output unit.

The electric storage system 100 is electrically connected to the load device 12 or the charging device 14 via the connection terminal 102 and the connection terminal 104. In the present embodiment, the electric storage module 110 and the electric storage module 120 are connected in parallel by a wire 106. Also, each of the electric storage module 110 and the electric storage module 120 is held in a housing of the electric storage system 100 in an attachable and detachable manner. Each of the electric storage module 110 and the electric storage module 120 can thereby be replaced individually.

In the present embodiment, each of the electric storage module 110 and the electric storage module 120 can switch the connection relationship of its electric storage unit and the wire 106, based on a control signal from the system control unit 140 or the user operation. For example, each of the electric storage module 110 and the electric storage module 120 can electrically connect its electric storage unit to the wire 106 and electrically disconnect its electric storage unit from the wire 106 based on a control signal from the system control unit 140 or the user operation.

Each of the plurality of electric storage modules included in the electric storage system 100 can thereby be individually replaced without concerns about the damage or deterioration of the electric storage module even if the voltage of an electric storage module to be newly implemented in the electric storage system 100 and the voltage of the electric storage module already implemented in electric storage system 100 are different. The reasons for this are, for example, as described below.

Owing to improvements in the performance of lithium-ion batteries in recent years, the impedance of the lithium-ion battery has dropped to approximately 10 mΩ. Because of this, for example, even if the voltage differential between two electric storage modules is only 0.4 V, a large current as much as 40 A flows from the electric storage module having a higher voltage toward an electric storage module having a lower voltage when the two electric storage modules are connected in parallel. As a result, the electric storage module(s) deteriorate or are damaged. Note that the voltage of the electric storage module may be the voltage between the positive terminal and the negative terminal of the electric storage module (in some cases, the voltage is referred to as the terminal voltage of the electric storage module).

If one of the plurality of electric storage modules connected in parallel is individually replaced, in order to prevent the deterioration or damage of the electric storage modules associated with replacing the electric storage module, the voltage of the electric storage module to be newly implemented and the voltage of the already implemented electric storage module may be adjusted, prior to replacing the electric storage module, over some time until the voltage differential between the electric storage modules becomes very small. By making the voltage differential between the electric storage module to be newly implemented and the already implemented electric storage module very small, a large current can be prevented from flowing into each electric storage module when the electric storage module is replaced. As a result, the deterioration or damage of the electric storage modules can be suppressed. However, as the impedance of the lithium-ion battery decreases, the tolerance of the voltage differential between the electric storage module to be newly implemented and the already implemented electric storage module also decreases, so that it may take a great amount of time to adjust the voltage differential.

In contrast, according to the electric storage system 100 of the present embodiment, each of the electric storage module 110 and the electric storage module 120 can switch the connection relationship between its electric storage unit and the wire 106, based on a control signal from the system control unit 140 or the user operation. Then, the electric storage module 110 can be replaced, for example, in accordance with the following procedure.

First, a user detaches an old electric storage module 110 from the electric storage system 100. Then, the user performs operation for electrically disconnecting the electric storage unit of a new electric storage module 110 and the wire 106 before implementing the new electric storage module 110 in the electric storage system 100. For example, the user electrically disconnects the positive terminal 112 and the electric storage unit by manually operating a switching element arranged between the positive terminal 112 and the electric storage unit of the electric storage module 110.

Subsequently, the user implements the electric storage module 110 in the electric storage system 100, with the positive terminal 112 and the electric storage unit electrically disconnected. Because the positive terminal 112 and the electric storage unit are electrically disconnected at this time, the current does not flow between the electric storage module 110 and the electric storage module 120 even if the voltage differential between the electric storage module 110 and the electric storage module 120 is relatively large. Subsequently, when the voltage differential between the electric storage module 110 and the electric storage module 120 has become an appropriate value, the system control unit 140 executes the operation for electrically connecting the electric storage module 110 and the wire 106. Note that the detail of the system control unit 140 will be described below.

As described above, according to the electric storage system 100 of the present embodiment, if an electric storage module is replaced or implemented, it is not necessary to strictly adjust the voltage of the electric storage module to be newly implemented in the electric storage system 100 and the voltage of the electric storage module already implemented in the electric storage system 100. Because of this, the electric storage module can be easily and quickly replaced or implemented.

The system control unit 140 controls each unit of the electric storage system 100. In an embodiment, the system control unit 140 decides the state of the electric storage system 100. Examples of the states of the electric storage system 100 include the state of charge, the state of discharge, the state of standby, or the state of stop.

For example, the system control unit 140 receives information related to a charge and discharge event and decides the state of the electric storage system 100 based on the information related to the charge and discharge event. Examples of the information related to the charge and discharge event include: (i) a charge request or a discharge request from an external apparatus such as the load device 12 and the charging device 14; (ii) information indicating that an external apparatus has been connected; (iii) information indicating the type of an external apparatus; (iv) information indicating operation of an external apparatus; (v) information indicating the state of an external apparatus; (vi) information indicating a user instruction or operation with respect to an external apparatus; (vii) information indicating a user instruction or operation with respect to the electric storage system 100; and (viii) the combination of the above.

For example, the system control unit 140 judges that the electric storage system 100 is in the state of discharge if the system control unit 140 has detected the connection of the load device 12 or received a signal indicating the type of the load device 12. The system control unit 140 may also judge that the electric storage system 100 is in the state of discharge upon receiving from the load device 12 a signal indicating that the power will be used. Examples of the signals indicating that the power will be used include a signal indicating that a power supply of the load device 12 will be turned on, a signal indicating that the power supply of the load device 12 has been turned on, a signal indicating that the load device 12 will be shifted to an operation mode, and a signal indicating that the load device 12 has shifted to the operation mode.

The system control unit 140 may judge that the electric storage system 100 is in the state of charge if the system control unit 140 has detected the connection of the charging device 14 or received a signal indicating the type of the charging device 14. The system control unit 140 may also judge that the electric storage system 100 is in the state of charge upon receiving from the charging device 14 a signal indicating that charging will start. The system control unit 140 may also judge that the electric storage system 100 is in the state of charge upon receiving from the load device 12 a signal indicating that a regenerative current has occurred or that a regenerative current may occur.

In another embodiment, the system control unit 140 monitors the state of each of the electric storage module 110 and the electric storage module 120. The system control unit 140 may collect information related to the battery characteristic of the electric storage unit included in each of the electric storage module 110 and the electric storage module 120. The information related to the battery characteristic of the electric storage unit may be at least one selected from: the voltage value of the electric storage unit; the current value of the current flowing through the electric storage unit; the battery capacity of the electric storage unit; the temperature of the electric storage unit; the deterioration state of the electric storage unit; and SOC (State Of Charge) of the electric storage unit.

The information related to the battery characteristic (in some cases, referred to as the battery characteristic of an electric storage module) of the electric storage unit may include at least one of information related to the specification of the electric storage unit and information related to the deterioration state of the electric storage unit. The battery characteristic of the electric storage unit may be a battery characteristic of one of a plurality of single batteries constituting the electric storage module or may be the battery characteristic of combination of the plurality of single batteries. Examples of the information related to the specification of the electric storage unit include information related to: the type or model of the electric storage unit; the connection state of the electric storage unit; the type of charging method that can charge the electric storage unit; the type of charging method that cannot charge the electric storage unit; the rated battery capacity (in some cases, referred to as the rated capacity); the rated voltage; the rated current; the energy density; the maximum charge and discharge current; the charge characteristic; the charge temperature characteristic; the discharge characteristic; the discharge temperature characteristic; the self-discharge characteristic; the charge and discharge cycle characteristic; the equivalent series resistance in the initial state; the battery capacity in the initial state; the SOC [%] in the initial state; and the electric storage voltage [V]. Examples of the charging methods include the CCCV charging method, the CC charging method, and the trickle charging method.

Examples of the connection states of the electric storage unit include the types, the number, and the connection forms of the unit cells constituting the electric storage unit. Examples of the connection forms of the unit cells include the number of the unit cells connected in series and the number of the unit cells connected in parallel. The energy density may be a volume energy density [$Wh/m^3$] or weight energy density [Wh/kg].

Examples of the information related to the deterioration state of the electric storage unit include information of the electric storage unit taken at an optional time, which include information related to: (i) the battery capacity in the state of full charge; (ii) SOC in a predetermined temperature condition; (iii) SOH (State Of Health); (iv) equivalent series resistance (in some cases referred to as DCR or internal resistance); and (v) at least one of the use time, the number of charging, the charge amount, the discharge amount, the number of charge and discharge cycles, a thermal stress factor, and an overcurrent stress factor that have been integrated since the initial state or a predetermined timing. The information related to the battery characteristic of the electric storage unit may also associate information related to the deterioration state of the electric storage unit with information related to the time of day that the information was acquired, and store the associated information. The information related to the battery characteristic of the electric storage unit may store information related to the deterioration state of the electric storage unit at a plurality of time of day.

SOH [%] is expressed, for example, as the full charge capacity in the deterioration state (for example, the present full charge capacity) [Ah]÷ the initial full charge capacity [Ah]×100. Although the calculation methods or the estimation methods of SOH are not particularly limited, SOH of the electric storage unit is, for example, calculated or estimated based on at least one of the direct current resistance value and the open circuit voltage value of the electric storage unit. SOH may be a value in a predetermined temperature condition obtained from conversion using an optional conversion formula or the like.

The methods of determining the deterioration state of the electric storage unit are not particularly limited, and determination methods that are currently known or will be developed in the future may be used. In general, as the electric storage unit further deteriorates, the available battery capacity decreases while the equivalent series resistance increases. Because of this, for example, the deterioration state of a battery can be determined by comparing the present battery capacity, SOC, or the equivalent series resistance, with the battery capacity, SOC, or the equivalent series resistance of the initial state.

SOC [%] is expressed as, for example, the remaining capacity [Ah]÷ the full charge capacity [Ah]×100. Although the calculation methods or the estimation methods of SOC are not particularly limited, SOC is, for example, calculated or estimated based on at least one of: (i) a measurement result of the voltage of the electric storage unit; (ii) I-V characteristic data of the voltage of the electric storage unit; and (iii) an integrated value of the current value of the electric storage unit. SOC may be a value in a predetermined temperature condition obtained from conversion using an optional conversion formula or the like.

The information related to the battery characteristic of the electric storage unit may be information related to at least one of the charge time and the discharge time of the electric storage unit. The charge time and the discharge time of the electric storage unit may respectively be the charge time and the discharge time of the electric storage module including the electric storage unit. In general, as the electric storage unit further deteriorates, the available battery capacity decreases and at least one of the charge time and the discharge time shortens.

Information related to the charge time of the electric storage unit may include information indicating the ratio of the charge time of the electric storage unit to the charge time of the electric storage system 100. The information related to the charge time of the electric storage unit may include information indicating the charge time of the electric storage system 100 and information indicating the charge time of the electric storage unit. The above described charge time may be: (i) time during which current or voltage has been applied to the electric storage system 100 or the electric storage unit in a single charging operation; or (ii) the sum of time during which current or voltage has been applied to the electric storage system 100 or the electric storage unit in one or more charging operations in a predetermined period.

The information related to the charge time of the electric storage unit may include information indicating the ratio of the number of charging of the electric storage unit in a predetermined period to the number of charging of the electric storage system 100 in the period. The information related to the charge time of the electric storage unit may include information indicating the number of charging of the electric storage system 100 in a predetermined period and information indicating the number of charging of the electric storage unit in the period.

The information related to the discharge time of the electric storage unit may include information indicating the ratio of the discharge time of the electric storage unit to the discharge time of the electric storage system 100. The information related to the discharge time of the electric storage unit may include the discharge time of the electric storage system 100 and the discharge time of the electric storage unit. The above described discharge time may be: (i) time during which the electric storage system 100 or the electric storage unit has supplied current or voltage in a single discharging operation; or (ii) the sum of time during which the electric storage system 100 or the electric storage unit has supplied current or voltage in one or more discharging operations in a predetermined period.

The information related to the discharge time of the electric storage unit may include information indicating the ratio of the number of discharging of the electric storage unit in a predetermined period to the number of discharging of the electric storage system 100 in the period. The information related to the discharge time of the electric storage unit may include the number of discharging of the electric storage system 100 in a predetermined period and the number of discharging of the electric storage unit in the period.

The system control unit 140 may transmit to an external apparatus at least one of the information related to the battery characteristic of the electric storage unit included in the electric storage module 110 and the information related to the battery characteristic of the electric storage unit included in the electric storage module 120. The external apparatus can thereby use the information related to the battery characteristic of an electric storage unit. Examples of the external apparatuses include the load device 12 and the charging device 14. The external apparatus may be an output device that outputs information to a user. Examples of the output devices include a display device and a voice output device such as a microphone. The output device may be an example of the output unit.

The system control unit 140 may determine the performance of the electric storage module based on the information related to the battery characteristic of the electric storage module. The system control unit 140 may also output information indicating that the performance of the electric storage module is insufficient if the battery characteristic of the electric storage module does not satisfy a predetermined determination condition. The system control unit 140 may also decide the determination condition based on the application of the electric storage system 100.

As described above, in the present embodiment, the system control unit 140 collects at least one of the information related to the battery characteristic of the electric storage unit included in the electric storage module 110 and the information related to the battery characteristic of the electric storage unit included in the electric storage module 120 and transmits the collected information to the external apparatus. However, the electric storage system 100 is not limited to the present embodiment. In another embodiment, each of the electric storage module 110 and the electric storage module 120 may also collect the information related to the battery characteristic of the electric storage unit included in the electric storage module and transmit the collected information to the external apparatus.

In the present embodiment, the system control unit 140 decides the order in which the electric storage unit of each electric storage modules is to be electrically connected to the wire 106, based on the voltage of the electric storage unit of each electric storage module. For example, if the state of the electric storage system 100 is in the state of charge when the operation of the electric storage system 100 is started, the system control unit 140 electrically connects to the wire 106 the electric storage units of the electric storage modules in the order of lowest to highest voltage of the electric storage units of the electric storage modules. On the other hand, if the state of the electric storage system 100 is in the state of discharge when the operation of the electric storage system 100 is started, the system control unit 140 electrically connects to the wire 106 the electric storage units of the electric storage modules in the order of highest to lowest voltage of the electric storage units of the electric storage modules. Note that the system control unit 140 may also decide the order in which the electric storage unit of each electric storage module is to be electrically connected to the wire 106, based on the terminal voltage of each electric storage module.

In an embodiment, the system control unit 140 may transmit to each electric storage module a signal for connecting the electric storage unit to the wire 106 in accordance with the decided order. In another embodiment, the system control unit 140 may also select the electric storage module having the lowest voltage or the smallest SOC, or select the electric storage module having the highest voltage or the largest SOC, and transmit only to the selected electric storage module a signal for connecting the electric storage unit to the wire 106.

The system control unit 140 may be realized by hardware, realized by software, or realized by hardware and software. Also, the system control unit 140 may be realized by combination of hardware and software. In an embodiment, the system control unit 140 may be realized by an analog circuit, a digital circuit, or combination of an analog circuit and a digital circuit. In another embodiment, in a general information processing device provided with a data processing device and the like having a CPU, a ROM, a RAM, a communication interface, and the like, the system control unit 140 may be realized by executing programs for controlling the respective units of the system control unit 140.

The programs installed in a computer to cause the computer to function as part of the system control unit 140 according to the present embodiment may include modules that define operations of the respective units of the system control unit 140. These programs or modules cooperate with CPU and the like to cause the computer to function as the respective units of the system control unit 140.

By being read by the computer, the information processing described in these programs functions as specific means as a result of the software and the above-described various types of hardware resources cooperating with each other. By realizing computation or processing of information to meet the intended use of the computer in the present embodiment by these specific means, a specific device to meet the intended use can be constructed. The programs may be stored on a computer-readable medium or a storage device connected to a network.

Note that the reference to 'electrically connected' is not limited to direct connection between a particular component and another component. A third component may also be present between the particular component and another component. Also, the reference to 'electrically connected' is not limited to physical connection between a particular component and another component. For example, input winding and output winding in a transformer are not physically connected but are electrically connected. Furthermore, the reference to 'electrically connected' means not only that a particular component is actually and electrically connected to another component but also that the particular component is electrically connected to the other component when an electric storage cell and a balance correcting unit are electrically connected. Also, the reference to 'connected in series' indicates that a particular component and another component are electrically connected in series, and the reference to 'connected in parallel' indicates that a particular component and another component are electrically connected in parallel.

As described above, in the present embodiment, the electric storage system 100 includes the two electric storage modules connected in parallel. However, the electric storage system 100 is not limited to the present embodiment. In another embodiment, the electric storage system 100 may also have three or more electric storage modules connected in parallel.

As described above, in the present embodiment, a user performs operation for electrically disconnecting the electric storage unit of the new electric storage module 110 and the wire 106 before implementing the electric storage module 110 in the electric storage system 100. However, the methods of implementing or replacing the electric storage module 110 are not limited to the present embodiment. In another embodiment, a user, for example, operates an input unit (not shown in the drawing) of the electric storage system 100 and inputs an instruction to start replacing the electric storage module 110. Examples of the input units include a keyboard, a pointing device, a touch panel, a microphone, a voice recognition system, and a gesture input system.

The system control unit 140 may perform operation for electrically disconnecting the wire 106 and the electric storage unit of the electric storage module (the electric storage module 120 in the present embodiment) connected in parallel with the electric storage module 110 upon accepting an instruction to start replacing the electric storage module 110. At this time, the system control unit 140 may also perform operation for electrically disconnecting the electric storage unit of the electric storage module 110 and the wire 106. For example, the system control unit 140 transmits to the switching element a signal for turning off a switching element arranged between a positive terminal and the electric storage unit of each electric storage module.

The system control unit 140 acquires the voltage of the electric storage unit of each electric storage module upon detecting that the old electric storage module 110 has been detached and the new electric storage module 110 has been implemented. If the electric storage unit of the new electric storage module 110 and the wire 106 are electrically connected, the system control unit 140 operates the electric storage system 100 by using only the electric storage module 110 until the voltage differential between the electric storage module 110 and the electric storage module 120 becomes an appropriate value, for example. Then, when the voltage differential between the electric storage module 110 and the electric storage module 120 has become the appropriate value, the system control unit 140 executes operation for electrically connecting the electric storage module 120 and the wire 106.

On the other hand, if the electric storage unit of the new electric storage module 110 and the wire 106 are not electrically connected, the system control unit 140 decides the order in which the electric storage unit of each electric storage module is to be electrically connected to the wire 106, based on the voltage of the electric storage unit of each electric storage module. Subsequently, the system control unit 140 electrically connects the electric storage unit of each electric storage module to the wire 106 in accordance with the decided order. Note that, if the electric storage unit of the new electric storage module 110 and the wire 106 are electrically connected, the system control unit 140 may also first electrically disconnect the electric storage unit of the new electric storage module 110 and the wire 106. Subsequently, the system control unit 140 may also decide the order in which the electric storage unit of each electric storage module is to be electrically connected to the wire 106, based on the voltage of the electric storage unit of each electric storage module and then electrically connect the electric storage unit of each electric storage module to the wire 106 in accordance with the decided order.

Application Example of the Electric Storage System 100

As described above, according to the electric storage system 100 of the present embodiment, at least one of the electric storage module 110 and the electric storage module 120 that are connected in parallel with the load device 12 or the charging device 14 can be implemented or replaced at an optional timing without concerns about the voltage differential between the both electric storage modules. Here, the voltage differential between the electric storage module 110 and the electric storage module 120 may be caused not only by the difference with respect to the state of charge or the state of discharge of the both electric storage modules but also by the difference in the battery characteristics of the both electric storage modules. The battery characteristic of the electric storage module may be similar to the battery characteristic of the above described electric storage unit. The battery characteristic of the electric storage module may be at least one of the characteristics illustrated as the battery characteristics of the electric storage unit.

Because of this, according to the electric storage system 100 of the present embodiment, even if the battery characteristic of the electric storage module 110 and the battery characteristic of the electric storage module 120 are different, the electric storage module 110 and the electric storage module 120 can be connected in parallel with the load device 12 or the charging device 14, with the electric storage module 110 and the electric storage module 120 prevented from being deteriorated or damaged. Note that in the electric storage system 100 according to the present embodiment, the battery characteristic of the electric storage module 110 and the battery characteristic of the electric storage module 120 may be the same or different. If the electric storage module 110 and the electric storage module 120 include secondary batteries, the battery characteristic of the secondary battery constituting the electric storage unit of the electric storage module 110 and the battery characteristic of the secondary battery constituting the electric storage unit of the electric storage module 120 may be the same or different.

Also, a power supply system in which a plurality of power supply modules having the battery characteristics different from each other can be connected in parallel may also be constructed by a configuration similar to that of the electric storage system 100. Each power supply module can thereby be implemented or replaced at an optional timing, with deterioration or damage of each power supply module being suppressed. Employing the configuration similar to that of the electric storage system 100 is particularly useful to a system in which the power supply system is electrically connected to an external charging device or a load device by two terminals.

The power supply module may be an example of a power supply device that supplies power to another apparatus. The electric storage module 110 and the electric storage module 120 may be examples of the power supply modules. The electric storage system 100 may be an example of the power supply system in which a plurality of power supply devices are configured such that the power supply devices can be connected in parallel. The electric storage unit and the secondary battery may be examples of power supply units that serve as power supply sources for the power supply device.

The battery characteristic of the power supply device fluctuates due to factors such as: (i) the deterioration state of the power supply unit; (ii) the type of the power supply unit; and (iii) the state of balance between the capacity and SOC. According to an embodiment, a power supply system is provided in which a plurality of power supply devices having deterioration states different from each other can be connected in parallel. Although the detail of the above described power supply system will be described below, according to the embodiment, the power supply system can be constructed, for example, by using a secondhand power supply module (in some cases, referred to as used item, reused item, or the like).

According to another embodiment, a power supply system is provided in which different types of a plurality of power supply devices can be connected in parallel. This allows the power supply system to be constructed superior to a power supply system constructed by combining power supply devices of a single type, with respect to at least one of the life, the reliability, the charging performance, the discharging performance, the energy efficiency, the temperature characteristic, and the economy. The detail of the above described power supply system will be described below.

As described above, in the electric storage system 100 according to the present embodiment, the plurality of power supply modules constituting the electric storage system 100 are the electric storage module 110 and the electric storage module 120. However, the plurality of power supply modules constituting the electric storage system 100 are not limited to the present embodiment. In another embodiment, at least one of the plurality of power supply modules may include a primary battery or a fuel battery. In another embodiment, at least one of the plurality of power supply modules may include a primary battery or a fuel battery, and at least one of the plurality of power supply modules may include a secondary battery. The electric storage unit, the primary battery, and the fuel battery may be examples of the power supply units.

In these cases, by a configuration similar to that of the electric storage module 110 and that of the electric storage module 120, the power supply module including a primary battery or a fuel battery may switch the connection relationship between the primary battery or the fuel battery of the power supply module and the wire 106 based on a control signal from the system control unit 140 or the user operation. For example, the power supply module electrically connects the primary battery or the fuel battery of the power supply module and the wire 106 upon receiving from the system control unit 140 a signal indicating detection of the discharging operation. On the other hand, the power supply module disconnects the electrical connection relationship between the primary battery or the fuel battery of the power supply module and the wire 106 upon receiving from the system control unit 140 a signal indicating detection of the charging operation. The damage or deterioration of the primary battery or the fuel battery can thereby be prevented.

First Application Example of the Electric Storage System 100

In an embodiment, the electric storage system 100 includes a plurality of power supply devices. The plurality of power supply devices may include two power supply devices the power supply units of which have the deterioration states different from each other. The plurality of power supply devices may be connected in parallel with the load device 12 or the charging device 14. The electric storage system 100 may be electrically connected to the load device 12 or the charging device 14 by two terminals. At least one of the plurality of power supply devices may be held in the housing of the electric storage system 100 in an attachable and detachable manner. Each power supply device can thereby be individually replaced. The electric storage system 100 may include at least one electric storage module.

Examples of the power supply devices having different deterioration states include power supply devices having different use histories. For example, the electric storage system 100 has a new power supply device and a secondhand power supply device. The electric storage system 100 may also have a plurality of secondhand power supply devices having different use histories.

In recent years, there has been rapidly increasing demand for storage batteries to be used in electric storage devices and the like for applications that temporarily require a large current such as: (i) power source of electric vehicle, PHEV (Plug-in Hybrid Electric Vehicle), and the like; (ii) output stabilizing device for renewable energy; (iii) electric storage device for smart grid; (iv) electric storage device for storing power during the hours when the electricity charge is inexpensive; and (v) charging station. Also, the number of storage batteries having reached the renewal timing is increasing.

Here, the performance required for a storage battery differs depending on the application. Because of this, even if the storage battery used in a particular application deteriorates and no longer satisfies the performance required for the application, the storage battery can be reused by being diverted to another application in some cases. Also, as a result of the improvement in the performance of the storage battery, the life of the storage battery is longer than the life of a product incorporating the storage battery in some cases. Also in such cases, the storage battery is preferably reused and not discarded.

If the storage battery is reused, the deterioration state of each storage battery differs. Because of this, the battery characteristic of the storage battery has been conventionally tested before the storage battery is reused. Also, based on the test result, a power supply system has been constructed by combining storage batteries having the battery characteristics that satisfy a particular condition. However, in order to test the battery characteristic, the storage battery needs to be discharged after the storage battery has been full-charged, which requires efforts and time.

In contrast, according to the present embodiment, the electric storage system 100 in which a plurality of power supply devices having deterioration states different from each other are connected in parallel can easily be constructed. Also, each power supply device can individually be implemented or detached while the electric storage system 100 is operated. Furthermore, at least part of the test for the power supply device can be omitted before the power supply device to be reused is incorporated in the electric storage system 100.

According to the present embodiment, each power supply device can switch the connection relationship between its power supply unit and the wire 106 based on a control signal from the system control unit 140 or the user operation. The electric storage system 100 can thereby be safely operated even if the battery characteristic of the power supply device to be reused is not tested in advance. Also, the battery characteristic of the power supply device can be checked while the electric storage system 100 is operated. Then, if the battery characteristic of the power supply device is insufficient, the power supply device can easily be replaced.

Second Application Example of the Electric Storage System 100

In another embodiment, the electric storage system 100 includes a plurality of power supply devices. The plurality of power supply devices may include two power supply devices having different types of power supply units. The plurality of power supply devices may be connected in parallel with the load device 12 or the charging device 14. The electric storage system 100 may be electrically connected to the load device 12 or the charging device 14 by two terminals. At least one of the plurality of power supply devices may be held in the housing of the electric storage system 100 in an attachable and detachable manner. Each power supply device can thereby be individually replaced. The electric storage system 100 may include at least one electric storage module.

Examples of the types of the power supply units include a primary battery, a secondary battery, and a fuel battery. Examples of the types of the secondary batteries include a lithium battery, a lithium-ion battery, a lithium-sulfur battery, a sodium-sulfur battery, a lead-acid battery, a nickel-hydrogen battery, a nickel-cadmium battery, a redox flow battery, and a metal-air battery. The types of the lithium-ion batteries are not particularly limited. Examples of the types of the lithium-ion batteries include an iron phosphate based battery, a manganese based battery, a cobalt based battery, a nickel based battery, and a ternary based battery.

If the types of the power supply units included in the two power supply devices are different from each other, the difference between the rated voltages of the two power supply devices exceeds a predetermined value in some cases. Also, at least one of the difference between the charge characteristics and the difference between the discharge characteristics of the two power supply devices does not satisfy the predetermined condition in some cases. Conventionally, the power supply system has been constructed by finding power supply devices that match a particular condition and combining them. Because of this, there has been no concept of connecting two of such power supply devices in parallel.

In contrast, according to the present embodiment, the electric storage system 100 in which a plurality of power supply devices of different types are connected in parallel can easily be constructed. Also, each power supply device can individually be implemented or detached while the electric storage system 100 is operated. Furthermore, at the time of the charging operation of the electric storage system 100, the electrical connection relationship between the power supply unit and the load device 12 or the charging device 14 can be disconnected, depending on the type of the power supply unit included in the power supply device.

According to the present embodiment, each power supply device can switch the connection relationship between its power supply unit and the wire 106 based on a control signal from the system control unit 140 or the user operation. The electric storage system 100 can thereby be safely operated if the difference between the rated voltages of the two power supply devices included in the electric storage system 100 exceeds a predetermined value or even if at least one of the difference between the charge characteristics and the difference between the discharge characteristics of the two power supply devices does not satisfy the predetermined condition.

Also, according to the present embodiment, the power supply system can be constructed superior to a power supply system constructed by combining power supply devices of a single type with respect to at least one of the life, the reliability, the charging performance, the discharging performance, the energy efficiency, the temperature characteristic, and the economy. For example, the power supply system that has a high energy efficiency and also operates in a wide temperature range can be constructed by combining: (i) the power supply module including a lead-acid battery that operates in a relatively wide temperature range but has relatively low energy efficiency in charging and discharging;

and (ii) the power supply module including a lithium-ion battery that has a high energy efficiency in charging and discharging but has a problem in operating in low and high temperature regions.

Figure 2:
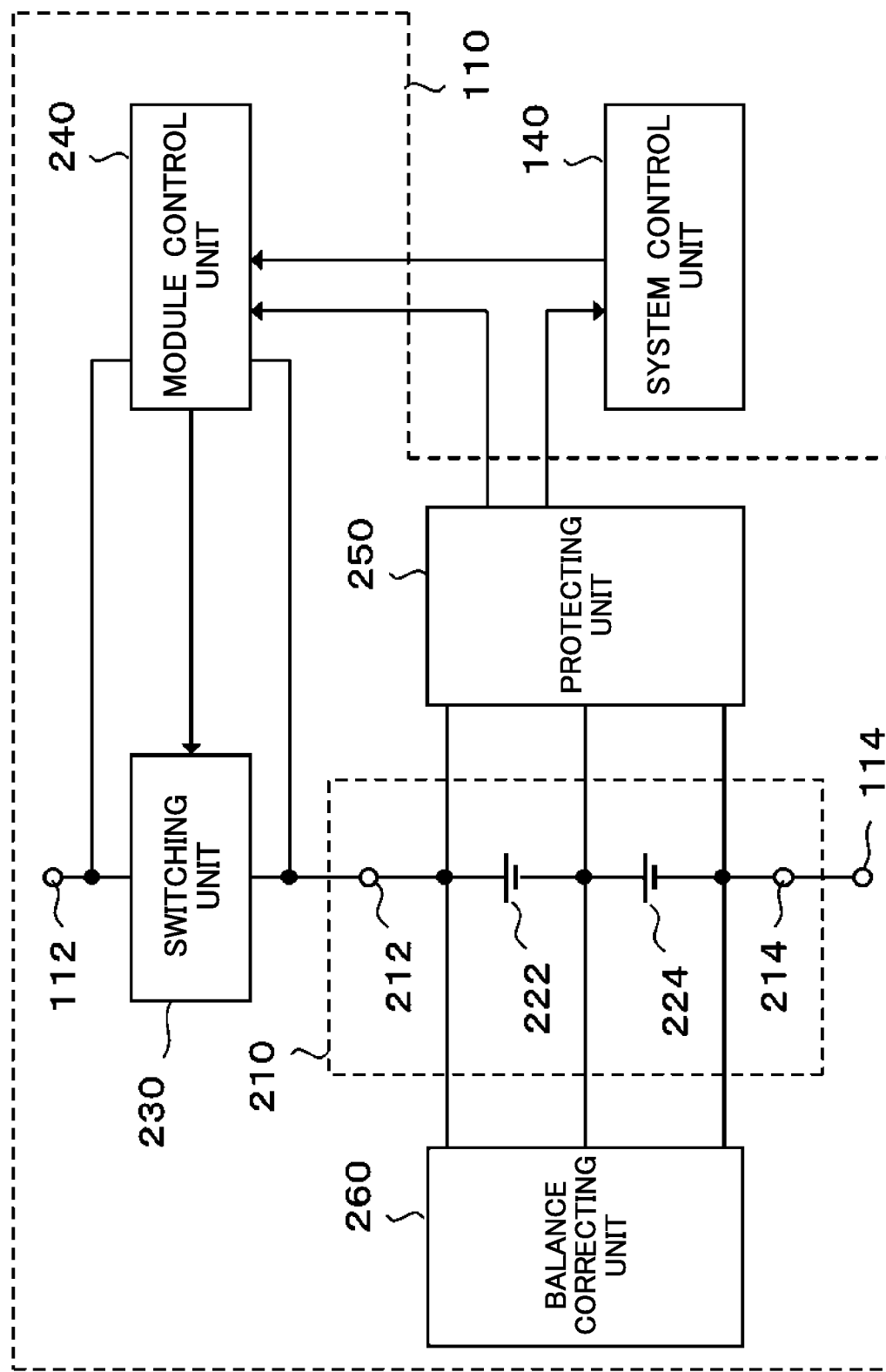
FIG. 2 schematically shows an example of a system configuration of an electric storage module 110.

FIG. 2 schematically shows an example of a system configuration of the electric storage module 110. In the present embodiment, the electric storage module 110 includes the electric storage unit 210 that has a positive terminal 212 and a negative terminal 214, a switching unit 230, a module control unit 240, a protecting unit 250, and a balance correcting unit 260. Also, in the present embodiment, the electric storage unit 210 includes an electric storage cell 222 and an electric storage cell 224. The switching unit 230 may be an example of the switching element. The module control unit 240 may be an example of a control unit. The module control unit 240 may be an example of a control device. The module control unit 240 may be an example of the battery characteristic acquiring unit. The module control unit 240 may be an example of the output unit.

The impedance of the electric storage unit 210 may be equal to or lower than 1 Ω or equal to or lower than 100 mΩ. The impedance of the electric storage unit 210 may be equal to or lower than 10 mΩ, equal to or lower than 1 mΩ, equal to or lower than 0.8 mΩ, or equal to or lower than 0.5 mΩ. The impedance of the electric storage unit 210 may be equal to or higher than 0.1 mΩ. The impedance of the electric storage unit 210 may be equal to or higher than 0.1 mΩ and equal to or lower than 1 Ω, may be equal to or higher than 0.1 mΩ and equal to or lower than 100 mΩ may be equal to or higher than 0.1 mΩ and equal to or lower than 10 mΩ, or may be equal to or higher than 0.1 mΩ and equal to or lower than 1 mΩ.

According to the electric storage system 100 of the present embodiment, for example, if one of the plurality of electric storage modules connected in parallel is replaced, the voltage of the electric storage module to be newly added to the electric storage system and the voltage of the remaining electric storage module may not match each other with high precision. Because of this, the electric storage module 110 can be easily and quickly replaced even if the impedance of the electric storage unit 210 is small.

In the present embodiment, the electric storage cell 222 and the electric storage cell 224 are connected in series. The electric storage cell 222 and the electric storage cell 224 may be secondary batteries or capacitors. At least one of the electric storage cell 222 and the electric storage cell 224 may be a lithium-ion battery. At least one of the electric storage cell 222 and the electric storage cell 224 may further include a plurality of electric storage cells connected in series, in parallel, or in a matrix inside the electric storage cell.

In the present embodiment, the positive terminal 212 of the electric storage unit 210 is electrically connected to the wire 106 via the positive terminal 112 and the switching unit 230 of the electric storage module 110. On the other hand, the negative terminal 214 of the electric storage unit 210 is electrically connected to the wire 106 via the negative terminal 114 of the electric storage module 110. However, the electric storage module 110 is not limited to the present embodiment. In another embodiment, the negative terminal 214 of the electric storage unit 210 is electrically connected to the wire 106 via the negative terminal 114 and the switching unit 230 of the electric storage module 110. On the other hand, the positive terminal 212 of the electric storage unit 210 is electrically connected to the wire 106 via the positive terminal 112 of the electric storage module 110.

The switching unit 230 is arranged between the wire 106 and the electric storage unit 210. In the present embodiment, the switching unit 230 switches the connection state of the wire 106 and the electric storage unit 210 based on a signal generated by the module control unit 240. The electric storage unit 210 can thereby be electrically connected to the wire 106 or electrically disconnected from the wire 106. If the electric storage module 110 is implemented in the electric storage system 100, the electric storage module 110 may be loaded into the electric storage system 100, with the electric storage unit 210 and the wire 106 electrically disconnected by the switching unit 230. The damage or deterioration of the electric storage module 110 can thereby be prevented.

The switching unit 230 may be realized by hardware, realized by software, or realized by combination of hardware and software. The switching unit 230 may be realized by an analog circuit, a digital circuit, or combination of an analog circuit and a digital circuit. The switching unit 230 may have one or more elements. The switching unit 230 may also have one or more switching elements. Each of the one or more switching elements may be arranged between the positive terminal 112 and the positive terminal 212 or between the negative terminal 114 and the negative terminal 214. Examples of the switching elements include a relay, a thyristor, and a transistor. The thyristor may be a bi-directional thyristor (in some cases, referred to as triac). The transistor may be a semiconductor transistor. The semiconductor transistor may be a bipolar transistor or a field effect transistor. The field effect transistor may be a MOSFET.

The module control unit 240 controls the current flowing between the electric storage unit 210 of the electric storage module 110 and the wire 106. In the present embodiment, if the terminal voltage of the switching unit 230 (the voltage between the positive terminal 112 and the positive terminal 212 in the present embodiment) satisfies a predetermined condition, the module control unit 240 controls the switching unit 230 such that the switching unit 230 electrically connects the electric storage unit 210 and the wire 106. The switching unit 230 may electrically connect the electric storage unit 210 and the wire 106 by electrically connecting the electric storage unit 210 and the positive terminal 112.

On the other hand, if the terminal voltage of the switching unit 230 does not satisfy the predetermined condition, the module control unit 240 controls the switching unit 230 such that the switching unit 230 electrically disconnects the electric storage unit 210 and the wire 106 or disconnects the electric storage unit 210 and the positive terminal 112. The switching unit 230 may electrically disconnect the electric storage unit 210 and the wire 106 by electrically disconnecting the electric storage unit 210 and the positive terminal 112.

The predetermined condition may be a condition that the absolute value of the terminal voltage of the switching unit 230 is within a predetermined range. The predetermined range may be equal to or lower than 3 V, equal to or lower than 1 V, equal to or lower than 0.1 V, equal to or lower than 10 mV, or equal to or lower than 1 mV. Also, the predetermined range may be equal to or higher than 0.5 mV or equal to or higher than 1 mV. The predetermined range may be equal to or higher than 0.5 mV or equal to or lower than 3 V. Also, the predetermined range may be equal to or higher than 1 mV and equal to or lower than 3 V, may be equal to or higher than 1 mV and equal to or lower than 1 V, may be equal to or higher than 1 mV and equal to or lower than 0.1 V, may be equal to or higher than 1 mV and equal to or lower than 10 mV, may be equal to or higher than 10 mV and equal to or lower than 1 V, may be equal to or higher than 10 mV and equal to or lower than 0.1 V, or may be equal to or higher than 0.1 V and equal to or lower than 1 V. Note that the terminal voltage of the switching unit 230 may be the voltage between the positive terminal 112 and the positive terminal 212 or the voltage between the wire 106 and the electric storage unit 210.

The predetermined range may be set based on the impedance of the electric storage unit 210. The predetermined range may be set based on the rated current or allowable current of the electric storage unit 210. The predetermined range may be set based on the impedance of the electric storage unit 210 and on the rated current or allowable current of the electric storage unit 210. The predetermined range may be set based on the rated current or allowable current of an element that is included in elements constituting the electric storage module 110 and has the lowest rated current or allowable current. The predetermined range may be set based on the impedance of the electric storage module 110 and on the rated current or allowable current of the element that is included in the elements constituting the electric storage module 110 and has the lowest rated current or allowable current.

If the electric storage module is replaced, the wire 106 and the electric storage unit 210 of the newly implemented electric storage module can thereby be maintained electrically disconnected until the voltage differential between the newly implemented electric storage module and the already implemented electric storage module falls within the predetermined range. Then, when the voltage differential between the newly implemented electric storage module and the already implemented electric storage module have fallen within the predetermined range by charging or discharging the already implemented electric storage module, the electric storage unit of the newly implemented electric storage module is electrically connected to the wire 106. In this way, according to the present embodiment, the newly implemented electric storage module and the other electric storage module can be automatically connected.

In the present embodiment, the module control unit 240 receives from the system control unit 140 a signal indicating that the terminal voltage of the electric storage module 110 is lower than the terminal voltage of the other electric storage module. If the module control unit 240 receives the above described signal when the electric storage system 100 shifts to the state of charge, the module control unit 240 controls the switching unit 230 such that the switching unit 230 electrically connects the electric storage unit 210 and the wire 106. The plurality of electric storage modules 110 connected in parallel can thereby be efficiently charged.

In the present embodiment, the module control unit 240 receives from the system control unit 140 a signal indicating that the terminal voltage of the electric storage module 110 is higher than the terminal voltage of the other electric storage module. If the module control unit 240 receives the above described signal when the electric storage system 100 shifts to the state of discharge, the module control unit 240 controls the switching unit 230 such that the switching unit 230 electrically connects the electric storage unit 210 and the wire 106. The plurality of electric storage modules 110 connected in parallel can thereby be efficiently discharged.

In the present embodiment, the module control unit 240 receives from the protecting unit 250 a signal indicating that the terminal voltage of the electric storage cell 222 or the terminal voltage of the electric storage cell 224 is not in the predetermined range. When the module control unit 240 has received the signal, the module control unit 240 controls the switching unit 230 such that the switching unit 230 electrically disconnects the electric storage unit 210 and the wire 106. The deterioration or damage of the electric storage unit 210 due to overcharge or over discharge can thereby be suppressed.

In the present embodiment, the module control unit 240 accepts user operation and receives an instruction for turning on or turning off the switching unit 230 from the user. When the module control unit 240 has received the instruction from the user, the module control unit 240 controls the switching unit 230 in accordance with the instruction.

In the present embodiment, the module control unit 240 may acquire information related to the battery characteristic of the electric storage unit 210. The module control unit 240 may output to an external apparatus the information related to the battery characteristic of the electric storage unit 210. The external apparatus can thereby use the information related to the battery characteristic of the electric storage unit 210. Examples of the external apparatuses include the load device 12 and the charging device 14. The external apparatus may be an output device that outputs information to a user.

The module control unit 240 may be realized by hardware or realized by software. Also, the module control unit 240 may be realized by combination of hardware and software. In an embodiment, the module control unit 240 may be realized by an analog circuit, a digital circuit, or combination of an analog circuit and a digital circuit. In another embodiment, in a general information processing device provided with a data processing device and the like having a CPU, a ROM, a RAM, an communication interface, and the like, the module control unit 240 may be realized by executing a program for controlling the module control unit 240.

The programs installed into a computer to cause the computer to function as part of the module control unit 240 according to the present embodiment may include modules that define operations of the respective units of the module control unit 240. These programs or modules cooperate with CPU or the like to cause the computer to function as the respective units of the module control unit 240.

By being read by the computer, the information processing described in these programs functions as specific means as a result of the software and the above-described various types of hardware resources cooperating with each other. By realizing computation or processing of information to meet the intended use of the computer in the present embodiment by these specific means, a specific device to meet the intended use can be constructed. The programs may be stored on a computer-readable medium or a storage device connected to a network. The computer-readable medium may be a non-transitory computer-readable medium.

The protecting unit 250 protects the electric storage unit 210. In the present embodiment, the protecting unit 250 protects the electric storage unit 210 from overcharge and over discharge. When the protecting unit 250 has detected that the terminal voltage of the electric storage cell 222 or the terminal voltage of the electric storage cell 224 is not in the predetermined range, the protecting unit 250 transmits to the module control unit 240 a signal indicating the content of the detection. The protecting unit 250 may transmit to the system control unit 140 the information related to the terminal voltage of the electric storage unit 210. The protecting unit 250 may be realized by hardware, realized by software, or realized by combination of hardware and software. The protecting unit 250 may be realized by an analog circuit, a digital circuit, or combination of an analog circuit and a digital circuit.

The balance correcting unit 260 equalizes the voltage of the plurality of electric storage cells. The operating principle of the balance correcting unit 260 is not particularly limited, and an optional balance correcting device can be used. If the electric storage unit 210 has three or more electric storage cells, the electric storage module 110 may have a plurality of balance correcting units 260. For example, if the electric storage unit 210 has n (n is an integer equal to or larger than 2) electric storage cells, the electric storage module 110 has n-1 balance correcting unit(s) 260.

The balance correcting unit 260 may be realized by hardware, realized by software, or realized by combination of hardware and software. The balance correcting unit 260 may be realized by an analog circuit, a digital circuit, or combination of an analog circuit and a digital circuit. In an embodiment, the balance correcting unit 260 is an active-type balance correcting device. The active-type balance correcting unit may be a balance correcting unit that transfers electric charges between two electric storage cells via an inductor as described in Japanese Patent Application Publication No. 2006-067742. Also, the active-type balance correcting unit may be a balance correcting unit that transfers electric charges via a capacitor as described in Japanese Patent Application Publication No. 2012-210109. In another embodiment, the balance correcting unit 260 may be a passive-type balance correcting device. The passive-type balance correcting device releases extra electric charges by using an external resistor, for example.

As described above, in the present embodiment, the electric storage unit 210 has the two electric storage cells connected in series. However, the electric storage unit 210 is not limited to the present embodiment. In another embodiment, the electric storage unit 210 may also have three or more electric storage cells connected in series. Also, the electric storage unit 210 may have a plurality of electric storage cells connected in parallel or a plurality of electric storage cells connected in a matrix.

Figure 3:
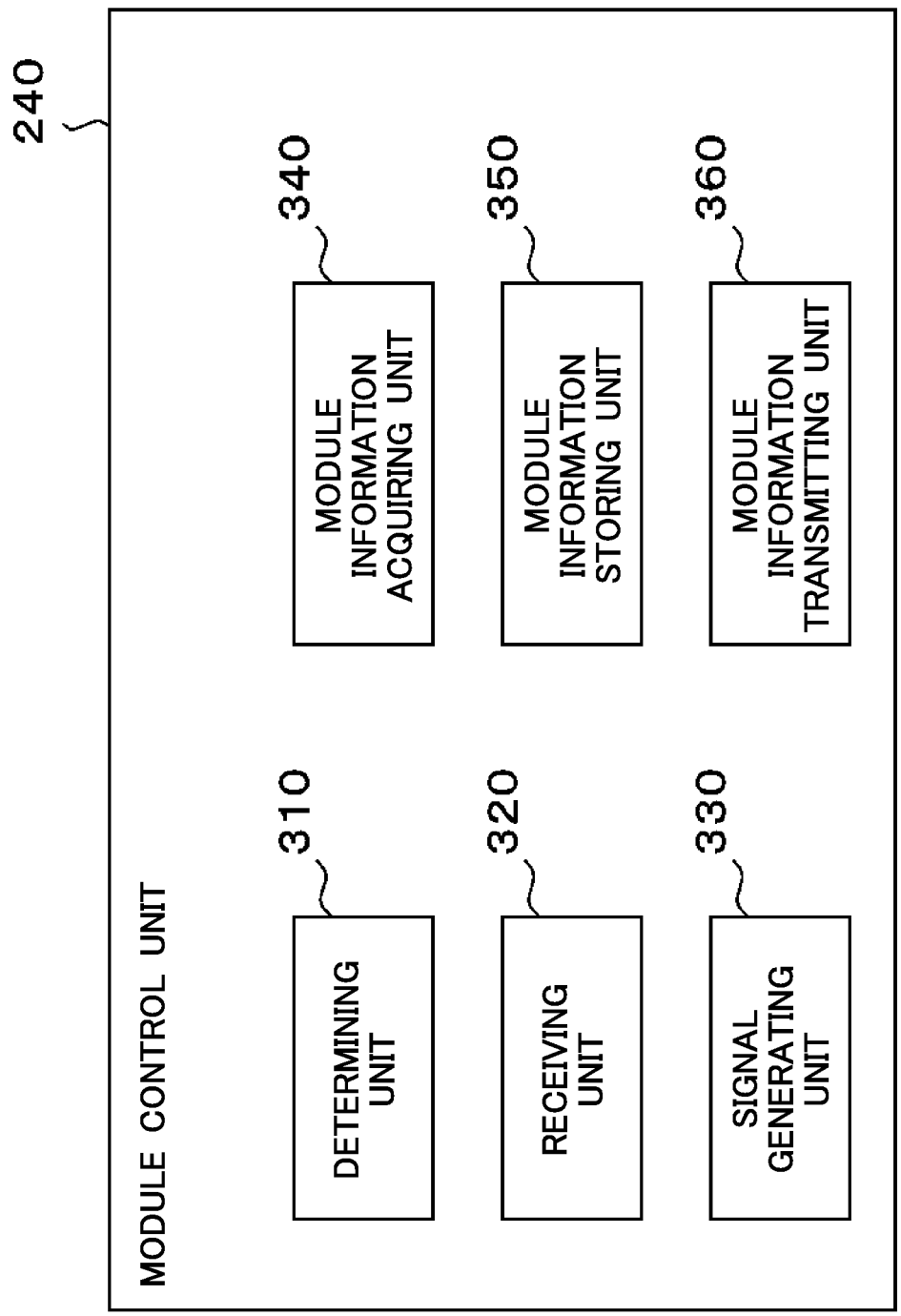
FIG. 3 schematically shows an example of a system configuration of a module control unit 240.

FIG. 3 schematically shows an example of a system configuration of the module control unit 240. In the present embodiment, the module control unit 240 includes a determining unit 310, a receiving unit 320, and a signal generating unit 330. The module control unit 240 may also include a module information acquiring unit 340, a module information storing unit 350, and a module information transmitting unit 360. The receiving unit 320 may be an example of the first signal receiving unit, second signal receiving unit, and third signal receiving unit. The module information acquiring unit 340 may be an example of the battery characteristic acquiring unit. The module information transmitting unit 360 may be an example of the output unit.

As described in the present embodiment, the module control unit 240 includes the module information acquiring unit 340, the module information storing unit 350, and the module information transmitting unit 360. However, the electric storage system 100 is not limited to the present embodiment. In another embodiment, the system control unit 140 may also include at least one of the module information acquiring unit 340, the module information storing unit 350, and the module information transmitting unit 360.

The determining unit 310 determines whether or not the terminal voltage of the switching unit 230 is within a predetermined range. The determining unit 310 transmits to the signal generating unit 330 a signal indicating the determination result. The determining unit 310 may be an optional comparator or a comparator circuit. The determining unit 310 may be a window comparator.

The receiving unit 320 receives at least one of a signal from the system control unit 140, a signal from the protecting unit 250, and an instruction from a user. The receiving unit 320 transmits to the signal generating unit 330 a signal corresponding to the receive information.

The signal generating unit 330 receives the signal from at least one of the determining unit 310 and the receiving unit 320. The signal generating unit 330 generates a signal for controlling the switching unit 230 based on the received information. The signal generating unit 330 transmits the generated signal to the switching unit 230.

In an embodiment, if the determining unit 310 has determined that the terminal voltage of the switching unit 230 is within a predetermined range, the signal generating unit 330 generates a signal for turning on the switching element of the switching unit 230. In another embodiment, if the determining unit 310 has determined that the terminal voltage of the switching unit 230 is not in the predetermined range, the signal generating unit 330 generates a signal for turning off the switching element of the switching unit 230.

The signal generating unit 330 may generate or transmit a signal subsequent to the passage of a predetermined amount of time after the determining unit 310 determines whether or not the terminal voltage of the switching unit 230 is within the predetermined range. The malfunction due to noise or the like can thereby be prevented. Also, the electric storage unit 210 and the wire 106 can be prevented from being electrically connected immediate after the electric storage module 110 is loaded into the electric storage system 100.

In the present embodiment, the signal generating unit 330 generates a signal for controlling the switching element of the switching unit 230 based on a signal received by the receiving unit 320. In an embodiment, if the receiving unit 320 has received from the system control unit 140 a signal for turning on the switching element of the switching unit 230, the signal generating unit 330 generates a signal for turning on the switching element of the switching unit 230.

In another embodiment, if the receiving unit 320 has received from the protecting unit 250 a signal for turning off the switching element of the switching unit 230, the signal generating unit 330 generates a signal for turning off the switching element of the switching unit 230. Furthermore, in another embodiment, if the receiving unit 320 has accepted an instruction from a user, the signal generating unit 330 generates a signal for causing the switching element of the switching unit 230 to operate as instructed by the user.

In the present embodiment, the module information acquiring unit 340 acquires the information related to the battery characteristic of the electric storage unit 210. The module information acquiring unit 340 may also acquire the information related to the battery characteristic of the electric storage unit 210 by measuring the battery characteristic of the electric storage unit 210. The module information acquiring unit 340 may also acquire information that is input by a manufacturer, a seller, or the like at the time of shipping, testing, or selling and is related to the battery characteristic of the electric storage unit 210.

The module information acquiring unit 340 may store the information related to the battery characteristic of the electric storage unit 210 in the module information storing unit 350. Although the specific configuration of the module information acquiring unit 340 is not particularly limited, the module information acquiring unit 340 may be a controller that controls reading data from and writing data into the module information storing unit 350. In the present embodiment, the module information storing unit 350 stores the information that has been acquired by the module information acquiring unit 340 and is related to the battery characteristic of the electric storage unit 210.

In the present embodiment, the module information transmitting unit 360 transmits to the system control unit 140 the information that has been acquired by the module information acquiring unit 340 and is related to the battery characteristic of the electric storage unit 210. The module information transmitting unit 360 may also transmit to an external apparatus the information that has been acquired by the module information acquiring unit 340 and is related to the battery characteristic of the electric storage unit 210. The module information transmitting unit 360 may transmit the information related to the battery characteristic of the electric storage unit 210 in response to a request by the external apparatus or transmit the information related to the battery characteristic of the electric storage unit 210 at a predetermined timing. The module information transmitting unit 360 may also refer to the module information storing unit 350 and transmit to the system control unit 140 or the external apparatus the information related to the battery characteristic of the electric storage unit 210.

Figure 4:
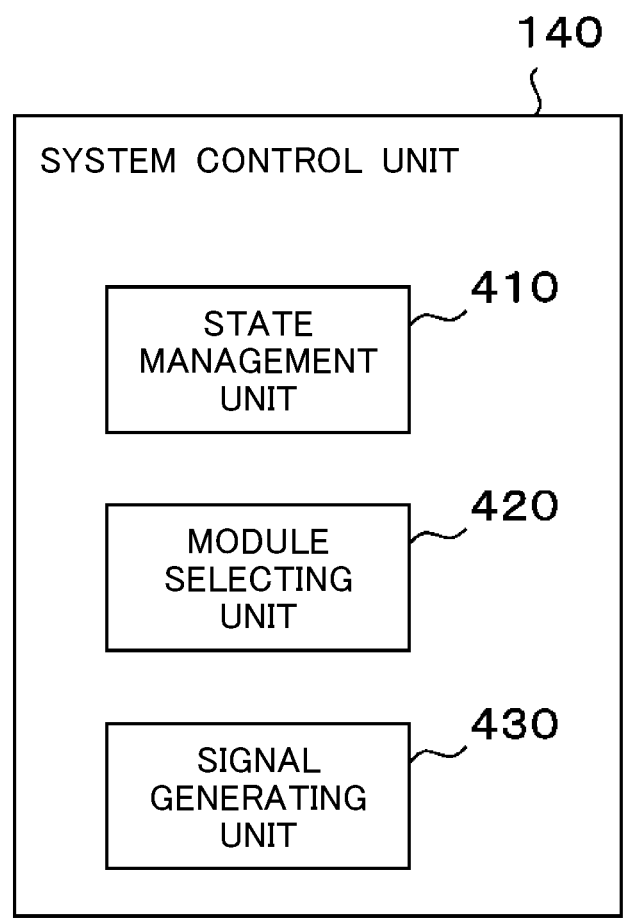
FIG. 4 schematically shows an example of a system configuration of a system control unit 140.

FIG. 4 schematically shows an example of a system configuration of the system control unit 140. In the present embodiment, the system control unit 140 includes a state managing unit 410, a module selecting unit 420, and a signal generating unit 430. The state managing unit 410 may be an example of the battery characteristic acquiring unit. The state managing unit 410 may be an example of the output unit.

In the present embodiment, the state managing unit 410 manages the state of the electric storage system 100. The state managing unit 410 may manage the state of the electric storage module 110 and the state of the electric storage module 120. The state managing unit 410 may monitor the state of each of the electric storage module 110 and the electric storage module 120. The state managing unit 410 may monitor the electric storage module 110 and the electric storage module 120 and also acquire information related to the battery characteristic of each of the electric storage module 110 and the electric storage module 120. The state managing unit 410 may also transmit to an external apparatus the information acquired by monitoring the electric storage module 110 and the electric storage module 120.

The state managing unit 410 may measure the battery characteristic of each electric storage module while the electric storage system 100 is operated. If the battery characteristic of the electric storage module does not satisfy a predetermined condition, the state managing unit 410 may output information indicating that the performance of the electric storage module is insufficient, to an output device that outputs information to a user. The state managing unit 410 may also output identification information of the electric storage module and the information indicating that the performance of the electric storage module is insufficient.

The user can thereby easily distinguish the electric storage module having the insufficient performance and can replace the electric storage module. According to the present embodiment, for example, if the electric storage system 100 is constructed using a reused electric storage module(s), at least part of the test for the electric storage module to be reused can be omitted.

In an embodiment, when the electric storage system 100 shifts to the state of charge, the module selecting unit 420 selects an electric storage module that is included in the plurality of electric storage modules in the electric storage system 100 and has the lowest terminal voltage. For example, the module selecting unit 420 compares the terminal voltage of the electric storage module 110 and the terminal voltage of the electric storage module 120 and then selects the electric storage module having the lower terminal voltage. The module selecting unit 420 transmits to the signal generating unit 430 a signal indicating the selected electric storage module.

In another embodiment, when the electric storage system 100 shifts to the state of discharge, the module selecting unit 420 selects the electric storage module that is included in the plurality of electric storage modules in the electric storage system 100 and has the highest terminal voltage. For example, the module selecting unit 420 compares the terminal voltage of the electric storage module 110 and the terminal voltage of the electric storage module 120 and then selects the electric storage module having the higher terminal voltage. The module selecting unit 420 transmits to the signal generating unit 430 a signal indicating the selected electric storage module.

In the present embodiment, the signal generating unit 430 generates a signal for turning on the switching element of the switching unit 230 in the electric storage module selected by the module selecting unit 420. The signal generating unit 430 transmits the generated signal to the module control unit 240. In another embodiment, the signal generating unit 430 may also generate a signal for turning off the switching element of the switching unit 230 in the electric storage module selected by the module selecting unit 420.

Figure 5:
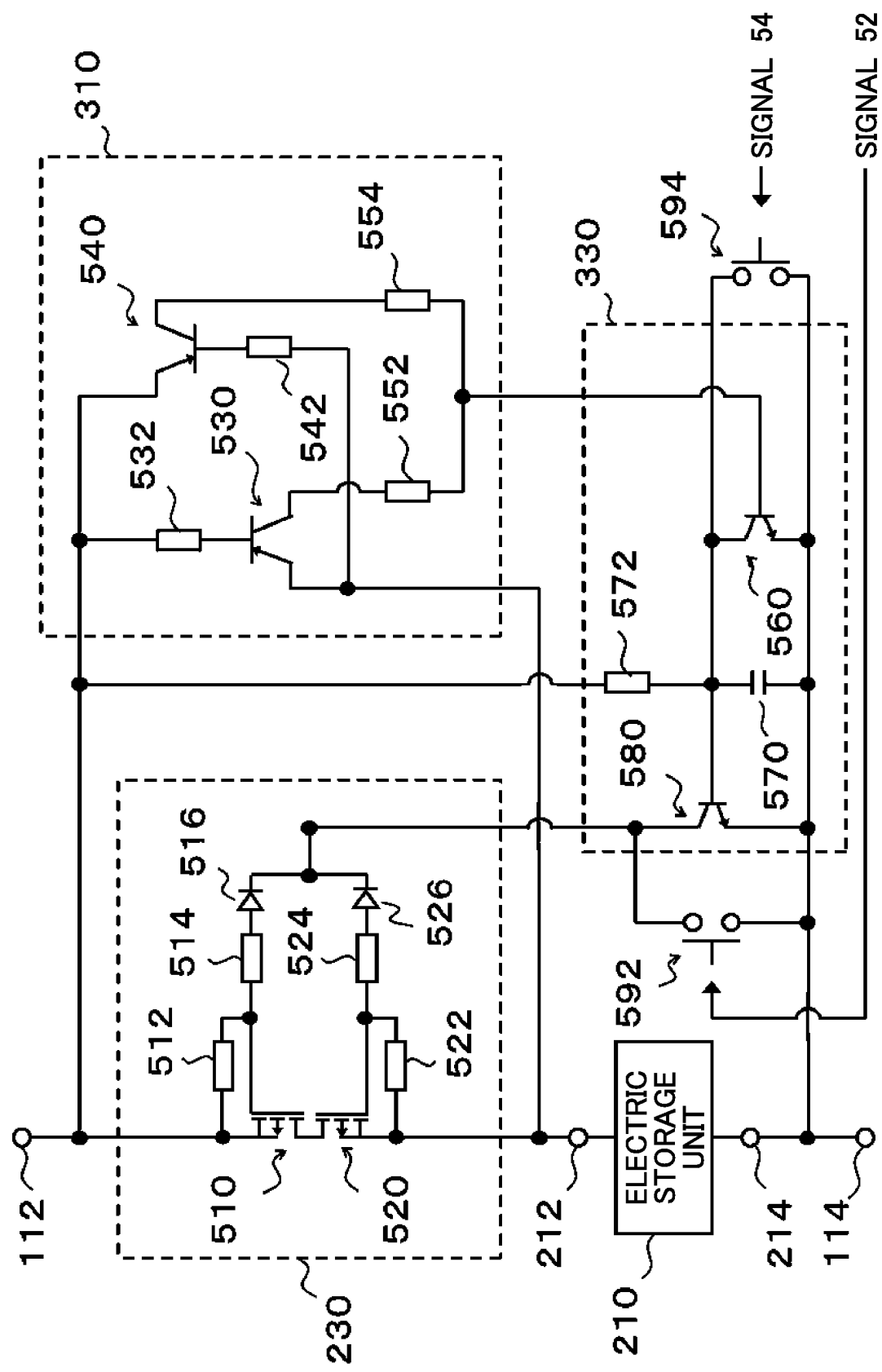
FIG. 5 schematically shows an example of a circuit configuration of the electric storage module 110.

FIG. 5 schematically shows an example of a circuit configuration of the electric storage module 110. Note that FIG. 5 does not show the protecting unit 250 and wires associated to the protecting unit 250 in order to simplify explanation.

In the present embodiment, the switching unit 230 includes a transistor 510, a resistor 512, a resistor 514, a diode 516, a transistor 520, a resistor 522, a resistor 524, and a diode 526. The transistor 510 and the transistor 520 may be examples of the switching element. As described in the present embodiment, the transistor 510 and the transistor 520 are used as the switching elements of the switching unit 230. However, the switching element of the switching unit 230 is not limited to the present embodiment. In another embodiment, a single switching element may be used as the switching element of the switching unit 230.

In the present embodiment, the module control unit 240 includes the determining unit 310, the signal generating unit 330, a switch 592, and a switch 594. In the present embodiment, the determining unit 310 includes a transistor 530, a resistor 532, a transistor 540, a resistor 542, a resistor 552, and a resistor 554. The signal generating unit 330 includes a transistor 560, a capacitor 570, a resistor 572, and a transistor 580. The switch 592 and the switch 594 may be examples of the receiving unit 320.

Then, the detail of each unit of the switching unit 230 and the module control unit 240 will be described. In the switching unit 230 of the present embodiment, the transistor 510 is a MOSFET, and even if the transistor 510 is in the OFF state, the current may flow from the positive terminal 212 to the positive terminal 112 due to a parasitic diode (not shown in the drawing) equivalently formed between the source and drain of the transistor 510. Similarly, the transistor 520 is a MOSFET, and even if the transistor 520 is in the OFF state, the current may flow from the positive terminal 112 to the positive terminal 212 due to a parasitic diode (not shown in the drawing) equivalently formed between the source and drain of the transistor 520.

In the present embodiment, the transistor 510 and the transistor 520 are set to the OFF state at the initial setting. If the transistor 580 is turned on when the electric storage system 100 is charged, the current flows from the positive terminal 112 to the negative terminal 114 via the resistor 512, the resistor 514, and the transistor 580. As a result, the voltage is applied to the gate of the transistor 510, and the transistor 510 is turned on. The current is thereby allowed to flow from the positive terminal 112 to the positive terminal 212 via the parasitic diode equivalently formed between the source and drain of the transistor 520.

On the other hand, if the transistor 580 is turned on when the electric storage system 100 is discharged, the current flows from the positive terminal 212 to the negative terminal 214 via the resistor 522, the resistor 524, and the transistor 580. As a result, the voltage is applied to the gate of the transistor 520, and the transistor 520 is turned on. The current is thereby allowed to flow from the positive terminal 212 to the positive terminal 112 via the parasitic diode equivalently formed between the source and drain of the transistor 510.

The voltage that is applied to the gate of the transistor 510 or the gate of the transistor 520, with the transistor 580 turned on, may be an example of a signal for turning on the switching element of the switching unit 230. Similarly, the voltage that is applied to the gate of the transistor 510 or the gate of the transistor 520, with the transistor 580 turned off, may be an example of a signal for turning off the switching element of the switching unit 230.

In the present embodiment, the values of the resistor 512 and the resistor 514 are set such that the transistor 510 can certainly be turned on and off in a power saving manner. Also, the values of the resistor 522 and the resistor 524 are set such that the transistor 520 can certainly be turned on and off in a power saving manner.

In the present embodiment, the diode 516 is arranged between the resistor 514 and the resistor 524. The diode 516 allows the current to flow in a direction from the resistor 514 toward the resistor 524 but does not allow the current to flow in a direction from the resistor 524 toward the resistor 514. By providing the diode 516, the current can be prevented from leaking from the positive terminal 212 to the positive terminal 112 through the route of the resistor 522, the resistor 524, the resistor 514, and the resistor 512 when the switching unit 230 electrically disconnects the positive terminal 112 and the positive terminal 212.

In the present embodiment, the diode 526 is arranged between the resistor 514 and the resistor 524. The diode 526 allows the current to flow in the direction from the resistor 524 toward the resistor 514 but does not allow the current to flow in the direction from the resistor 514 toward the resistor 524. By providing the diode 526, the current can be prevented from leaking from the positive terminal 112 to the positive terminal 212 through the route of the resistor 512, the resistor 514, the resistor 524, and the resistor 522 when the switching unit 230 electrically disconnects the positive terminal 112 and the positive terminal 212.

In the module control unit 240 of the present embodiment, the transistor 530 and the transistor 540 of the determining unit 310 are set to the OFF state at the initial setting. Also, the transistor 560 and the transistor 580 of the signal generating unit 330 are set to the OFF state at the initial setting.

According to the present embodiment, if the terminal voltage of the switching unit 230 is lower than a first value, which is predetermined such that the positive terminal 112 side is set positive, the value of the resistor 532 is set such that the transistor 530 is turned on. The value of the resistor 532 is preferably set such that the current that leaks when the switching unit 230 is in the OFF state becomes very small. Also, the value of the resistor 542 is set such that the transistor 540 is turned on if the terminal voltage of the switching unit 230 is higher than a predetermined second value. The value of the resistor 542 is preferably set such that the current that leaks when the switching unit 230 is in the OFF state becomes very small. Note that, according to the present embodiment, the terminal voltage of the switching unit 230 is equal to the voltage differential between the positive terminal 112 and the positive terminal 212.

If the terminal voltage of the switching unit 230 is lower than the predetermined first value, the transistor 530 is turned on, and the voltage is applied from the electric storage unit 210 to the base of the transistor 560 via the positive terminal 212, transistor 530, and the resistor 552. Accordingly, the transistor 560 is turned on. Although the voltage from the positive terminal 112 is applied to the base of the transistor 580, the transistor 580 is prevented from being turned on while the transistor 560 is turned on. As a result, the transistor 580 is turned off.

On the other hand, if the terminal voltage of the switching unit 230 is higher than the predetermined the second value, the transistor 540 is turned on, and the voltage is applied from the positive terminal 112 to the base of the transistor 560 via the transistor 540 and the resistor 554. Accordingly, the transistor 560 is turned on. As a result, the transistor 580 is turned off.

In the present embodiment, the value of the resistor 552 is set such that the power consumption can be reduced to the extent that the transistor 560 can be turned on when the transistor 530 is in the ON state. The value of the resistor 554 is set such that the power consumption can be reduced to the extent that the transistor 560 can be turned on when the transistor 540 is in the ON state.

The capacity of the capacitor 570 is set such that the transistor 560 is turned on before the voltage from the positive terminal 112 is applied to the base of the transistor 580 and the transistor 580 is turned on. The signal generating unit 330 can thereby generate a signal subsequent to the passage of a predetermined amount of time after the determining unit 310 determines whether or not the terminal voltage of the switching element is within the predetermined range.

In contrast, if the terminal voltage of the switching unit 230 is in the range defined by the first value and the second value, the transistor 530 and the transistor 540 remain the OFF state, and the transistor 560 also remains the OFF state. Because of this, the voltage is applied from the positive terminal 112 to the base of the transistor 580 via the resistor 572, so that the transistor 580 is turned on.

The switch 592 and the switch 594 may be manual switches or switching elements such as relays, thyristors, and transistors. A signal 52 indicating that the switching unit 230 will be turned on may be input to the switch 592. A signal 54 indicating that the switching unit 230 will be turned off may be input to the switch 594.

If the switch 592 is turned on, the switching unit 230 can be turned on regardless of whether the transistor 580 is turned on or turned off If the switch 594 is turned on, the transistor 580 can be turned off regardless of whether the transistor 560 is turned on or turned off. As a result, the switching unit 230 can be turned off.

Figure 6:
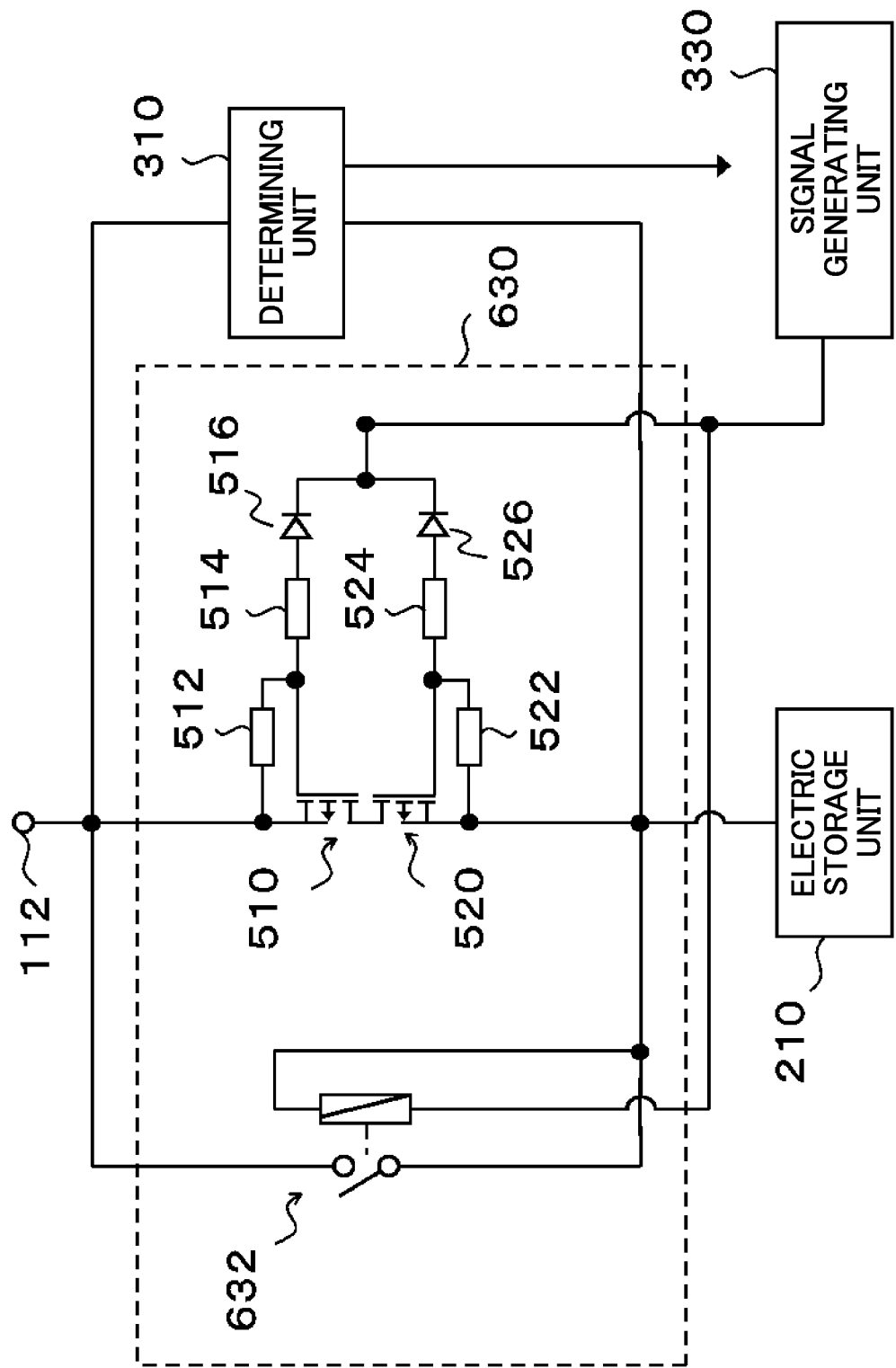
FIG. 6 schematically shows an example of a system configuration of a switching unit 630.

FIG. 6 schematically shows an example of a system configuration of a switching unit 630. The switching unit 630 differs from the switching unit 230 described in association with FIG. 5 in that the switching unit 630 has a relay 632 connected in parallel with the transistor 510 and the transistor 520. The switching unit 630 may have the configuration similar to that of the switching unit 230 in the other respects. In the present embodiment, the transistor 510 and the transistor 520 may be semiconductor transistors. The transistor 510 and the transistor 520 may be field effect transistors (FET).

Although the relay circuit has a superior characteristic that the resistance is small when the circuit is turned on, the relay circuit responds relatively slowly. Because of this, for example, if the load device is a device having pulse current pattern such as a motor, and if the voltage greatly fluctuates in a short period of time, it is difficult for the relay circuit to be turned on upon receiving a signal from the signal generating unit 330. On the other hand, although the semiconductor transistor consumes power more than the relay circuit, the semiconductor transistor is superior in the responsiveness. According to the switching unit 630 of the present embodiment, the transistor 510 or the transistor 520 using the semiconductor transistor, and the relay 632 using the relay circuit are connected in parallel.

Because of this, if the switching unit 230 has received a signal for turning on the switching unit 230 from the signal generating unit 330, first, the transistor 510 or the transistor 520 quickly responds and turns on the switching unit 230. Subsequently, with some delay, the relay 632 is turned on. Then, when the relay 632 is turned on, the relay 632 having a small resistance is connected in parallel with the transistor 510 and the transistor 520. Consequently, the combined resistance becomes small, and then the power loss can be reduced.

Figure 7:
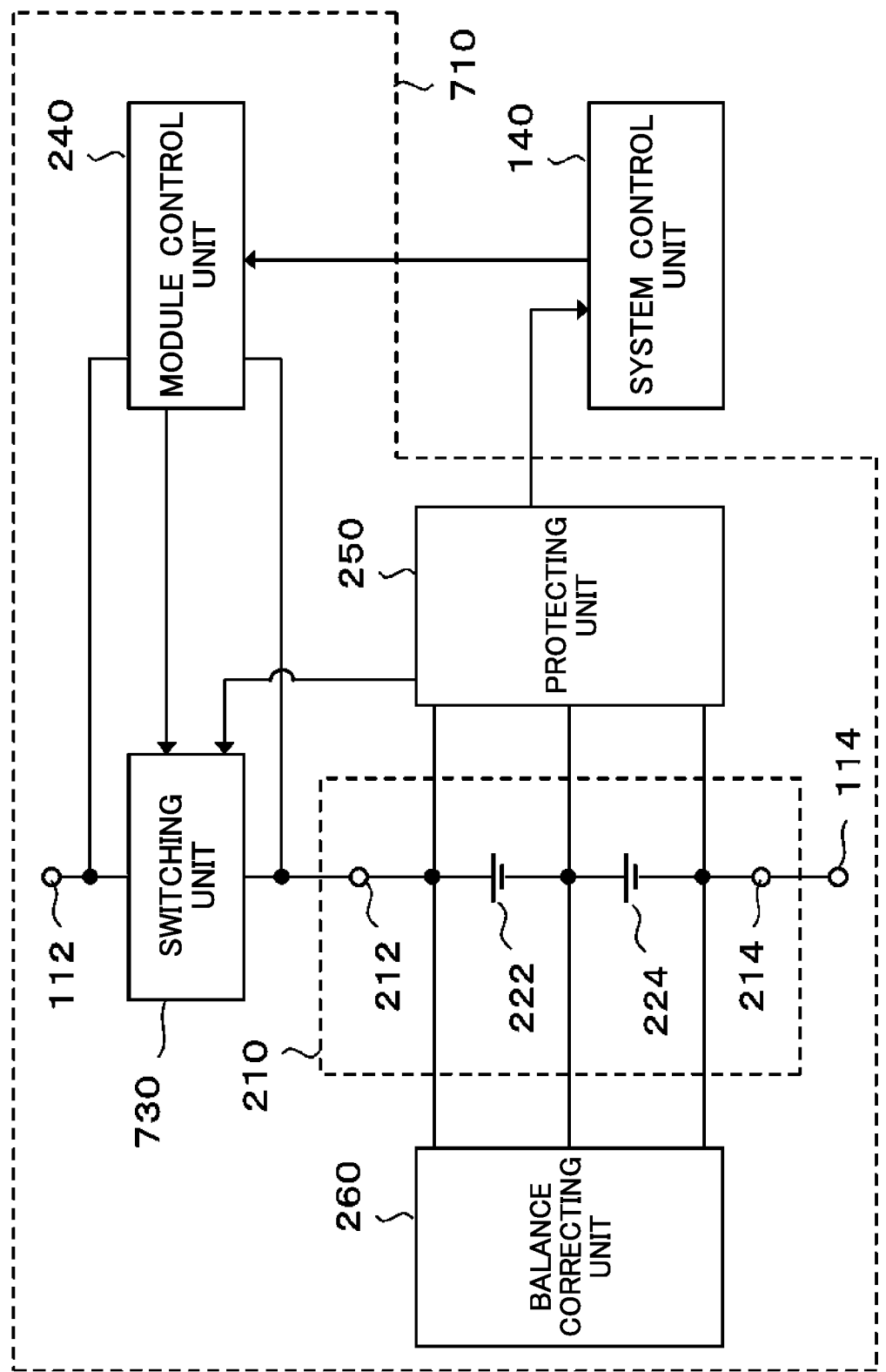
FIG. 7 schematically shows an example of a system configuration of an electric storage module 710.
Figure 8:
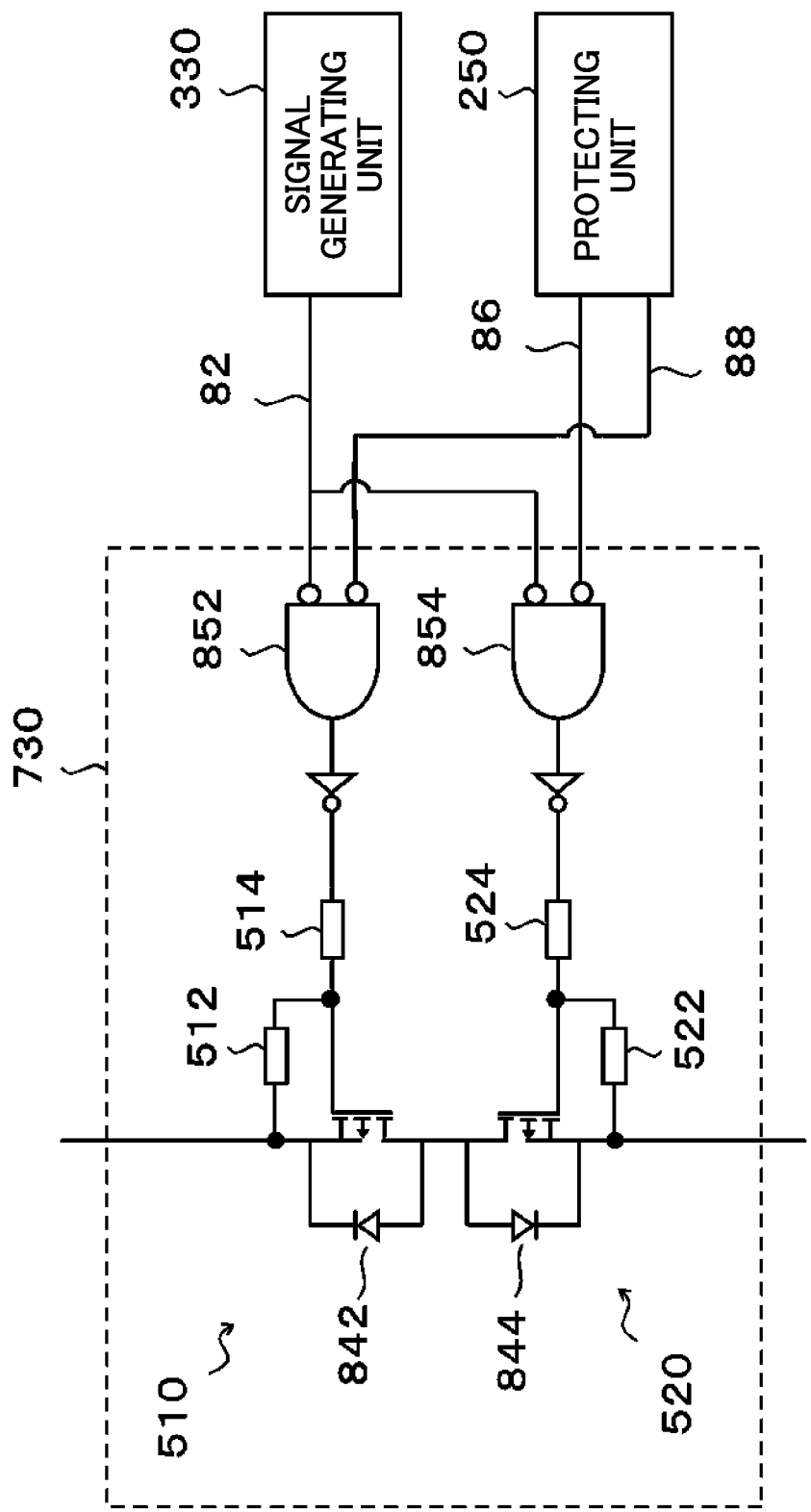
FIG. 8 schematically shows an example of a system configuration of a switching unit 730.

An electric storage module 710 is now explained with reference to FIG. 7 and FIG. 8. FIG. 7 schematically shows an example of a system configuration of the electric storage module 710. FIG. 8 schematically shows an example of a system configuration of a switching unit 730. FIG. 8 shows a parasitic diode 842 of the transistor 510 and a parasitic diode 844 of the transistor 520 in order to facilitate understanding on the operation of the transistor 510 and the transistor 520.

The electric storage module 710 differs from the electric storage module 110 described in association with FIG. 2 in that the electric storage module 710 has the switching unit 730 instead of the switching unit 230 and that a signal from the protecting unit 250 is transmitted to the switching unit 730, not to the module control unit 240. The electric storage module 710 may have the configuration similar to that of the electric storage module 110 in the other respects.

In the present embodiment, the switching unit 730 receives from the module control unit 240 a signal for turning on or turning off the switching unit 730. Also, the switching unit 730 receives from the protecting unit 250 a signal for turning off the switching unit 730.

According to the present embodiment, the transistor 510 is turned on if a signal 82 for turning on the switching element of the switching unit 730 is input to a logic circuit 852 and a signal 88 indicating that the electric storage unit 210 is in the state of overcharge is not input to the logic circuit 852. Also, the transistor 520 is turned on if the signal 82 for turning on the switching element of the switching unit 730 is input to a logic circuit 854 and the signal 86 indicating that the electric storage unit 210 is in the state of over discharge is not input to the logic circuit 854.

Figure 9:
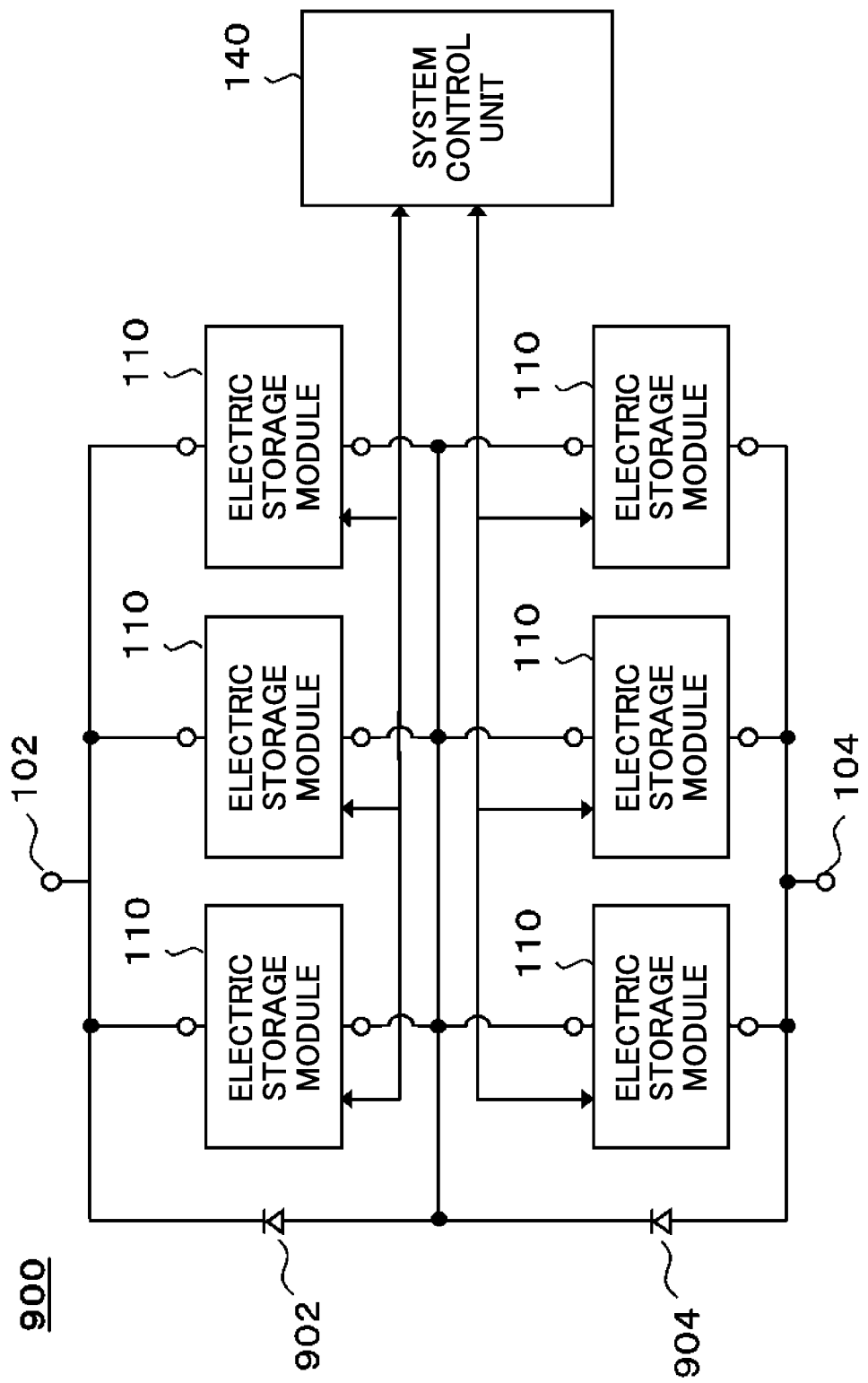
FIG. 9 schematically shows an example of a system configuration of an electric storage system 900.

FIG. 9 schematically shows an example of a system configuration of an electric storage system 900. The electric storage system 900 differs from the electric storage system 100 in that the electric storage system 900 includes a plurality of electric storage modules 110 connected in a matrix. The electric storage system 900 may have the configuration similar to that of the electric storage system 100 in the other respects. In the present embodiment, a first block including three electric storage modules 110 and a diode 902 connected in parallel and a second block including three electric storage modules 110 and a diode 904 connected in parallel are connected in series.

According to the present embodiment, when the electric storage system 900 is discharged, all of the plurality of electric storage modules 110 included in a particular block continue being discharged until they arrive at completely discharged state, and then the discharge from the block stops. According to the present embodiment, even if the discharge from the above described block stops, the diode 902 allows the current to flow. The power supply by the electric storage system 900 can thereby be continued. Because of this, the output voltage decreases stepwise while the electric storage system 900 discharges power.

Similarly, when the electric storage system 900 is charged, the plurality of electric storage modules 110 included in a particular block are sequentially disconnected from the electric storage system 900 upon completion of charging on the first-completed, first-disconnected basis. Then, eventually charging all of the electric storage modules 110 is completed.

According to the present embodiment, the diode 902 and the diode 904 are placed so as to allow the current to flow in a direction (in some cases, referred to as discharge direction) from the connection terminal 104 to the connection terminal 102. Because of this, even if the switching units 230 of all the electric storage modules 110 included in a particular block are turned off, the current can be maintained. On the other hand, once the switching units 230 of all the electric storage modules 110 included in the particular block are turned off, subsequent charging becomes difficult.

According to the present embodiment, if the electric storage system 900 is charged, the system control unit 140 first detects the terminal voltage in each block and checks whether there is a block in which the terminal voltage is 0. Upon finding the block in which the terminal voltage is 0, the system control unit 140 transmits to one of the plurality of electric storage modules 110 included in the block a signal for turning on the switching element of the switching unit 230. The system control unit 140 may transmit a signal for turning on the switching element of the switching unit 230 to the electric storage module 110 that is included in the plurality of electric storage modules 110 in the above described block and has the lowest terminal voltage. Subsequently, the system control unit 140 starts charging the electric storage system 900.

As described above, in the present embodiment, the diode 902 and the diode 904 are placed so as to allow the current to flow in the discharge direction. However, the electric storage system 900 is not limited to the present embodiment. In another embodiment, the diode 902 and the diode 904 may be Zener diodes. Even if charging all of the electric storage modules 110 included in a particular block is completed, and all the electric storage modules 110 included in the block are disconnected from the electric storage system 900, charging another block connected in series with the above described particular block can thereby be continued in the electric storage system 900.

If the electric storage system 900 is discharged in this case, the system control unit 140 may, prior to the start of the discharge, detect the terminal voltage in each group and check whether there is a group in which the terminal voltage is 0. Subsequently, the system control unit 140 may transmit a signal for turning on the switching element of the switching unit 230 to one of the plurality of electric storage modules 110 included in the block in which the terminal voltage is 0.

Other examples of the electric storage module 110 are described with reference to FIG. 10 to FIG. 17. The matters described with respect to the electric storage module 110 and its each unit may be applied to another example of the electric storage module 110 and its each unit, in the range that technical contradiction does not occur. Also, the matters described with respect to another example of the electric storage module 110 and its each unit may be applied to the electric storage module 110 and its each unit. As to the matters described with respect to each unit of the electric storage module 110 with reference to FIG. 10 to FIG. 17, the description may be omitted in some cases.

Figure 10:
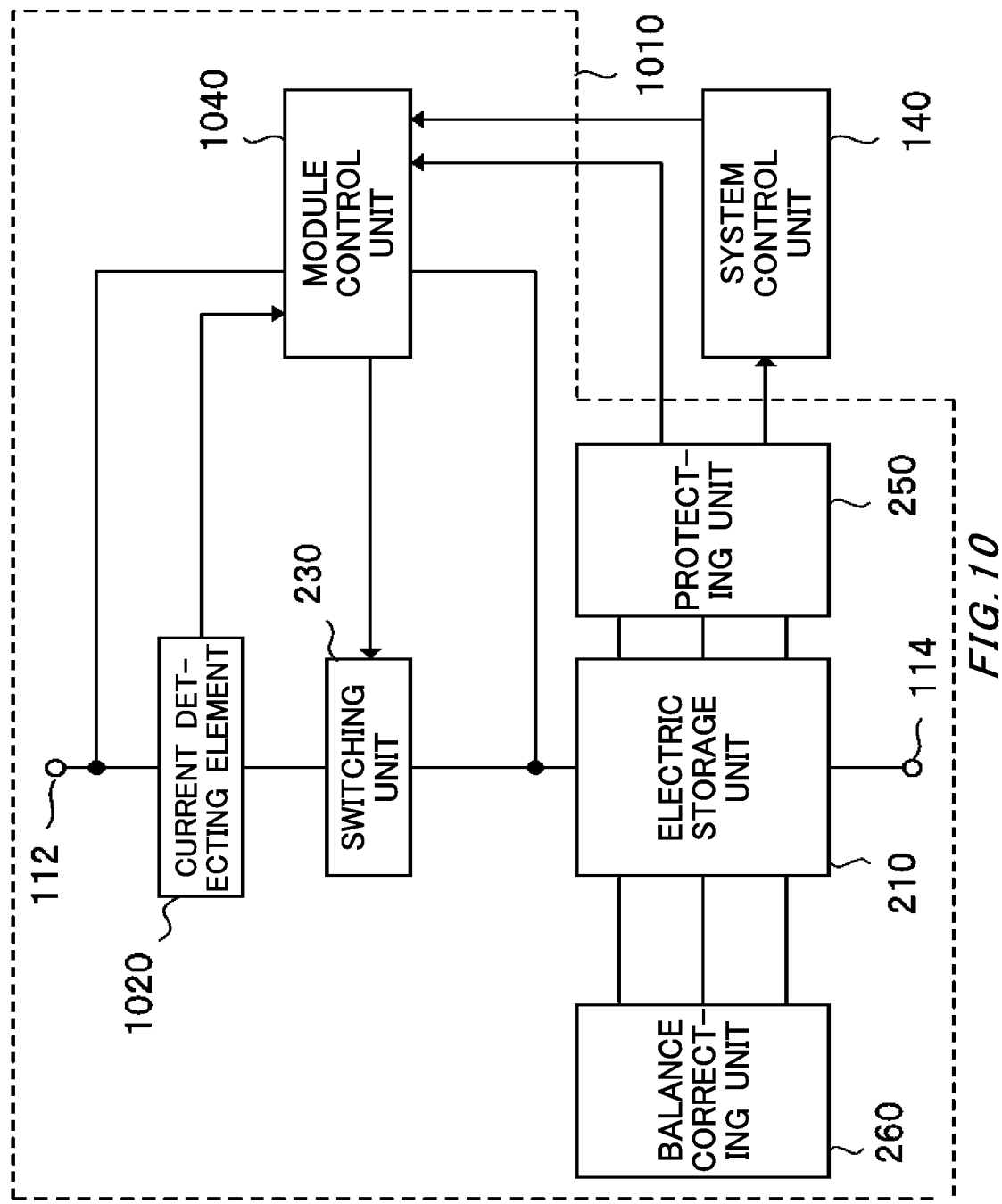
FIG. 10 schematically shows an example of a system configuration of an electric storage module 1010.

FIG. 10 schematically shows an example of a system configuration of an electric storage module 1010. In the present embodiment, the electric storage module 1010 includes the positive terminal 112, the negative terminal 114, and the electric storage unit 210. The electric storage module 1010 may include the switching unit 230. The electric storage module 1010 may include the protecting unit 250. The electric storage module 1010 may include the balance correcting unit 260. In the present embodiment, the electric storage module 1010 includes a current detecting element 1020 and a module control unit 1040.

The electric storage module 1010 may be an example of a control device and a control system. The module control unit 1040 may be an example of a control device. The switching unit 230 may be an example of an adjusting unit, a first current adjusting unit, and a second current adjusting unit.

In the present embodiment, the switching unit 230 adjusts the current flowing between the wire 106 and the electric storage unit 210. In an embodiment, the switching unit 230 electrically connects the wire 106 and the electric storage unit 210 or electrically disconnects the wire 106 and the electric storage unit 210. In another embodiment, the switching unit 230 increases or decreases the above described current by varying the resistance value of the path between the wire 106 and the electric storage unit 210, for example.

In the present embodiment, one end of the switching unit 230 is electrically connected to the wire 106 via the positive terminal 112 and the current detecting element 1020. The other end of the switching unit 230 is electrically connected to the positive terminal 212 of the electric storage unit 210. The information indicating the terminal voltage of the switching unit 230 may be used as the information indicating the difference between the potential of the wire 106 or the voltage applied to the wire 106 (in some cases, simply referred to as voltage of the wire 106) and potential of a terminal of the electric storage unit 210 (for example, the positive terminal 212) or voltage applied to the terminal (in some cases, simply referred to as voltage of the electric storage unit 210, voltage of the terminal, or the like).

In an embodiment, the switching unit 230 adjusts at least the magnitude of the current flowing between the wire 106 and the electric storage unit 210 in a direction from the positive terminal 212 of the electric storage unit 210 toward the positive terminal 112 (in some cases, referred to as discharge direction). In another embodiment, the switching unit 230 adjusts at least the magnitude of the current flowing between the wire 106 and the electric storage unit 210 in a direction from the positive terminal 112 toward the positive terminal 212 of the electric storage unit 210 (in some cases, referred to as charge direction). In still another embodiment, the switching unit 230 adjusts the magnitude of the current flowing between the wire 106 and the electric storage unit 210 in the discharge direction and the magnitude of the current flowing between the wire 106 and the electric storage unit 210 in the charge direction.

In the present embodiment, the electric storage module 1010 differs from the electric storage module 110 in that the electric storage module 1010 includes the current detecting element 1020. The electric storage module 1010 differs from the electric storage module 110 in that the electric storage module 1010 includes the module control unit 1040 instead of the module control unit 240. With respect to the configuration other than the above described differences, the electric storage module 1010 may have the features similar to those of the corresponding configuration of the electric storage module 110.

In the present embodiment, the current detecting element 1020 is used for acquiring information indicating the current flowing between the wire 106 and the electric storage unit 210. Examples of the information indicating the current include the presence or absence of the current, the magnitude of the current, and the direction of the current. In the present embodiment, the electric storage module 1010 acquires the information related to the current flowing between the wire 106 and the electric storage unit 210 by measuring the terminal voltage of the current detecting element 1020.

In the present embodiment, the current detecting element 1020 is arranged between the positive terminal 112 and the switching unit 230. More specifically, the one end of the current detecting element 1020 is electrically connected to the switching unit 230. The other end of the current detecting element 1020 is electrically connected to the wire 106 via the positive terminal 112. Note that the current detecting element 1020 may be arranged between the switching unit 230 and the positive terminal 212 of the electric storage unit 210. Also, the switching unit 230 or some of the elements constituting the switching unit 230 may be used as the current detecting element 1020.

The current detecting element 1020 may be an element having an optional resistance value, and its types are not particularly limited. For example, the current detecting element 1020 has an appropriate resistance value corresponding to the maximum allowable current of the electric storage unit 210. Examples of the current detecting element 1020 include a resistor and a Hall sensor. A passive element or an active element having an appropriate resistance value may be used as the above described resistor.

In the present embodiment, the module control unit 1040 differs from the module control unit 240 in that the module control unit 1040 detects the current flowing between the wire 106 and the electric storage unit 210. In the present embodiment, the module control unit 1040 differs from the module control unit 240 in that the module control unit 1040 controls the operation of the switching unit 230 based on (i) the voltage or SOC of the electric storage unit 210 and (ii) the current flowing between the wire 106 and the electric storage unit 210. The module control unit 1040 may control the operation of the switching unit 230 based on (i) the voltage or SOC of the electric storage unit 210, (ii) the current flowing between the wire 106 and the electric storage unit 210, and (iii) the terminal voltage of the switching unit 230. With respect to the configuration other than the above described differences, the module control unit 1040 may have the features similar to those of the corresponding configuration of the module control unit 240.

The methods by which the module control unit 1040 detects the current flowing between the wire 106 and the electric storage unit 210 are not particularly limited. In the present embodiment, the module control unit 1040 acquires the information indicating the terminal voltage of the current detecting element 1020 arranged between the positive terminal 112 and the positive terminal 212 and based on the information, detects the current flowing between the wire 106 and the electric storage unit 210. The module control unit 1040 can thereby monitor the current flowing between the wire 106 and the electric storage unit 210. The module control unit 1040 may decide the magnitude of the current flowing between the wire 106 and the electric storage unit 210 and also decide the direction of the above described current.

In an embodiment, if the switching unit 230 adjusts or controls at least the magnitude of the current flowing between the wire 106 and the electric storage unit 210 in the discharge direction, the module control unit 1040 monitors or detects the current flowing between the wire 106 and the electric storage unit 210 in the charge direction. The module control unit 1040 may monitor or detect the current flowing between the wire 106 and the electric storage unit 210 if the switching unit 230 disconnects the electrical connection between the wire 106 and the electric storage unit 210 in the discharge direction (in some cases, referred to as electrically disconnected in the discharge direction). Note that, in this case, the current detected by the module control unit 1040 is consequently the current flowing between the wire 106 and the electric storage unit 210 in the charge direction.

In another embodiment, if the switching unit 230 adjusts or controls at least the magnitude of the current flowing between the wire 106 and the electric storage unit 210 in the charge direction, the module control unit 1040 monitors or detects the current flowing between the wire 106 and the electric storage unit 210 in the discharge direction. The module control unit 1040 may monitor or detect the current flowing between the wire 106 and the electric storage unit 210 if the switching unit 230 disconnects the electrical connection between the wire 106 and the electric storage unit 210 in the charge direction (in some cases, referred to as electrically disconnected in the charge direction). Note that, in this case, the current detected by the module control unit 1040 is consequently the current flowing between the wire 106 and the electric storage unit 210 in the discharge direction.

The methods by which the module control unit 1040 controls the operation of the switching unit 230 are not particularly limited. As described above, the module control unit 1040 detects the current flowing between the wire 106 and the electric storage unit 210. The module control unit 1040 may control the operation of the switching unit 230 based on the information indicating the current flowing between the wire 106 and the electric storage unit 210. The interlock of the switching unit 230 can thereby be safely released when the electric storage module 1010 is hot-swapped.

Similarly to the module control unit 240, the module control unit 1040 may acquire the information indicating the terminal voltage of the switching unit 230. The module control unit 1040 may control the operation of the switching unit 230 based on the information indicating the terminal voltage of the switching unit 230. The time required to hot-swap the electric storage module 1010 is thereby shortened.

Similarly to the module control unit 240, the module control unit 1040 may acquire from the protecting unit 250 the information acquired or generated by the protecting unit 250. For example, the module control unit 1040 acquires from the protecting unit 250 information such as information indicating that the function of protection against overcharge is enabled, information indicating that the function of protection against overcharge is not enabled, information indicating that function of protection against over discharge is enabled, and information indicating that the function of protection against over discharge is not enabled. The module control unit 1040 may control the operation of the switching unit 230 based on the information acquired or generated by the protecting unit 250. The switching unit 230 can thereby be appropriately controlled depending on the state of the electric storage unit 210.

For example, if the voltage or SOC of the electric storage unit 210 is lower than the threshold for the protection against over discharge or equal to or lower than the threshold, the function of protection against over discharge becomes enabled. If the voltage or SOC of the electric storage unit 210 is higher than the threshold for the protection against over discharge or equal to or higher than the threshold, the function of protection against over discharge becomes disabled. Also, for example, the voltage or SOC of the electric storage unit 210 is higher than the threshold for the protection against overcharge or equal to or higher than the threshold, the function of protection against overcharge becomes enabled. If the voltage or SOC of the electric storage unit 210 is lower than the threshold for the protection against overcharge or equal to or lower than the threshold, the function of protection against overcharge becomes disabled.

Similarly to the module control unit 240, the module control unit 1040 may acquire from the system control unit 140 the information acquired or generated by the system control unit 140. For example, the module control unit 1040 acquires from the system control unit 140 the information indicating the battery characteristic of the electric storage unit 210. The module control unit 1040 may control the operation of the switching unit 230 based on the information acquired or generated by the system control unit 140. The switching unit 230 can thereby be appropriately controlled depending on the state of the electric storage unit 210.

Specific Examples of the Procedure for Controlling the Operation of the Switching Unit 230

In an embodiment, the module control unit 1040 controls the operation of the switching unit 230 based on the state of charge of the electric storage unit 210. In another embodiment, the module control unit 1040 controls the operation of the switching unit 230 based on the terminal voltage of the switching unit 230. In still another embodiment, the module control unit 1040 controls the operation of the switching unit 230 based on the current flowing between the wire 106 and the electric storage unit 210. The module control unit 1040 may control the operation of the switching unit 230 based on at least one of the magnitude and the direction of the above described current.

More specifically, the module control unit 1040 controls the operation of the switching unit 230 based on (i) the voltage or SOC of the electric storage unit 210 and (ii) the current flowing between the wire 106 and the electric storage unit 210. The module control unit 1040 may control the operation of the switching unit 230 based on (i) the voltage or SOC of the electric storage unit 210, (ii) the current flowing between the wire 106 and the electric storage unit 210, and (iii) the terminal voltage of the switching unit 230.

For example, if the voltage or SOC of the electric storage unit 210 satisfies the predetermined condition, the module control unit 1040 controls the switching unit 230 such that the switching unit 230 electrically connects the wire 106 and the electric storage unit 210. The voltage or SOC of the electric storage unit 210 may be an example of the battery characteristic of the electric storage unit 210. The predetermined condition may be a condition using a predetermined numerical range or threshold or may be a condition using a numerical range or threshold calculated in accordance with a predetermined procedure. The deterioration or damage of the electric storage unit 210 due to the overcharge or over discharge can thereby be prevented, for example.

The predetermined condition may be a condition for protecting the electric storage unit 210. Examples of the predetermined condition include (i) a condition indicating that the voltage or SOC of the electric storage unit 210 is within a particular numerical range, (ii) a condition indicating that the voltage or SOC of the electric storage unit 210 is higher than a particular threshold or is equal to or higher than the particular threshold, (iii) a condition indicating that the voltage or SOC of the electric storage unit 210 is lower than a particular threshold or is equal to or lower than the particular threshold, and (v) a condition formed by combination of these conditions.

The condition indicating that the voltage or SOC of the electric storage unit 210 is within the particular numerical range may be a condition indicating that at least one of a function of protection against overvoltage and the function of protection against over discharge of the electric storage module 1010 is not enabled. The condition indicating that the voltage or SOC of the electric storage unit 210 is within the particular numerical range may be a condition indicating that the function of protection against overvoltage and the function of protection against over discharge of the electric storage module 1010 is not enabled. The condition indicating that the voltage or SOC of the electric storage unit 210 is higher than the particular threshold or is equal to or higher than the particular threshold may be a condition indicating that the function of protection against over discharge of the electric storage module 1010 is not enabled. The condition indicating that the voltage or SOC of the electric storage unit 210 is lower than the particular threshold or is equal to or lower than the particular threshold may be a condition indicating that the function of protection against overcharge of the electric storage module 1010 is not enabled.

According to the present embodiment, the module control unit 1040 controls the switching unit 230 such that the switching unit 230 electrically connects the electric storage unit 210 and the wire 106 if the terminal voltage of the switching unit 230 satisfies a predetermined condition. More specifically, if the difference between the voltage of the wire 106 and the voltage of the electric storage unit 210 is relatively large, the electric storage unit 210 and the wire 106 are electrically disconnected. On the other hand, if the above described difference is relatively small, the electric storage unit 210 and the wire 106 are electrically connected. The rapid hot-swap thereby becomes possible.

The predetermined condition may be a condition for realizing the rapid hot-swap. Examples of the predetermined condition include (i) a condition indicating that the terminal voltage of the switching unit 230 is within a particular numerical range, (ii) a condition indicating that the terminal voltage of the switching unit 230 is higher than a particular threshold or is equal to or higher than the particular threshold, (iii) a condition indicating that the terminal voltage of the switching unit 230 is lower than a particular threshold or is equal to or lower than the particular threshold, and (v) a condition formed by combination of these conditions.

Specific Examples of the Procedure for Releasing the Interlock of the Protection Against Over Discharge If the voltage or SOC of the electric storage unit 210, for example, becomes lower than the threshold for the protection against over discharge when the electric storage system 100 is discharged, with the electric storage unit 210 of the electric storage module 1010 electrically connected to the wire 106 of the electric storage system 100, the protecting unit 250 transmits to the module control unit 1040 a signal for enabling the function of protection against over discharge. At this time, the current flows between the wire 106 and the electric storage unit 210 in the discharge direction. In this case, the discharge direction may be an example of a first direction. Also, the charge direction may be an example of a second direction. Note that, in the present embodiment, the discharge direction and the charge direction are opposite to each other.

The case in which the voltage or SOC of the electric storage unit 210 is lower than the threshold for the protection against over discharge may be an example of the case in which the condition for protecting the electric storage unit 210 is not satisfied. In another embodiment, the protecting unit 250 may transmit to the module control unit 1040 the signal for enabling the function of protection against over discharge if the voltage or SOC of the electric storage unit 210 is equal to or lower than the threshold for the protection against over discharge.

Upon receiving the above described signal, the module control unit 1040 controls the switching unit 230 and electrically disconnects the wire 106 and the electric storage unit 210. If the electric storage system 100 continues being discharged also after the wire 106 and the electric storage unit 210 are electrically disconnected, the voltage differential will be caused between the wire 106 and the electric storage unit 210.

After the discharge of the electric storage system 100 ends, and then, when the charge of the electric storage system 100 is started, a voltage differential is caused between the wire 106 and the electric storage unit 210. In this case, when an absolute value of the above described voltage differential is higher than the threshold for realizing the rapid hot-swap, the module control unit 1040 judges that the terminal voltage of the switching unit 230 does not satisfy the condition for realizing the rapid hot-swap. As a result, the charge of the electric storage system 100 proceeds, with the electric storage unit 210 of the electric storage module 1010 and the wire 106 of the electric storage system 100 electrically disconnected.

On the other hand, (i) when the absolute value of the above described voltage differential at the time of starting the charge of the electric storage system 100 is lower than the threshold for realizing the rapid hot-swap or equal to or lower than the threshold, or (ii) when the charge of the electric storage system 100 proceeds, and the absolute value of the above described voltage differential has become lower than the threshold for realizing the rapid hot-swap or becomes equal to or lower than the threshold, the module control unit 1040 controls the switching unit 230 in an attempt to electrically connect the wire 106 and the electric storage unit 210. However, at this stage, the voltage or SOC of the electric storage unit 210 is lower than the threshold for the protection against over discharge. Because of this, the interlock mechanism of the module control unit 1040 is actuated. As a result, the module control unit 1040 is unable to control the switching unit 230 and to electrically connect the wire 106 and the electric storage unit 210.

In order for the module control unit 1040 to control the switching unit 230 and electrically connect the wire 106 and the electric storage unit 210, the above described interlock needs to be released by some logic. Although the method for releasing the above described interlock is not particularly limited, in the present embodiment, the module control unit 1040 decides whether or not to release the above described interlock, based on the current flowing between the wire 106 and the electric storage unit 210 or based on the information related to the current, and controls the operation of the switching unit 230.

Here, as described in association with FIG. 5, the switching unit 230 includes the transistor 520 that adjusts or controls the magnitude of the current flowing between the wire 106 and the electric storage unit 210 in the discharge direction. Examples of the transistor 520 include a Si-MOSFET, an insulated gate bipolar transistor (IGBT), a SiC-MOSFET, and a GaN-MOSFET.

If the rated voltage of the electric storage unit 210 is relatively high, the transistor 520 is preferably a SiC-MOSFET. For example, if the maximum value of the rated voltage of the electric storage unit 210 is equal to or higher than 100 V, preferably equal to or higher than 200 V, more preferably equal to or higher than 300 V, and is further more preferably equal to or higher than 500 V, and still more preferably equal to or higher than 800 V, and is even further more preferably 1000 V, a SiC-MOSFET is used as the transistor 520. The advantage of the SiC-MOSFET, namely having the superior breakdown voltage characteristics but allowing little loss, can thereby be sufficiently demonstrated. If the maximum value of the rated voltage of the electric storage unit 210 is equal to or higher than 300 V or equal to or higher than 500 V, the effect of using the SiC-MOSFET as the transistor 520 may become significant.

Also, a parasitic diode is formed between the source and drain of the transistor 520. The above described parasitic diode allows the passage of the current flowing between the wire 106 and the electric storage unit 210 in the charge direction. On the other hand, the above described parasitic diode suppresses the flow of the current between the wire 106 and the electric storage unit 210 in the discharge direction via the parasitic diode.

The transistor 520 may be an example of the first current adjusting unit or the second current adjusting unit. The parasitic diode of the transistor 520 may be an example of a first bypass unit or a second bypass unit. Note that, apart from the parasitic diode of the transistor 520, the switching unit 230 may include a rectifier that has a function similar to that of the parasitic diode and is connected in parallel with the transistor 520 between the wire 106 and the electric storage unit 210. Examples of the above described rectifier include (i) a rectifying element such as a diode and (ii) a rectifying circuit configured with a plurality of elements.

As described above, according to the present embodiment, the switching unit 230 includes (i) the transistor 520 that adjusts the current in the discharge direction and (ii) the parasitic diode that is arranged in parallel with the transistor 520 and that allows the passage of the current in the charge direction but does not allow the passage of the current in the discharge direction. Because of this, when the charge of the electric storage system 100 further proceeds, and the voltage of the wire 106 becomes higher than the voltage of the positive terminal 212 of the electric storage unit 210, the current starts flowing between the wire 106 and the electric storage unit 210 in the charge direction via the parasitic diode of the transistor 520.

If the deterioration or damage of the electric storage unit 210 due to over discharge is to be prevented, the module control unit 1040 needs to prevent the flow of the current in the discharge direction but may not need to prevent the flow of the current in the charge direction. Here, according to the present embodiment, the module control unit 1040 monitors the current flowing between the wire 106 and the electric storage unit 210.

In an embodiment, the module control unit 1040 detects the current flowing between the wire 106 and the electric storage unit 210 in the charge direction. In another embodiment, the module control unit 1040 may detect the current flowing between the wire 106 and the electric storage unit 210 when the switching unit 230 electrically disconnects the wire 106 and the electric storage unit 210 in the discharge direction.

After the charge of the electric storage system 100 is started and until the above described current is detected, the module control unit 1040 maintains the interlock for the protection against over discharge. On the other hand, if the above described current has been detected, the module control unit 1040 releases the interlock for the protection against over discharge.

In an embodiment, the module control unit 1040 controls the switching unit 230 and electrically connects the wire 106 and the electric storage unit 210. In general, because the value of the ON-resistance of the transistor 520 is lower than the resistance value of the parasitic diode, according to the present embodiment, the charge and discharge efficiency of the electric storage unit 210 is improved.

If the above described current has been detected in the state that the above described voltage differential does not satisfy the condition for realizing the rapid hot-swap, the module control unit 1040 may control the switching unit 230 such that the switching unit 230 electrically connects the wire 106 and the electric storage unit 210 at least until the above described voltage differential satisfies the condition for realizing the rapid hot-swap. Note that while the above described voltage differential satisfies the condition for realizing the rapid hot-swap, the module control unit 1040 may control the switching unit 230 such that the switching unit 230 electrically connects the wire 106 and the electric storage unit 210.

In another embodiment, if the above described current has been detected, the module control unit 1040 may transmit to the protecting unit 250 a signal for resetting the function of protection against over discharge. Then, upon receiving the signal for resetting the function of protection against over discharge, the protecting unit 250 may control the switching unit 230 and electrically connect the wire 106 and the electric storage unit 210.

If the charge of the electric storage system 100 further proceeds after the wire 106 and the electric storage unit 210 are electrically connected, the voltage or SOC of the electric storage unit 210 becomes higher than the threshold for the protection against over discharge. If the voltage or SOC of the electric storage unit 210 has become higher than the threshold for the protection against over discharge, the protecting unit 250 may transmit to the module control unit 1040 a signal for resetting the function of protection against over discharge. Upon receiving the signal for resetting the function of protection against over discharge, the module control unit 1040 may control the switching unit 230 such that the switching unit 230 electrically connects the electric storage unit 210 and the wire 106.

Note that, as described above, if it has been decided that the function of protection against over discharge is to be enabled, the module control unit 1040, for example, (i) electrically disconnects the wire 106 and the electric storage unit 210 or (ii) reduces the magnitude of the current that may flow between the wire 106 and the electric storage unit 210 in the discharge direction. If the function of protection against over discharge is enabled, the magnitude of the current that may flow in the discharge direction thereby becomes smaller than in a case in which the function of protection against over discharge is disabled. On the other hand, if it has been decided that the interlock of the protection against over discharge is to be released (in some cases, referred to as disabling the function of protection against over discharge), the module control unit 1040, for example, (i) electrically connects the wire 106 and the electric storage unit 210 or (ii) increases the magnitude of the current that may flow between the wire 106 and the electric storage unit 210 in the discharge direction.

The module control unit 1040 adjusts or controls the magnitude of the current flowing between the wire 106 and the electric storage unit 210 in the discharge direction by adjusting the resistance value or the conduction ratio (in some cases, referred to as duty ratio) of the switching unit 230. In an embodiment, if the switching unit 230 includes the transistor 520, and the transistor 520 is a field effect transistor, the module control unit 1040 can adjust or control the magnitude of the current flowing between the wire 106 and the electric storage unit 210 in the discharge direction by adjusting the gate voltage of the transistor 520 (in some cases, referred to as input voltage). The module control unit 1040 may adjust or control the magnitude of the current flowing between the wire 106 and the electric storage unit 210 in the discharge direction by controlling the operation of the element(s) arranged in a circuit for adjusting the input voltage of the transistor 520.

In another embodiment, if the switching unit 230 includes the transistor 520, and the transistor 520 is a bipolar transistor, the module control unit 1040 can adjust or control the magnitude of the current flowing between the wire 106 and the electric storage unit 210 in the discharge direction by adjusting the base current of the transistor 520 (in some cases, referred to as input current). The module control unit 1040 may adjust or control the magnitude of the current flowing between the wire 106 and the electric storage unit 210 in the discharge direction by controlling the operation of the element(s) arranged in the circuit for adjusting the input current of the transistor 520.

The resistance value or conduction ratio of the switching unit 230 in a case in which the function of protection against over discharge is enabled and the resistance value or conduction ratio of the switching unit 230 in a case in which the function of protection against over discharge is disabled may be the same or different. If the switching unit 230 has a switching element, the ON-resistance of the switching element in a case in which the function of protection against overcharge is enabled and the ON-resistance of the switching element in a case in which the function of protection against overcharge is disabled may be the same or different. If the switching unit 230 has a variable resistor, the resistance value of the variable resistor in the case in which the function of protection against overcharge is enabled and the resistance value of the variable resistor in the case in which the function of protection against overcharge is disabled may be the same or different. If the function of protection against over discharge is enabled, the module control unit 1040 may control the switching unit 230 such that the resistance value of the switching unit 230 becomes higher than in the case in which the function of protection against over discharge is disabled. If the function of protection against over discharge is enabled, the module control unit 1040 may control the switching unit 230 such that the conduction ratio of the switching unit 230 becomes lower than in the case in which the function of protection against over discharge is disabled.

The above in the present embodiment has described, in order to simplify the description, a procedure in which the module control unit 1040 releases the interlock of the protection against over discharge, illustrating as an example the embodiment in which (i) if it has been decided that the function of protection against over discharge is to be enabled, the module control unit 1040 electrically disconnects the wire 106 and the electric storage unit 210 and (ii) if it has been decided that the function of protection against over discharge is to be disabled, the module control unit 1040 electrically connects the wire 106 and the electric storage unit 210. However, it should be understood by the person skilled in the art who has accessed the description of the present specification, that the module control unit 1040 may release the interlock of the protection against over discharge in a procedure similar to that of the present embodiment also in another embodiment in which (i) if it has been decided that the function of protection against over discharge is to be enabled, the module control unit 1040 reduces the magnitude of the current that may flow between the wire 106 and the electric storage unit 210 in the discharge direction and (ii) if it has been decided that the function of protection against over discharge is to be disabled, the module control unit 1040 increases the magnitude of the current that may flow between the wire 106 and the electric storage unit 210 in the discharge direction.

Specifically, if the function of protection against over discharge is to be enabled, in the present embodiment, a series of operation of the module control unit 1040 for electrically disconnecting the wire 106 and the electric storage unit 210 corresponds to a series of operation of the module control unit 1040 for reducing the current that may flow between the electric storage unit 210 and the wire 106 in the above described another embodiment. Similarly, if the function of protection against over discharge is to be disabled, in the present embodiment, a series of operation of the module control unit 1040 for electrically connecting the wire 106 and the electric storage unit 210 corresponds to a series of operation of the module control unit 1040 for increasing the current that may flow between the electric storage unit 210 and the wire 106 in the above described another embodiment.

Specific Examples of the Procedure for Releasing the Interlock of the Protection Against Overcharge If the voltage or SOC of the electric storage unit 210, for example, becomes higher than the threshold for the protection against overcharge when the electric storage system 100 is charged, with the electric storage unit 210 of the electric storage module 1010 electrically connected to the wire 106 of the electric storage system 100, the protecting unit 250 transmits to the module control unit 1040 a signal for enabling the function of protection against overcharge. At this time, the current flows between the wire 106 and the electric storage unit 210 in the charge direction. In this case, the charge direction may be an example of the first direction. Also, the discharge direction may be an example of the second direction. Note that, in the present embodiment, the discharge direction and the charge direction are opposite to each other.

The case in which the voltage or SOC of the electric storage unit 210 is higher than the threshold for the protection against overcharge may be an example of the case in which the condition for protecting the electric storage unit 210 is not satisfied. In another embodiment, the protecting unit 250 may transmit to the module control unit 1040 the signal for enabling the function of protection against overcharge if the voltage or SOC of the electric storage unit 210 is equal to or higher than the threshold for the protection against over discharge.

Upon receiving the above described signal, the module control unit 1040 controls the switching unit 230 and electrically disconnects the wire 106 and the electric storage unit 210. If the electric storage system 100 continues being charged also after the wire 106 and the electric storage unit 210 are electrically disconnected, a voltage differential will be caused between the wire 106 and the electric storage unit 210.

After the charge of the electric storage system 100 ends, and then when the discharge of the electric storage system 100 is started, a voltage differential is caused between the wire 106 and the electric storage unit 210. In this case, when an absolute value of the above described voltage differential is higher than the threshold for realizing the rapid hot-swap, the module control unit 1040 judges that the terminal voltage of the switching unit 230 does not satisfy the condition for realizing the rapid hot-swap. As a result, the discharge of the electric storage system 100 proceeds, with the electric storage unit 210 of the electric storage module 1010 and the wire 106 of the electric storage system 100 electrically disconnected.

On the other hand, (i) when the absolute value of the above described voltage differential at the time of starting the discharge of the electric storage system 100 is lower than the threshold for realizing the rapid hot-swap or equal to or lower than the threshold, or (ii) when the charge of the electric storage system 100 proceeds, and the absolute value of the above described voltage differential has become lower than the threshold for realizing the rapid hot-swap or becomes equal to or lower than the threshold, the module control unit 1040 controls the switching unit 230 in an attempt to electrically connect the wire 106 and the electric storage unit 210. However, at this stage, the voltage or SOC of the electric storage unit 210 is higher than the threshold for the protection against overcharge. Because of this, the interlock mechanism of the module control unit 1040 is actuated. As a result, the module control unit 1040 is unable to control the switching unit 230 and to electrically connect the wire 106 and the electric storage unit 210.

In order for the module control unit 1040 to control the switching unit 230 and electrically connect the wire 106 and the electric storage unit 210, the above described interlock needs to be released by some logic. Although the method for releasing the above described interlock is not particularly limited, in the present embodiment, the module control unit 1040 decides whether or not to release the above described interlock, based on the current flowing between the wire 106 and the electric storage unit 210 or based on the information related to the current, and controls the operation of the switching unit 230.

Here, as described in association with FIG. 5, the switching unit 230 includes the transistor 510 that adjusts or controls the magnitude of the current flowing between the wire 106 and the electric storage unit 210 in the charge direction. Examples of the transistor 510 include a Si-MOSFET, an insulated gate bipolar transistor (IGBT), a SiC-MOSFET, and a GaN-MOSFET.

If the rated voltage of the electric storage unit 210 is relatively high, the transistor 510 is preferably a SiC-MOSFET. For example, if the maximum value of the rated voltage of the electric storage unit 210 is equal to or higher than 100 V, preferably equal to or higher than 200 V, more preferably equal to or higher than 300 V, further more preferably equal to or higher than 500 V, still further more preferably equal to or higher than 800 V, and is even further more preferably 1000 V, a SiC-MOSFET is used as the transistor 510. The advantage of the SiC-MOSFET, namely having the superior breakdown voltage characteristics but allowing little loss, can thereby be sufficiently demonstrated. If the maximum value of the rated voltage of the electric storage unit 210 is equal to or higher than 300 V or equal to or higher than 500 V, the effect of using the SiC-MOSFET as the transistor 510 may become significant.

Also, a parasitic diode is formed between the source and drain of the transistor 510. The above described parasitic diode allows the passage of the current flowing between the wire 106 and the electric storage unit 210 in the discharge direction. On the other hand, the above described parasitic diode suppresses the flow of the current between the wire 106 and the electric storage unit 210 in the charge direction via the parasitic diode.

The transistor 510 may be an example of the first current adjusting unit or the second current adjusting unit. The parasitic diode of the transistor 510 may be an example of the first bypass unit or the second bypass unit. Note that, apart from the parasitic diode of the transistor 510, the switching unit 230 may include a rectifier that has a function similar to that of the parasitic diode and is connected in parallel with the transistor 510 between the wire 106 and the electric storage unit 210. Examples of the above described rectifier include (i) a rectifying element such as a diode and (ii) a rectifying circuit configured with a plurality of elements.

As described above, according to the present embodiment, the switching unit 230 includes (i) the transistor 510 that adjusts the current in the charge direction and (ii) the parasitic diode that is arranged in parallel with the transistor 510 and that allows the passage of the current in the discharge direction but does not allow the passage of the current in the charge direction. Because of this, when the discharge of the electric storage system 100 further proceeds, and the voltage of the wire 106 becomes lower than the voltage of the positive terminal 212 of the electric storage unit 210, the current starts flowing between the wire 106 and the electric storage unit 210 in the discharge direction via the parasitic diode of transistor 510.

If the deterioration or damage of the electric storage unit 210 due to the overcharge is to be prevented, the module control unit 1040 needs to prevent the flow of the current in the charge direction but may not need to prevent the flow of the current in the discharge direction. Here, according to the present embodiment, the module control unit 1040 monitors the current flowing between the wire 106 and the electric storage unit 210.

In an embodiment, the module control unit 1040 detects the current flowing between the wire 106 and the electric storage unit 210 in the discharge direction. In another embodiment, the module control unit 1040 may detect the current flowing between the wire 106 and the electric storage unit 210 when the switching unit 230 electrically disconnects the wire 106 and the electric storage unit 210 in the charge direction.

After the discharge of the electric storage system 100 is started and until the above described current has been detected, the module control unit 1040 maintains the interlock for the protection against overcharge. On the other hand, if the above described current has been detected, the module control unit 1040 releases the interlock for the protection against overcharge.

In an embodiment, the module control unit 1040 controls the switching unit 230 and electrically connect the wire 106 and the electric storage unit 210. In general, because the value of the ON-resistance of the transistor 510 is lower than the resistance value of the parasitic diode, according to the present embodiment, the charge and discharge efficiency of the electric storage unit 210 is improved.

If the above described current has been detected in the state that the above described voltage differential does not satisfy the condition for realizing the rapid hot-swap, the module control unit 1040 may control the switching unit 230 such that the switching unit 230 electrically connects the wire 106 and the electric storage unit 210 at least until the above described voltage differential satisfies the condition for realizing the rapid hot-swap. Note that, while the above described voltage differential satisfies the condition for realizing the rapid hot-swap, the module control unit 1040 may control the switching unit 230 such that the switching unit 230 electrically connects the wire 106 and the electric storage unit 210.

In another embodiment, if the above described current has been detected, the module control unit 1040 may transmit to the protecting unit 250 a signal for resetting the function of protection against overcharge. Then, upon receiving the signal for resetting the function of protection against overcharge, the protecting unit 250 may control the switching unit 230 and electrically connect the wire 106 and the electric storage unit 210.

If the discharge of the electric storage system 100 further proceeds after the wire 106 and the electric storage unit 210 has been electrically connected, the voltage or SOC of the electric storage unit 210 becomes lower than the threshold for the protection against overcharge. If the voltage or SOC of the electric storage unit 210 has become lower than the threshold for the protection against overcharge, the protecting unit 250 may transmit to the module control unit 1040 a signal for resetting the function of protection against overcharge. Upon receiving the signal for resetting the function of protection against overcharge, the module control unit 1040 may control the switching unit 230 such that the switching unit 230 electrically connects the electric storage unit 210 and the wire 106.

Note that, as described above, if it has been decided that the function of protection against overcharge is to be enabled, the module control unit 1040, for example, (i) electrically disconnects the wire 106 and the electric storage unit 210 or (ii) reduces the magnitude of the current that may flow between the wire 106 and the electric storage unit 210 in the charge direction. If the function of protection against overcharge is enabled, the magnitude of the current that may flow in the charge direction thereby becomes smaller than in a case in which the function of protection against overcharge is disabled. On the other hand, if it has been decided that the interlock of the protection against overcharge is to be released (in some cases, referred to as disabling the function of protection against overcharge), the module control unit 1040, for example, (i) electrically connects the wire 106 and the electric storage unit 210 or (ii) increases the magnitude of the current that may flow between the wire 106 and the electric storage unit 210 in the charge direction.

The module control unit 1040 adjusts or controls the magnitude of the current flowing between the wire 106 and the electric storage unit 210 in the charge direction by adjusting the resistance value or the conduction ratio of the switching unit 230 (in some cases, referred to as duty ratio). In an embodiment, if the switching unit 230 includes the transistor 510, and the transistor 510 is a field effect transistor, the module control unit 1040 can adjust or control the magnitude of the current flowing between the wire 106 and the electric storage unit 210 in the charge direction by adjusting the gate voltage of the transistor 510 (in some cases, referred to as input voltage). The module control unit 1040 may adjust or control the magnitude of the current flowing between the wire 106 and the electric storage unit 210 in the charge direction by controlling the operation of the element(s) arranged in a circuit for adjusting the input voltage of the transistor 510.

In another embodiment, if the switching unit 230 includes the transistor 510, and the transistor 510 is a bipolar transistor, the module control unit 1040 can adjust or control the magnitude of the current flowing between the wire 106 and the electric storage unit 210 in the charge direction by adjusting the base current of the transistor 510 (in some cases, referred to as input current). The module control unit 1040 may adjust or control the magnitude of the current flowing between the wire 106 and the electric storage unit 210 in the charge direction by controlling the operation of the element(s) arranged in a circuit for adjusting the input current of the transistor 510.

The resistance value or conduction ratio of the switching unit 230 in a case in which the function of protection against overcharge is enabled and the resistance value or conduction ratio of the switching unit 230 in a case in which the function of protection against overcharge is disabled may be the same or different. If the switching unit 230 has a switching element, the ON-resistance of the switching element in the case in which the function of protection against overcharge is enabled and the ON-resistance of the switching element in the case in which the function of protection against overcharge is disabled may be the same or different. If the switching unit 230 has a variable resistor, the resistance value of the variable resistor in the case in which the function of protection against overcharge is enabled and the resistance value of the variable resistor in the case in which the function of protection against overcharge is disabled may be the same or different. If the function of protection against overcharge is enabled, the module control unit 1040 may control the switching unit 230 such that the resistance value of the switching unit 230 becomes higher than in the case in which the function of protection against overcharge is disabled. If the function of protection against overcharge is enabled, the module control unit 1040 may control the switching unit 230 such that the conduction ratio of the switching unit 230 becomes lower than in the case in which the function of protection against overcharge is disabled.

The above in the present embodiment has described, in order to simplify the description, a procedure in which the module control unit 1040 releases the interlock of the protection against overcharge, illustrating as an example the embodiment in which (i) if it has been decided that the function of protection against overcharge is to be enabled, the module control unit 1040 electrically disconnects the wire 106 and the electric storage unit 210 and (ii) if it has been decided that the function of protection against overcharge is to be disabled, the module control unit 1040 electrically connects the wire 106 and the electric storage unit 210. However, it should be understood by the person skilled in the art who has accessed the description of the present specification, that the module control unit 1040 may release the interlock of the protection against overcharge in a procedure similar to that of the present embodiment also in another embodiment in which (i) if it has been decided that the function of protection against overcharge is to be enabled, the module control unit 1040 reduces the magnitude of the current that may flow between the wire 106 and the electric storage unit 210 in the charge direction and (ii) if it has been decided that the function of protection against overcharge is to be disabled, the module control unit 1040 increases the magnitude of the current that may flow between the wire 106 and the electric storage unit 210 in the charge direction.

Specifically, if the function of protection against overcharge is to be enabled, in the present embodiment, a series of operation of the module control unit 1040 for electrically disconnecting the wire 106 and the electric storage unit 210 corresponds to a series of operation of the module control unit 1040 for reducing the current that may flow between the electric storage unit 210 and the wire 106 in the above described another embodiment. Similarly, if the function of protection against overcharge is to be disabled, in the present embodiment, a series of operation of the module control unit 1040 for electrically connecting the wire 106 and the electric storage unit 210 corresponds to a series of operation of the module control unit 1040 for increasing the current that may flow between the electric storage unit 210 and the wire 106 in the above described another embodiment.

As described above, according to the present embodiment, the module control unit 1040 can establish, for example, both the hot-swap function and the protection function of the electric storage unit 210 without significantly decrease the charge and discharge efficiency of the electric storage module 1010.

As described in association with FIG. 1, with respect to an electric storage module constituting part of a power supply for a small-scale system such as a household electric appliance, the number of electric storage cells connected in series is small, and also, the rated voltage thereof is approximately from 3.5 to 4.5 V. Because of this, if the electric storage module is implemented in a power supply or an electric storage module is detached from the power supply, with the system operating, it may be required to strictly manage the voltage of the electric storage module targeted for hot-swap and the voltage of the other electric storage module(s) constituting the power supply. Depending on the specification of the electric storage module, the tolerance for the voltage differential between the electric storage module targeted for hot-swap and the other electric storage module(s) constituting the power supply may be managed to be less than 1 V.

On the other hand, in recent years, enlarging the size of the electric storage modules has been advanced. For example, in small to mid size electric vehicles such as passenger cars, electric storage modules having the rated voltage of approximately from 300 to 400 V are used. Also, in large size electric vehicles such as electric buses, electric storage modules having the rated voltage of approximately from 500 to 800 V have come into use. As the rated voltage of an electric storage module becomes higher, the tolerance for the voltage differential between the electric storage module targeted for hot-swap and the other electric storage module(s) constituting the power supply becomes higher. For example, even if the voltage differential between one electric storage module constituting a power supply and the other electric storage module(s) constituting the power supply exceeds 1 V, the one electric storage module can be hot-swapped in some cases.

Although depending on the resistance or impedance of the electric storage module targeted for hot-swap, the voltage differential between the electric storage module targeted for hot-swap and the other electric storage module(s) constituting the power supply may be equal to or lower than 30 V, equal to or lower than 10 V, equal to or lower than 5 V, equal to or lower than 3 V, equal to or lower than 2 V, or equal to or lower than 1 V if the rated voltage of the electric storage module targeted for hot-swap is equal to or higher than 100 V. The voltage differential between the electric storage module targeted for hot-swap and the other electric storage module(s) constituting the power supply may be equal to or lower than one fifth, equal to or lower than one tenth, equal to or lower than one twentieth, equal to or lower than one thirtieth, equal to or lower than one fiftieth, equal to or lower than one hundredth, equal to or lower than one two hundredth, equal to or lower than one three hundredth, equal to or lower than one five hundredth, or equal to or lower than one thousandth of the rated voltage of the electric storage module targeted for hot-swap.

As described above, in the present embodiment, the current detecting element 1020 and the switching unit 230 are arranged between the positive terminal 112 of the electric storage module 1010 and the positive terminal 212 of the electric storage unit 210, and the positive terminal 212 of the electric storage unit 210 is electrically connected to the wire 106 via the switching unit 230. However, the arrangement of the current detecting element 1020 and the switching unit 230 is not limited to the present embodiment. In another embodiment, the current detecting element 1020 and the switching unit 230 are arranged between the negative terminal 114 of the electric storage module 1010 and the negative terminal 214 of the electric storage unit 210, and the negative terminal 214 of the electric storage unit 210 is electrically connected to the wire 106 via the switching unit 230.

Figure 11:
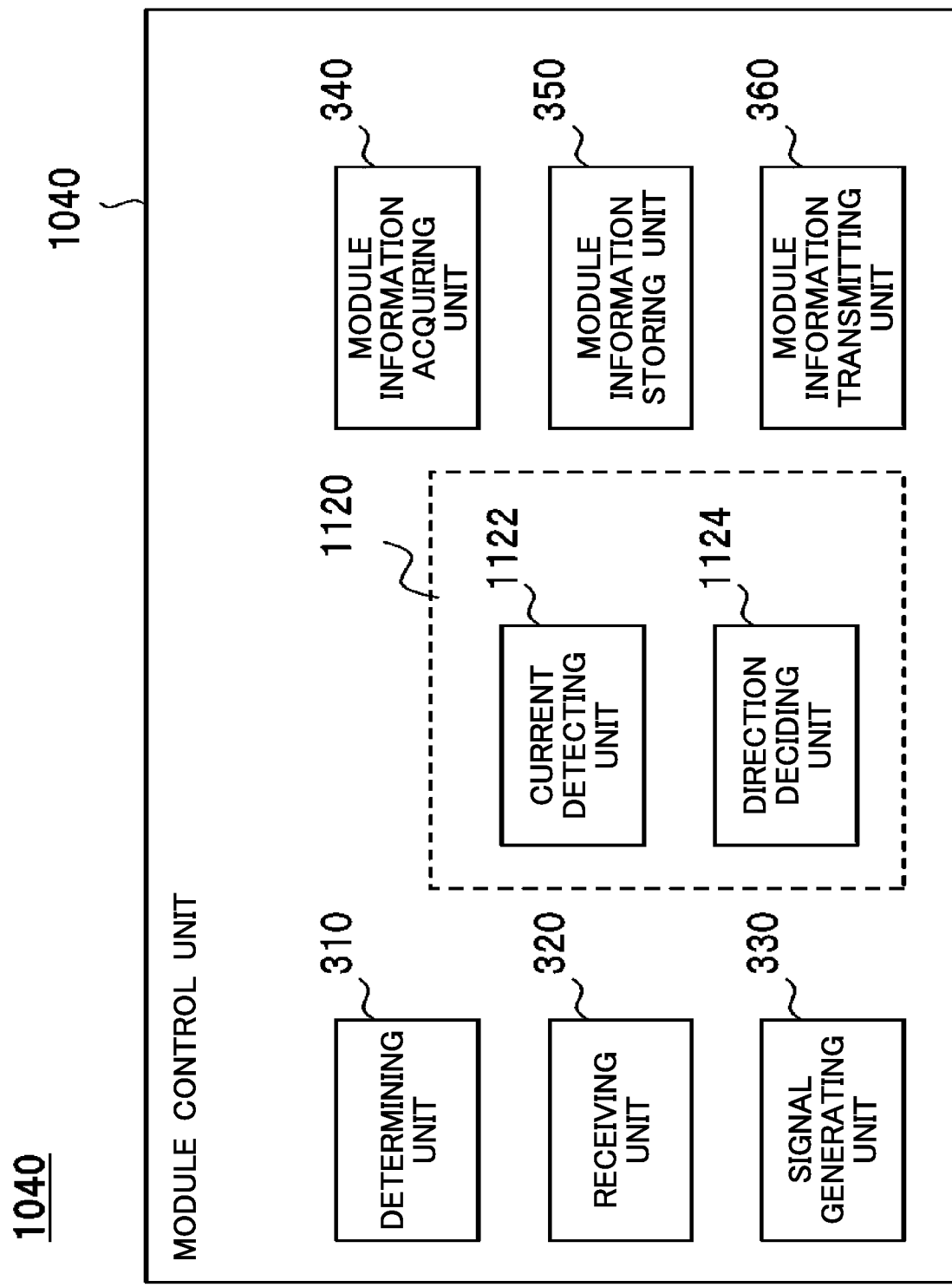
FIG. 11 schematically shows an example of a system configuration of a module control unit 1040.

FIG. 11 schematically shows an example of a system configuration of the module control unit 1040. In the present embodiment, the module control unit 1040 includes the determining unit 310, the receiving unit 320, and the signal generating unit 330. The module control unit 1040 may also include the module information acquiring unit 340, the module information storing unit 350, and the module information transmitting unit 360. In the present embodiment, the module control unit 1040 includes a current monitoring unit 1120. In the present embodiment, the current monitoring unit 1120 has a current detecting unit 1122 and a direction deciding unit 1124. The signal generating unit 330 may be an example of an operation control unit.

In the present embodiment, the module control unit 1040 differs from the module control unit 240 in that the module control unit 1040 includes the current monitoring unit 1120. With respect to the configuration other than the above described difference, the module control unit 1040 may have the features similar to those of the corresponding configuration of the module control unit 240.

In the present embodiment, the current monitoring unit 1120 monitors the current flowing between the wire 106 of the electric storage system 100 and the electric storage unit 210 of the electric storage module 1010. For example, the current monitoring unit 1120 monitors the current flowing between the positive terminal 112 and the positive terminal 212 of the electric storage module 1010.

In the present embodiment, the current detecting unit 1122 detects the current flowing between the wire 106 of the electric storage system 100 and the electric storage unit 210 of the electric storage module 1010. The current detecting unit 1122 may decide the magnitude of the above described current. The current detecting unit 1122 may be configured by an optional analog circuit or configured by an optional digital circuit.

In the present embodiment, the direction deciding unit 1124 decides the direction of the current flowing between the wire 106 of the electric storage system 100 and the electric storage unit 210 of the electric storage module 1010. The direction deciding unit 1124 may be configured by an optional analog circuit or configured by an optional digital circuit.

Figure 12:
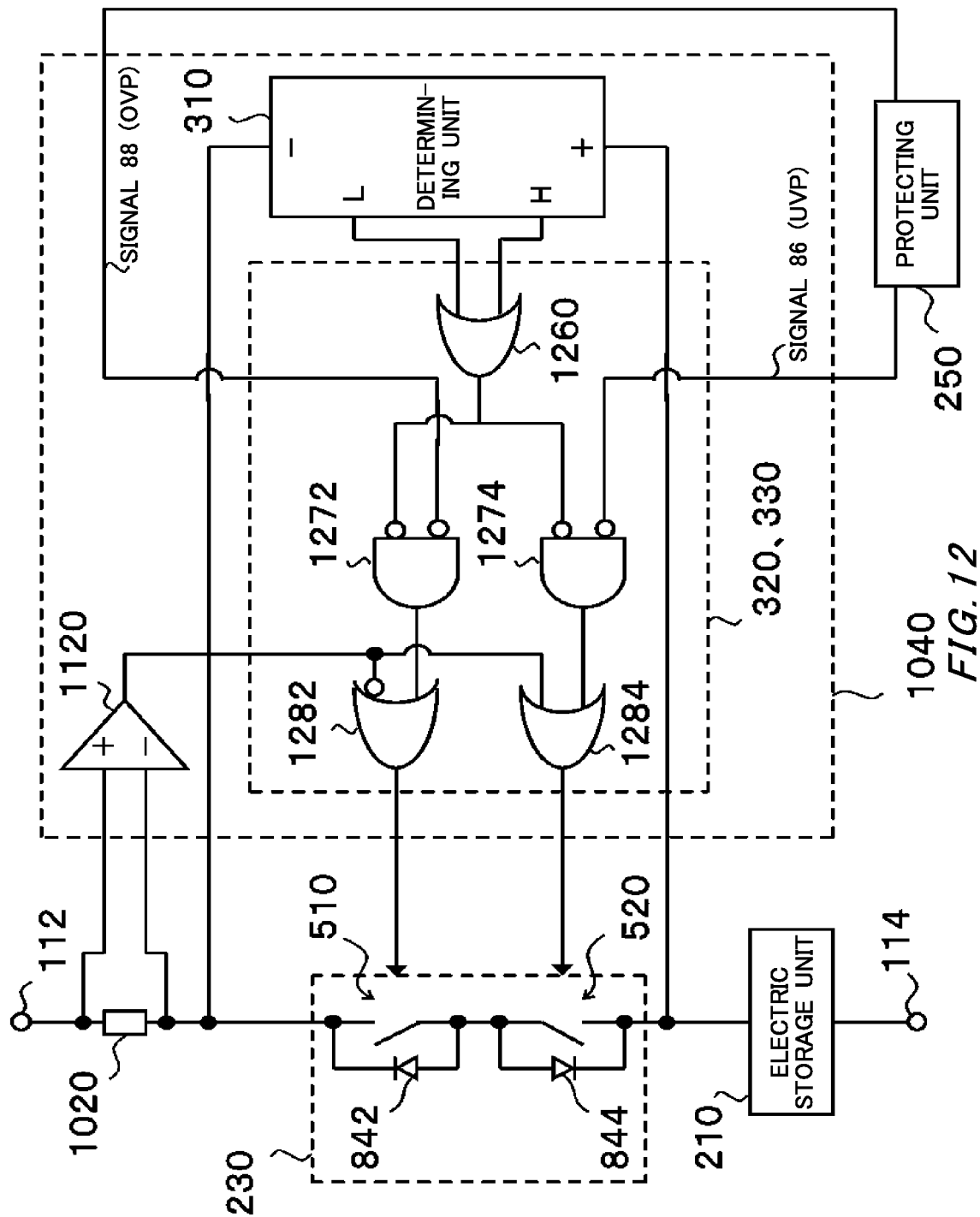
FIG. 12 schematically shows an example of a circuit configuration of the module control unit 1040.

FIG. 12 schematically shows an example of a circuit configuration of the module control unit 1040. FIG. 12 schematically shows an example of a circuit configuration of the switching unit 230. FIG. 12 shows an example of the switching unit 230 and an example of the module control unit 1040, together with the positive terminal 112, the negative terminal 114, the electric storage unit 210, the protecting unit 250, and the current detecting element 1020.

Specific Examples of the Circuit of the Switching Unit 230

In the present embodiment, one end of the transistor 510 is electrically connected to the wire 106, and the other end thereof is electrically connected to the electric storage unit 210. Between the wire 106 and the electric storage unit 210, the transistor 510 is connected in series with the transistor 520 and the parasitic diode 844. In the present embodiment, the transistor 510 adjusts the magnitude of the current flowing between the wire 106 and the electric storage unit 210 in the charge direction.

In the present embodiment, one end of the transistor 520 is electrically connected to the wire 106, and the other end thereof is electrically connected to the electric storage unit 210. Between the wire 106 and the electric storage unit 210, the transistor 520 is connected in series with the transistor 510 and the parasitic diode 842. In the present embodiment, the transistor 520 adjusts the magnitude of the current flowing between the wire 106 and the electric storage unit 210 in the discharge direction.

One end of the parasitic diode 842 is electrically connected to the wire 106, and other end thereof is electrically connected to the electric storage unit 210. Between the wire 106 and the electric storage unit 210, the parasitic diode 842 is connected in parallel with the transistor 510. Between the wire 106 and the electric storage unit 210, the parasitic diode 842 is connected in series with the transistor 520 and the parasitic diode 844.

The parasitic diode 842 allows the passage of the current flowing between the wire 106 and the electric storage unit 210 in the discharge direction. On the other hand, the parasitic diode 842 suppresses the flow of the current between the wire 106 and the electric storage unit 210 in the charge direction via the parasitic diode 842.

One end of the parasitic diode 844 is electrically connected to the wire 106, and the other end thereof is electrically connected to the electric storage unit 210. Between the wire 106 and the electric storage unit 210, the parasitic diode 844 is connected in parallel with the transistor 520. Between the wire 106 and the electric storage unit 210, the parasitic diode 844 is connected in series with the transistor 510 and the parasitic diode 842.

The parasitic diode 842 allows the passage of the current flowing between the wire 106 and the electric storage unit 210 in the charge direction. On the other hand, the parasitic diode 844 suppresses the flow of the current between the wire 106 and the electric storage unit 210 in the discharge direction via the parasitic diode 844.

The transistor 510 may be an example of one of the first current adjusting unit and the second current adjusting unit. The transistor 520 may be an example of the other one of the first current adjusting unit and the second current adjusting unit. The parasitic diode 842 may be an example of one of the first bypass unit and the second bypass unit. The parasitic diode 844 may be an example of the other one of the first bypass unit and the second bypass unit. The discharge direction may be an example of one of the first direction and the second direction. The charge direction may be an example of the other one of the first direction and the second direction.

Specific Examples of the Circuit of the Module Control Unit 1040

In the present embodiment, the module control unit 1040 includes the determining unit 310, the signal generating unit 330, and the current monitoring unit 1120. The determining unit 310 may be an example of a first deciding unit, a second deciding unit, and a third deciding unit.

In the present embodiment, the signal generating unit 330 includes an OR circuit 1260, an AND circuit 1272, an AND circuit 1274, an OR circuit 1282, and an OR circuit 1284. Also, in the present embodiment, between the positive terminal 112 and the switching unit 230, a resistor having an appropriate resistance value is arranged as the current detecting element 1020. The resistance value of the current detecting element 1020 is decided, for example, such that the current monitoring unit 1120 can certainly determine the direction of the current flowing between the wire 106 and the electric storage unit 210.

In the present embodiment, the determining unit 310 determines whether or not the terminal voltage of the switching unit 230 is within a predetermined range. The determining unit 310 transmits to the signal generating unit 330 a signal indicating the determination result. The determining unit 310 may be configured by an optional analog circuit or configured by an optional digital circuit. The determining unit 310 may include a window comparator. The window comparator can be realized, for example, by using two comparators.

In the present embodiment, the determining unit 310 has two input terminals. To one of the input terminals of the determining unit 310 (shown as a −terminal in the drawing), the voltage of one end of the switching unit 230 (for example, the end on the positive terminal 112 side) is input. To the other input terminal of the determining unit 310 (shown as a +terminal in the drawing), the voltage of the other end of the switching unit 230 (for example, the end on the electric storage unit 210 side) is input.

In the present embodiment, the determining unit 310 has two output terminals. As a signal indicating the determination result, the determining unit 310 outputs from one of the output terminals (shown as L terminal in the drawing) a signal indicating that the terminal voltage of the switching unit 230 is lower than a first threshold. For example, if the terminal voltage of the switching unit 230 is lower than the first threshold, the determining unit 310 outputs H logic from the L terminal. On the other hand, if the terminal voltage of the switching unit 230 is equal to or higher than the first threshold, the determining unit 310 outputs L logic from the L terminal.

Also, as a signal indicating the determination result, the determining unit 310 outputs from the other output terminal (shown as H terminal in the drawing) a signal indicating that the terminal voltage of the switching unit 230 is higher than a second threshold. In the present embodiment, as the absolute value of the second threshold, a value higher than the absolute value of the first threshold is set. For example, if the terminal voltage of the switching unit 230 is higher than the second threshold, the determining unit 310 outputs H logic from the H terminal. On the other hand, if the terminal voltage of the switching unit 230 is equal to or lower than the second threshold, the determining unit 310 outputs L logic from the H terminal.

In an embodiment, the determining unit 310 can decide, for example, whether or not the voltage or SOC of the electric storage unit 210 matches a first condition. Examples of the first condition include (i) a condition indicating that the voltage or SOC of the electric storage unit is outside a predetermined first numerical range, (ii) a condition indicating that the voltage or SOC of the electric storage unit is higher than a predetermined first threshold, and (iii) a condition indicating that the voltage or SOC of the electric storage unit is equal to or higher than the first threshold. The first condition may be a condition indicating that the electric storage unit 210 is overcharged, for example.

In another embodiment, the determining unit 310 can decide, for example, whether or not the voltage or SOC of the electric storage unit 210 matches a second condition. Examples of the second condition include (i) a condition indicating that the voltage or SOC of the electric storage unit is outside a predetermined second numerical range, (ii) a condition indicating that the voltage or SOC of the electric storage unit is lower than a predetermined second threshold, and (iii) a condition indicating that the voltage or SOC of the electric storage unit is equal to or lower than the second threshold. Note that the second condition may be a condition different from the first condition. The second condition is a condition indicating that the electric storage unit 210 is over discharged, for example.

In still another embodiment, the determining unit 310 can decide, for example, whether or not the terminal voltage of the switching unit 230 matches a third condition. Examples of the third condition include (i) a condition indicating that the terminal voltage of the switching unit 230 is within a predetermined third numerical range, (ii) a condition indicating that the terminal voltage of the switching unit 230 is lower than a predetermined third threshold, and (iii) a condition indicating that the terminal voltage of the switching unit 230 is equal to or lower than the third threshold.

In still another embodiment, the determining unit 310 can decide, for example, whether or not the terminal voltage of the switching unit 230 matches a fourth condition. Examples of the fourth condition include (i) a condition indicating that the terminal voltage of the switching unit 230 is outside a predetermined fourth numerical range, (ii) a condition indicating that the terminal voltage of the switching unit 230 is higher than a predetermined fourth threshold, and (iii) a condition indicating that the terminal voltage of the switching unit 230 is equal to or higher than the fourth threshold. The fourth numerical range may be the same as the third numerical range. The upper limit value in the fourth numerical range may be higher than the upper limit value in the third numerical range. The fourth threshold may be the same as the third threshold. The fourth threshold may be higher than the third threshold.

In the present embodiment, the current monitoring unit 1120 may include a comparator. The current monitoring unit 1120 has, for example, two input terminals and one output terminal. To one of the input terminals of the current monitoring unit 1120 (shown as a +terminal in the drawing), the voltage of one end of the current detecting element 1020 (for example, the end on the positive terminal 112 side) is input. To the other input terminal of the current monitoring unit 1120 (shown as a −terminal in the drawing), the voltage of the other end of the current detecting element 1020 (for example, the end on the switching unit 230 side) is input.

For example, if the voltage input to the +terminal is higher than the voltage input to the −terminal, the current monitoring unit 1120 outputs H logic from the output terminal. On the other hand, if the voltage input to the +terminal is lower than the voltage input to the −terminal, the current monitoring unit 1120 outputs L logic from the output terminal. Also, if the voltage input to the +terminal and the voltage input to the −terminal are equal, or if both of the voltages can be regarded as equal, the current monitoring unit 1120 does not output a signal from the output terminal.

In the present embodiment, when at least one of the transistor 510 and the transistor 520 electrically disconnects the wire 106 and the electric storage unit 210, the current monitoring unit 1120 detects the current flowing between the wire 106 and the electric storage unit 210. In an embodiment, when the function of protection against overcharge is enabled, the current monitoring unit 1120 detects the current flowing between the wire 106 and the electric storage unit 210 in the discharge direction. In another embodiment, when the function of protection against over discharge is enabled, the current monitoring unit 1120 detects the current flowing between the wire 106 and the electric storage unit 210 in the charge direction.

In the present embodiment, the signal generating unit 330 may also have the function of the receiving unit 320. For example, the signal generating unit 330 receives from the protecting unit 250 the signal 86 for enabling the function of protection against over discharge. Also, the signal generating unit 330 receives from the protecting unit 250 the signal 88 for enabling the function of protection against overcharge. The signal generating unit 330 receives from the determining unit 310 information related to the terminal voltage of the switching unit 230. The signal generating unit 330 receives from the current monitoring unit 1120 information related to the current between the wire 106 and the electric storage unit 210.

In the present embodiment, the signal generating unit 330 can control the operation of at least one of the transistor 510 and the transistor 520 based on (i) voltage or SOC of the electric storage unit 210 and (ii) the detection result of the current monitoring unit 1120. The signal generating unit 330 can control the operation of at least one of the transistor 510 and the transistor 520 based on (i) the voltage or SOC of the electric storage unit 210, (ii) the detection result of the current monitoring unit 1120, and (iii) the determination result of the determining unit 310. The signal generating unit 330 may control at least one of the transistor 510 and the transistor 520 by outputting a signal for controlling the operation of at least one of the transistor 510 and the transistor 520 to the transistor targeted for the control by the signal.

In the present embodiment, if the determining unit 310 has decided that the terminal voltage of the switching unit 230 matches the fourth condition, the signal generating unit 330 may output to at least one of the transistor 510 and the transistor 520 a signal for executing the operation for electrically disconnecting the wire 106 and the electric storage unit 210 or the operation for reducing the current flowing between the wire 106 and the electric storage unit 210. The determining unit 310 may thereby be used also as the overcurrent protection function of the electric storage unit 210.

In the present embodiment, the OR circuit 1260 has two input terminals and one output terminal. To one of the input terminals of the OR circuit 1260, the output from the H terminal of the determining unit 310 is input. To the other input terminal of the OR circuit 1260, the output from the L terminal of the determining unit 310 is input.

The OR circuit 1260 outputs logical sum (OR) of the two inputs. For example, if the terminal voltage of the switching unit 230 stays in a particular numerical range, the OR circuit 1260 outputs L logic. On the other hand, if the terminal voltage of the switching unit 230 is outside the particular numerical range, the OR circuit 1260 outputs the H logic. For example, if the terminal voltage of the switching unit 230 is higher than a particular value, which is as an example in which the switching unit 230 matches the above described fourth condition, the H logic is output from the H terminal of the determining unit 310. In this case, the OR circuit 1260 outputs the H logic.

In the present embodiment, the AND circuit 1272 has two input terminals and one output terminal. To one of the input terminals of the AND circuit 1272, a signal produced by inverting the output of the OR circuit 1260 is input. To the other input terminal of the AND circuit 1272, a signal produced by inverting the signal 88 for enabling the function of protection against overcharge is input.

The AND circuit 1272 outputs logical product (AND) of the two inputs. For example, if the terminal voltage of the switching unit 230 stays in a particular numerical range (specifically, if the absolute value of the difference between the voltage of the wire 106 and the voltage of the electric storage unit 210 is lower than a particular threshold or equal to or lower than the threshold), and if the voltage or SOC of the electric storage unit 210 is lower than the threshold for the protection against overcharge, the AND circuit 1272 outputs the H logic. On the other hand, in the case other than the above, the AND circuit 1272 outputs L logic.

In the present embodiment, the AND circuit 1274 has two input terminals and one output terminal. T one of the input terminals of the AND circuit 1274, a signal produced by inverting the output of the OR circuit 1260 is input. To the other input terminal of the AND circuit 1274, a signal produced by inverting the signal 86 for enabling the function of protection against over discharge is input.

The AND circuit 1274 outputs logical product (AND) of the two inputs. For example, if the terminal voltage of the switching unit 230 stays in a particular numerical range (specifically, if the absolute value of the difference between the voltage of the wire 106 and the voltage of the electric storage unit 210 is lower than a particular threshold or equal to or lower than the particular threshold), and if the voltage or SOC of the electric storage unit 210 is higher than the threshold for the protection against over discharge, the AND circuit 1274 outputs the H logic. On the other hand, in the case other than the above, the AND circuit 1274 outputs L logic.

In the present embodiment, the OR circuit 1282 has two input terminals and one output terminal. To one of the input terminals of the OR circuit 1282, a signal produced by inverting the output of the current monitoring unit 1120 is input. To the other input terminal of the OR circuit 1282, the output of the AND circuit 1272 is input.

The OR circuit 1282 outputs logical sum (OR) of the two inputs. For example, if the output of the OR circuit 1282 is H logic, the transistor 510 is turned on, and if the output of the OR circuit 1282 is L logic, the transistor 510 is turned off. In an embodiment, if the current flows between the wire 106 and the electric storage unit 210 in the discharge direction, the OR circuit 1282 outputs H logic. In another embodiment, if the terminal voltage of the switching unit 230 stays in a particular numerical range, and if the voltage or SOC of the electric storage unit 210 is lower than the threshold for the protection against overcharge, the OR circuit 1282 outputs H logic.

In the present embodiment, the OR circuit 1284 has two input terminals and one output terminal. To one of the input terminals of the OR circuit 1284, the output of the current monitoring unit 1120 is input. To the other input terminal of the OR circuit 1284, the output of the AND circuit 1274 is input.

The OR circuit 1284 outputs logical sum (OR) of the two inputs. For example, if the output of the OR circuit 1284 is H logic, the transistor 520 is turned on, and if the output of the OR circuit 1284 is L logic, the transistor 520 is turned off. In an embodiment, if the current flows between the wire 106 and the electric storage unit 210 in the charge direction, the OR circuit 1284 outputs H logic. In another embodiment, if the terminal voltage of the switching unit 230 stays in a particular numerical range, and if the voltage or SOC of the electric storage unit 210 is lower than the threshold for the protection against overcharge, the OR circuit 1284 outputs H logic.

Specific Examples of the Operation of the Signal Generating Unit 330

In an embodiment, if the determining unit 310 has decided that the voltage or SOC of the electric storage unit 210 matches the first condition, the signal generating unit 330, for example, outputs to the transistor 510 a signal for executing the operation for electrically disconnecting the wire 106 and the electric storage unit 210 or the operation for reducing the current flowing between the wire 106 and the electric storage unit 210 in the charge direction. Note that the signal generating unit 330 may output a signal to the transistor 520, depending on the content of the first condition.

In another embodiment, if the determining unit 310 has decided that the voltage or SOC of the electric storage unit 210 matches the second condition, the signal generating unit 330 outputs, for example, to the transistor 520 a signal for executing the operation for electrically disconnecting the wire 106 and the electric storage unit 210 or the operation for reducing the current flowing between the wire 106 and the electric storage unit 210 in the discharge direction. Note that the signal generating unit 330 may output a signal to the transistor 510, depending on the content of the second condition.

In still another embodiment, if the determining unit 310 has decided that the terminal voltage of the switching unit 230 matches the third condition, the signal generating unit 330 outputs to the transistor 510 and the transistor 520 a signal for executing the operation for electrically connecting the wire 106 and the electric storage unit 210 or the operation for increasing the current flowing between the wire 106 and the electric storage unit 210, regardless of whether or not the voltage or SOC of the electric storage unit 210 matches the first condition and the second condition. On the other hand, if the determining unit 310 has decided that the terminal voltage of the switching unit 230 does not match the third condition, the signal generating unit 330 may output a signal corresponding to the detection result of the current monitoring unit 1120. For example, the signal generating unit 330 outputs a signal as follows.

[In the case in which (a) the determining unit 310 has decided that the terminal voltage of the switching unit 230 does not match the third condition, and (b) the current monitoring unit 1120 has detected (i) the current flowing between the wire 106 and the electric storage unit 210 in the discharge direction when the function of protection against overcharge is enabled or (ii) the current flowing between the wire 106 and the electric storage unit 210 when the transistor 510 electrically disconnects the wire 106 and the electric storage unit.]

In this case, the signal generating unit 330 outputs to the transistor 510 a signal for executing the operation for electrically connecting the wire 106 and the electric storage unit 210 or the operation for increasing the current flowing between the wire 106 and the electric storage unit 210, regardless of whether or not the voltage or SOC of the electric storage unit 210 matches the first condition.

[In the case in which (a) the determining unit 310 has decided that the terminal voltage of the switching unit 230 does not match the third condition, and (c) the current monitoring unit 1120 has detected (i) the current flowing between the wire 106 and the electric storage unit 210 in the charge direction when the function of protection against over discharge is enabled or (ii) the current flowing between the wire 106 and the electric storage unit 210 when the transistor 520 electrically disconnects the wire 106 and the electric storage unit.]

In this case, the signal generating unit 330 outputs to the transistor 520 a signal for executing the operation for electrically connecting the wire 106 and the electric storage unit 210 or the operation for increasing the current flowing between the wire 106 and the electric storage unit 210, regardless of whether or not the voltage or SOC of the electric storage unit 210 matches the second condition.

In still another embodiment, the module control unit 1040 can suppress deterioration or damage of the electric storage unit 210 due to the overcurrent. As described above, if the terminal voltage of the switching unit 230 is higher than the particular value, which is as an example in which the switching unit 230 matches the above described fourth condition, the OR circuit 1260 outputs H logic.

Because of this, if the current flows between the wire 106 and the electric storage unit 210 in the discharge direction and if the terminal voltage of the switching unit 230 is higher than the particular value, the L logic is output from the OR circuit 1282. As a result, the transistor 510 is turned off. Similarly, if the current flows between the wire 106 and the electric storage unit 210 in the charge direction, and if the terminal voltage of the switching unit 230 is higher than the particular value, L logic is output from the OR circuit 1284. As a result, the transistor 520 is turned off.

According to the present embodiment, the constant flow of the current into the parasitic diode 842 and the parasitic diode 844 can be suppressed. As a result, the terminal voltage of the switching unit 230 and the current flowing via the transistor 510 and the transistor 520 can be regarded as proportional to each other. Here, the determining unit 310 and the signal generating unit 330 can be used as the overcurrent protection circuit by appropriately setting the resistance value of the current detecting element 1020 and by connecting in series with the current detecting element 1020 the resistor having an appropriate resistance value between the wire 106 and the electric storage unit 210.

Figure 13:
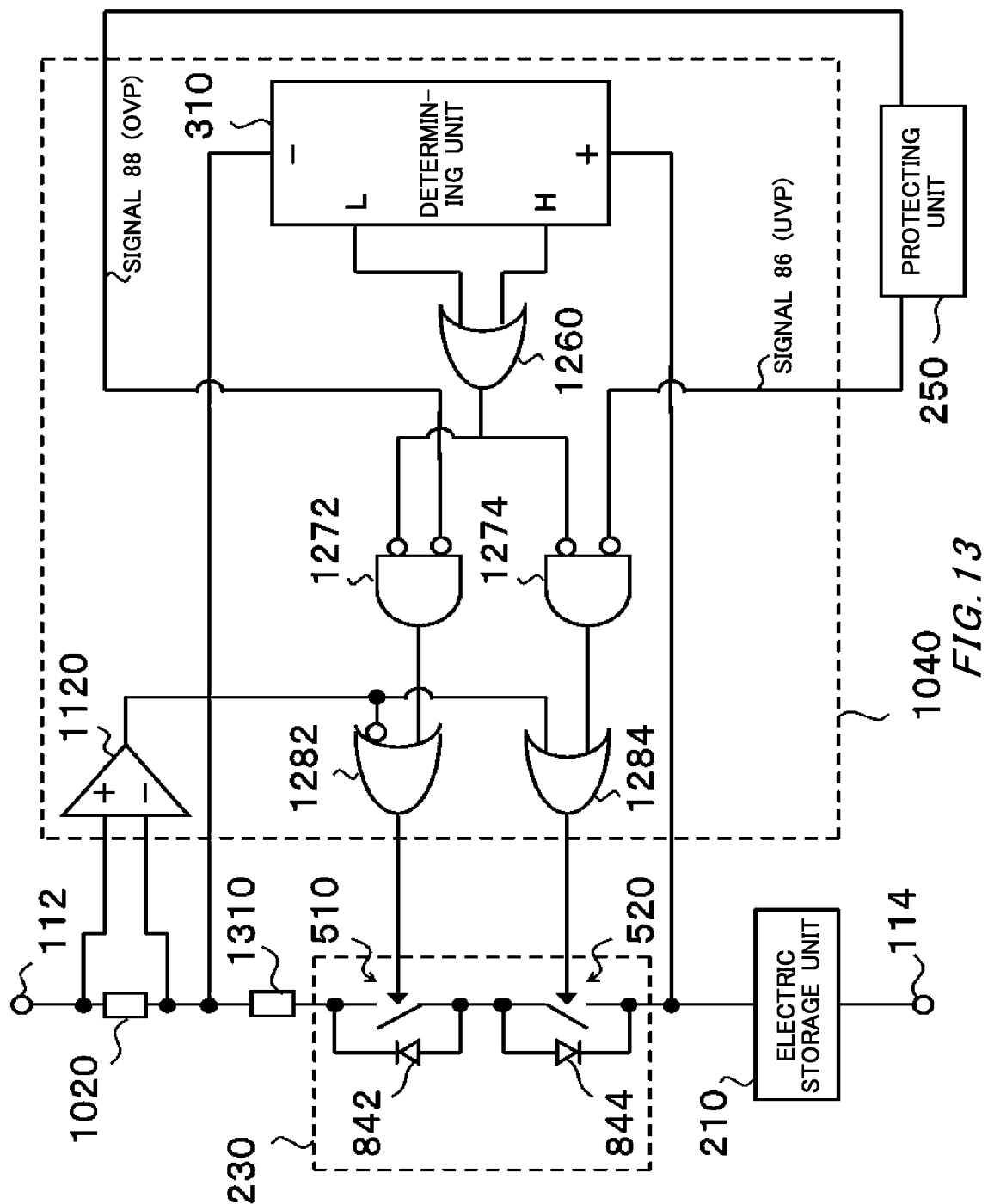
FIG. 13 schematically shows an example of a circuit configuration of the module control unit 1040.

FIG. 13 schematically shows an example of a circuit configuration of the module control unit 1040. The module control unit 1040 disclosed in FIG. 13 differs from the module control unit 1040 described in association with FIG. 12 in that the module control unit 1040 includes a resistor 1310 between the current detecting element 1020 and the electric storage unit 210. With respect to the configuration other than the above described difference, the module control unit 1040 disclosed in FIG. 13 may have the features similar to those of the corresponding configuration of the module control unit 1040 described in association with FIG. 12.

As described above, the determining unit 310 and the signal generating unit 330 can be used as the overcurrent protection circuit by appropriately setting the resistance value of the resistor 1310. The resistance value of the resistor 1310 is decided, for example, such that the determining unit 310 can certainly determine whether or not the value of the load current stays within a predetermined numerical range. Also, the resistor 1310 may be used as the current detecting element instead of the current detecting element 1020. In this case, the electric storage module 1010 may not include the current detecting element 1020.

Figure 14:
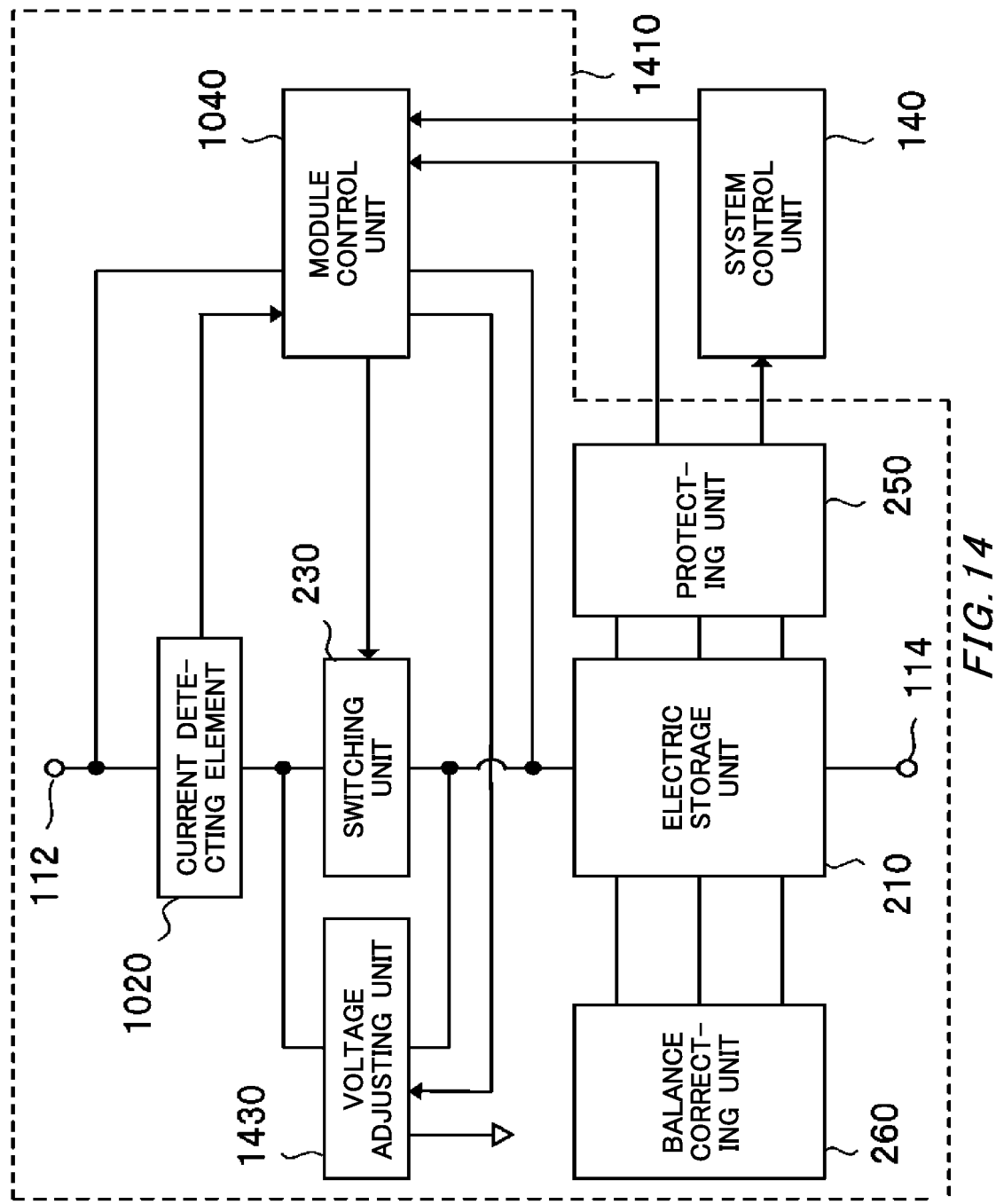
FIG. 14 schematically shows an example of a system configuration of an electric storage module 1410.

FIG. 14 schematically shows an example of a system configuration of an electric storage module 1410. In the present embodiment, the electric storage module 1410 includes a voltage adjusting unit 1430 and differs from the electric storage module 1010 in that the module control unit 1040 controls the operation of the voltage adjusting unit 1430. With respect to the configuration other than the above described difference, the electric storage module 1410 may have the features similar to those of the corresponding configuration of the electric storage module 1010. The voltage adjusting unit 1430 may be an example of a first switching element and a second switching element.

Figure 15:
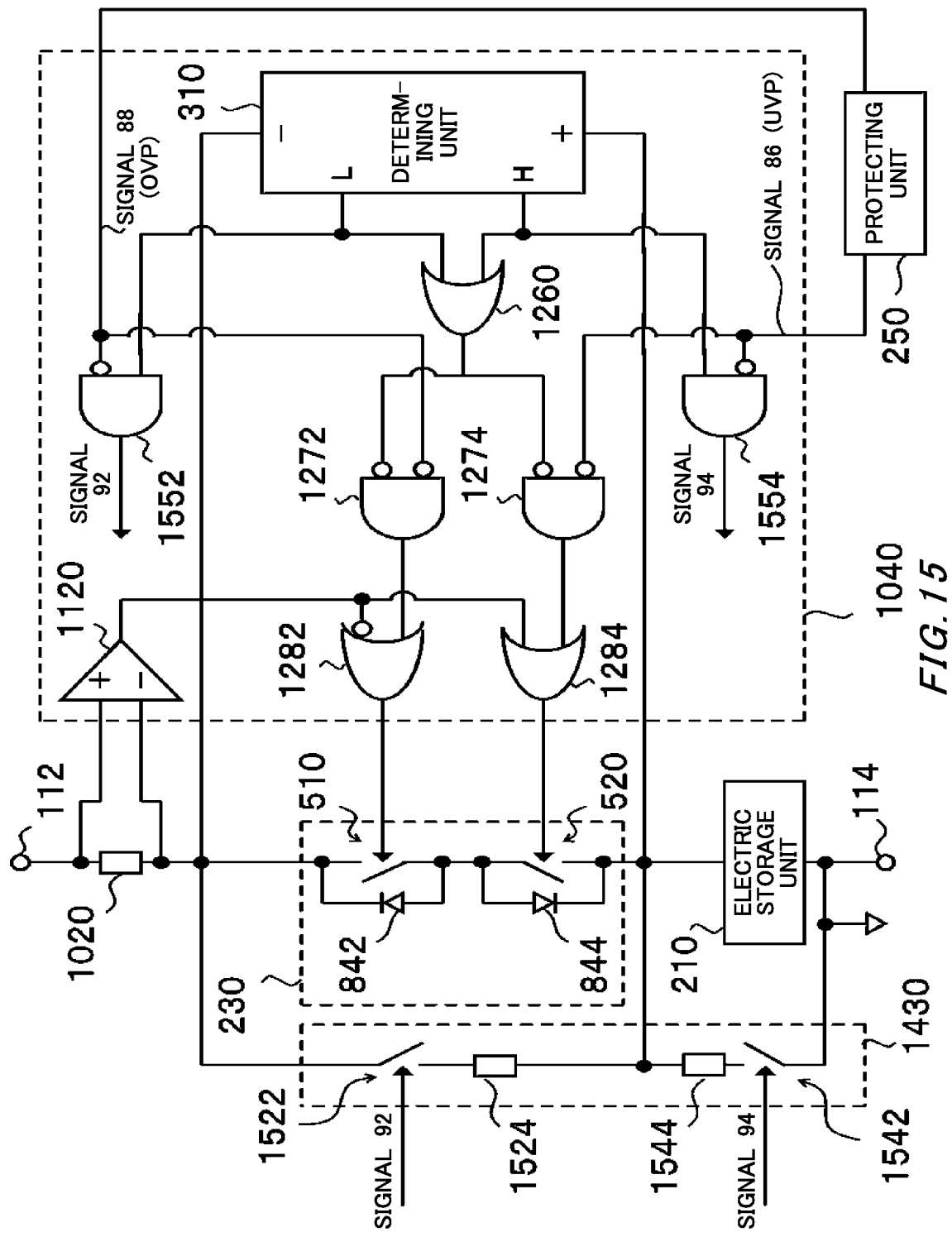
FIG. 15 schematically shows an example of a system configuration of a circuit configuration of a voltage adjusting unit 1430.

FIG. 15 schematically shows an example of a circuit configuration of the voltage adjusting unit 1430. Also, FIG. 15 schematically shows an example of a circuit configuration of the module control unit 1040 of the electric storage module 1410.

In the present embodiment, the voltage adjusting unit 1430 includes a transistor 1522 and a resistor 1524. In the present embodiment, the voltage adjusting unit 1430 includes a transistor 1542 and a resistor 1544. The transistor 1522 may be an example of the first switching element. The transistor 1542 may be an example of the second switching element.

In the present embodiment, the module control unit 1040 of the electric storage module 1410 differs from the module control unit 1040 of the electric storage module 1010 in that the signal generating unit 330 (not shown in the drawing) includes an AND circuit 1552 and an AND circuit 1554. With respect to the configuration other than the above described differences, the module control unit 1040 of the electric storage module 1410 may have the features similar to those of the corresponding configuration of the module control unit 1040 of the electric storage module 1010.

In the present embodiment, between the wire 106 and the electric storage unit 210, the transistor 1522 is connected in parallel with the switching unit 230. For example, one end of the transistor 1522 is electrically connected to one end of the switching unit 230. One end of the transistor 1522 may be electrically connected to the wire 106 via the positive terminal 112. On the other hand, the other end of the transistor 1522 is electrically connected to the other end of the switching unit 230. The other end of the transistor 1522 may be electrically connected to the electric storage unit 210.

According to the present embodiment, the electric storage module can easily be hot-swapped. However, for example, if the electric storage system 100 is an apparatus whose frequency of usage is low such as an emergency power supply, after part of the plurality of electric storage modules included the electric storage system 100 is(are) replaced, it may take time until the replaced electric storage module(s) is(are) electrically connected to the wire 106 of the electric storage system 100. Even in such a case, the transistor 1522 can electrically connect the wire 106 and the electric storage unit 210 of the electric storage module 1410 at an optional timing.

In the present embodiment, the resistor 1524 decides the magnitude of the current flowing through the transistor 1522 when the transistor 1522 is turned on. The resistance value of the resistor 1524 is decided such that an excessive current does not flow through the transistor 1522 when the transistor 1522 is turned on. In an embodiment, the resistance value of the resistor 1524 is decided such that the resistance value of the path that electrically connects the wire 106 and the electric storage unit 210 via the transistor 1522 becomes higher than the resistance value of the path that electrically connects the wire 106 and the electric storage unit 210 via the switching unit 230.

In another embodiment, the resistance value of the resistor 1524 may be decided based on 'the time required to charge the electric storage unit 210 from the first SOC to the second SOC at a particular charging voltage when the transistor 1522 is turned on'. For example, the first SOC is 25%, and the second SOC is 75%. The first SOC may be 20%, and the second SOC may be 80%. Also, the first SOC may be 10%, and the second SOC may be 90%. The first SOC may be 0%, and the second SOC may be 100%. Examples of the above described time include 12 hours, 18 hours, 24 hours, 36 hours, 48 hours, 72 hours, 1 week, 10 days, 15 days, 1 month, 2 months, 3 months, and 6 months.

In the present embodiment, one end of the transistor 1542 is electrically connected to the positive terminal 212 of the electric storage unit 210, and the other end thereof is electrically connected to the negative terminal 214 of the electric storage unit 210 or the reference potential. The electric storage unit 210 can thereby be discharged at an optional timing. As a result, the transistor 1542 can adjust the difference between the voltage of the wire 106 and the voltage of the electric storage unit 210 of the electric storage module 1410 at an optional timing. For example, even if the electric storage system 100 is an apparatus whose frequency of usage is low, the electric storage module 1410 can electrically connect the wire 106 and the electric storage unit 210 of the electric storage module 1410 at an optional timing.

In the present embodiment, the resistor 1544 decides the magnitude of the current flowing through the transistor 1542 when the transistor 1542 is turned on. The resistance value of the resistor 1544 is decided such that an excessive current does not flow through the transistor 1542 when the transistor 1542 is turned on. In an embodiment, the resistance value of the resistor 1544 is decided such that the resistance value of the path that electrically connects one end and the other end of the electric storage unit 210 via the transistor 1542 becomes higher than the resistance value of the path that electrically connects the wire 106 and the electric storage unit 210 via the switching unit 230.

In another embodiment, the resistance value of the resistor 1544 may be decided based on 'the time required to discharge the electric storage unit 210 from the first SOC to the second SOC when the transistor 1542 is turned on'. For example, the first SOC is 75%, and the second SOC is 25%. The first SOC may be 80%, and the second SOC may be 20%. Also, the first SOC may be 90%, and the second SOC may be 10%. The first SOC may be 100%, and the second SOC may be 0%. Examples of the above described time include 12 hours, 18 hours, 24 hours, 36 hours, 48 hours, 72 hours, 1 week, 10 days, 15 days, 1 month, 2 months, 3 months, and 6 months.

In the present embodiment, the AND circuit 1552 has two input terminals and one output terminal. To one of the input terminals of the AND circuit 1552, a signal produced by inverting the signal 88 for enabling the function of protection against overcharge is input. To the other input terminal of the AND circuit 1552, the output from the L terminal of the determining unit 310 is input. The AND circuit 1552 outputs logical product (AND) of the two inputs. The signal 92 having been output from the AND circuit 1552 is input to the input terminal of the transistor 1522.

In the present embodiment, the AND circuit 1554 has two input terminals and one output terminal. To one of the input terminals of the AND circuit 1554, a signal produced by inverting the signal 86 for enabling the function of protection against over discharge is input. To the other input terminal of the AND circuit 1554, the output from the H terminal of the determining unit 310 is input. The AND circuit 1554 outputs logical product (AND) of the two inputs. The signal 94 having been output from the AND circuit 1554 is input to the input terminal of the transistor 1522.

The module control unit 1040 can thereby, for example, control the operation of the transistor 1522 based on (i) voltage or SOC of the electric storage unit 210, (ii) the voltage of the wire 106, and (iii) the voltage of the positive terminal 212 of the electric storage unit 210. Also, the module control unit 1040 can, for example, control the operation of the transistor 1542 based on (i) the voltage or SOC of the electric storage unit 210, (ii) the voltage of the wire 106, and (iii) the voltage of the positive terminal 212 of the electric storage unit 210.

Figure 16:
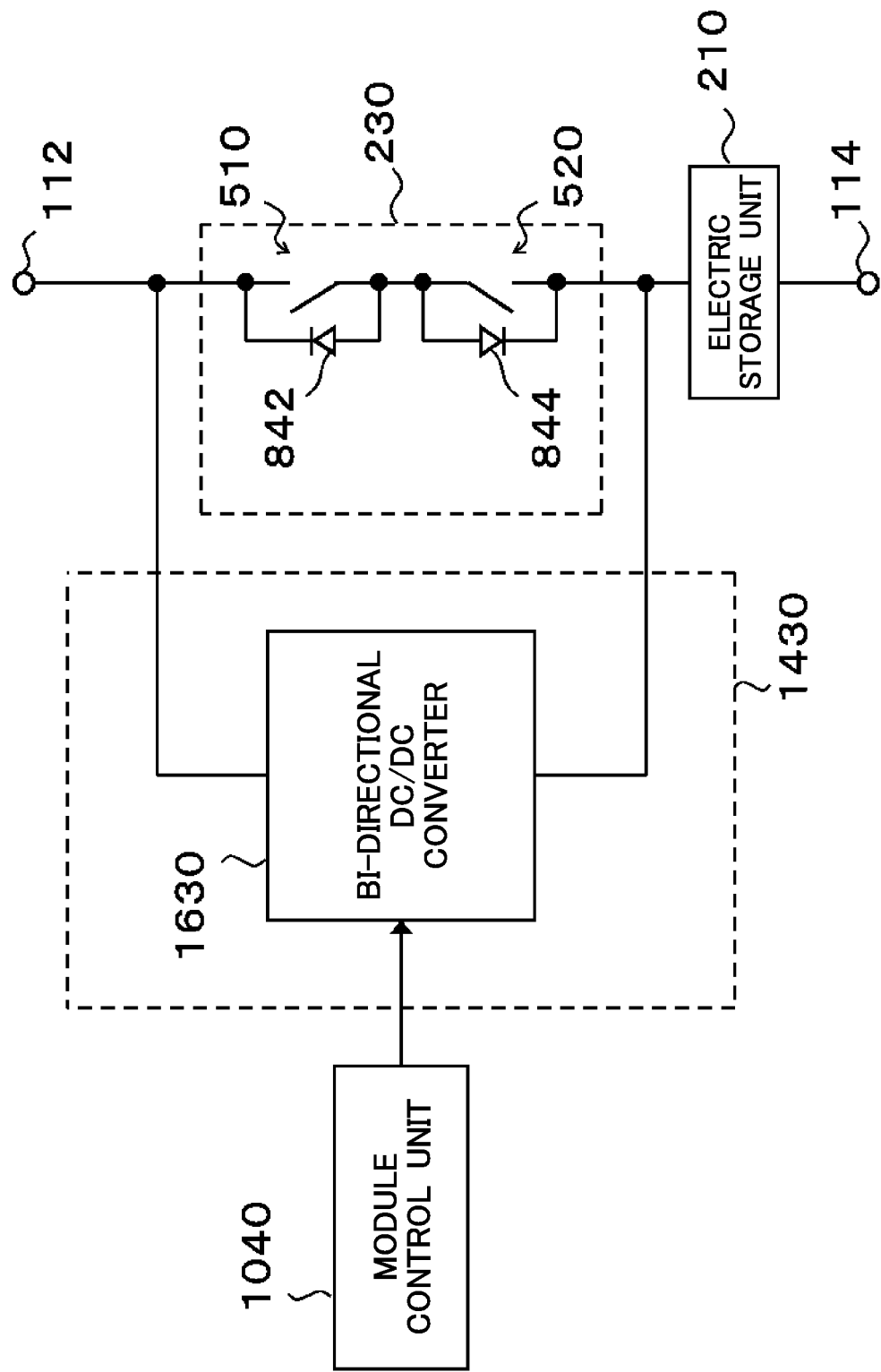
FIG. 16 schematically shows an example of the voltage adjusting unit 1430.

FIG. 16 schematically shows an example of the voltage adjusting unit 1430. The voltage adjusting unit 1430 disclosed in FIG. 16 differs from the voltage adjusting unit 1430 described in association with FIG. 15 in that the voltage adjusting unit 1430 has a bi-directional DC-DC converter 1630 instead of the transistor 1522 and the resistor 1544. With respect to the configuration other than the above described difference, the voltage adjusting unit 1430 disclosed in FIG. 16 may have the features similar to those of the corresponding configuration of the voltage adjusting unit 1430 described in association with FIG. 15.

In the present embodiment, the bi-directional DC-DC converter 1630 is connected in parallel with the switching unit 230 between the wire 106 and the electric storage unit 210. For example, one end of the bi-directional DC-DC converter 1630 is electrically connected to one end of the switching unit 230. One end of the bi-directional DC-DC converter 1630 may be electrically connected to the wire 106 via the positive terminal 112. On the other hand, the other end of the bi-directional DC-DC converter 1630 is electrically connected to the other end of the switching unit 230. The other end of the bi-directional DC-DC converter 1630 may be electrically connected to the electric storage unit 210.

The rated current value of the bi-directional DC-DC converter 1630 may be lower than the rated current value of the switching unit 230. The specification of the bi-directional DC-DC converter 1630 may be decided based on 'the time required to charge the electric storage unit 210 from the first SOC to the second SOC when the bi-directional DC-DC converter 1630 is actuated'. For example, the first SOC is 25%, and the second SOC is 75%. The first SOC may be 20%, and the second SOC may be 80%. Also, the first SOC may be 10%, and the second SOC may be 90%. The first SOC may be 0%, and the second SOC may be 100%. Examples of the above described time include 12 hours, 18 hours, 24 hours, 36 hours, 48 hours, 72 hours, 1 week, 10 days, 15 days, 1 month, 2 months, 3 months, and 6 months.

The specification of the bi-directional DC-DC converter 1630 may be decided based on 'the time required to discharge the electric storage unit 210 from the first SOC to the second SOC when the bi-directional DC-DC converter 1630 is actuated'. For example, the first SOC is 75%, and the second SOC is 25%. The first SOC may be 80%, and the second SOC may be 20%. The first SOC may be 90%, and the second SOC may be 10%. The first SOC may be 100%, and the second SOC may be 0%. Examples of the above described time include 12 hours, 18 hours, 24 hours, 36 hours, 48 hours, 72 hours, 1 week, 10 days, 15 days, 1 month, 2 months, 3 months, and 6 months. Examples of the specification of the bi-directional DC-DC converter 1630 include the rated current value and the rated power value.

If a bi-directional DC-DC converter is used in order to be a complete alternative to the switching unit 230, a large and expensive bi-directional DC-DC converter is used. However, according to the present embodiment, the bi-directional DC-DC converter 1630, for example, transfers an electrical energy from one electric storage module 1410 to another electric storage module 1410 by using the period during which the electric storage system 100 is stopped. Because of this, the ability of the bi-directional DC-DC converter 1630 may be significantly lower than in the case in which a bi-directional DC-DC converter is used in order to be a complete alternative to the switching unit 230.

In the present embodiment, the bi-directional DC-DC converter 1630 may be controlled by the module control unit 1040. The module control unit 1040 controls, for example, the operation of the bi-directional DC-DC converter 1630 based on (i) the voltage or SOC of the electric storage unit 210, (ii) the voltage of the wire 106, and (iii) the voltage of the positive terminal 212 of the electric storage unit 210.

According to the present embodiment, the bi-directional DC-DC converter 1630 can transfer from the electric storage unit 210 to the wire 106 an electrical energy at an optional timing. Also, the bi-directional DC-DC converter 1630 can transfer from the wire 106 to the electric storage unit 210 an electrical energy at an optional timing.

Figure 17:
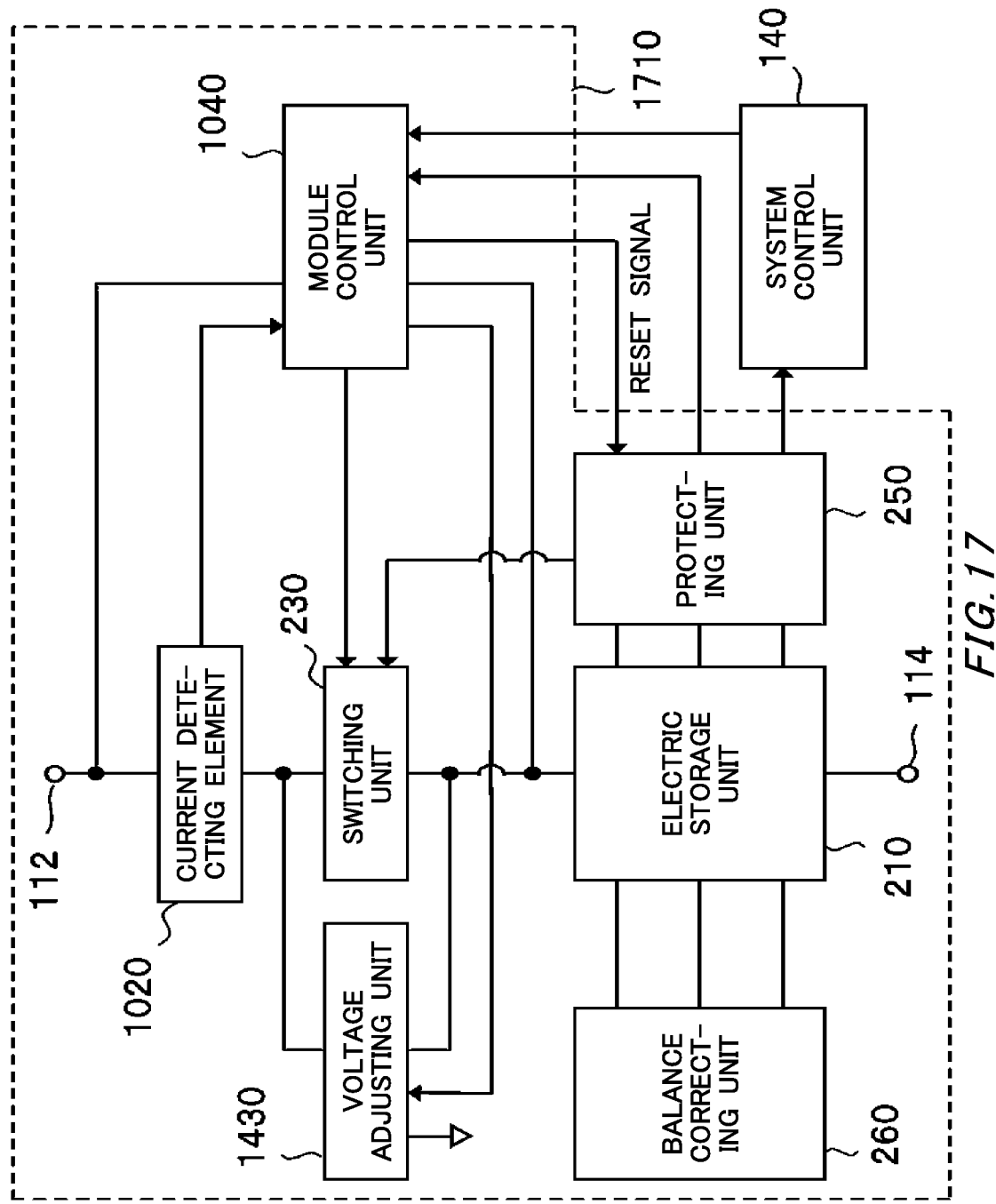
FIG. 17 schematically shows an example of a system configuration of an electric storage module 1710.

FIG. 17 schematically shows an example of a system configuration of an electric storage module 1710. In the present embodiment, the electric storage module 1710 differs from the electric storage module 1410 and the like in that the module control unit 1040 transmits to the protecting unit 250 at least one of a reset signal of the protection against over discharge and a reset signal of the protection against overcharge upon deciding to release at least one of the interlock of the protection against over discharge and the interlock of the protection against overcharge. Also, the electric storage module 1710 differs from the electric storage module 1410 and the like in that the protecting unit 250 releases at least one of the interlock of the protection against over discharge and the interlock of the protection against overcharge by controlling the switching unit 230 upon receiving the reset signal. With respect to the configuration other than the above described differences, the electric storage module 1710 may have the features similar to those of the corresponding configuration of the electric storage module 1410 and the like.

While the embodiments of the present invention have been described, the technical scope of the invention is not limited to the above described embodiments. It is apparent to persons skilled in the art that various alterations and improvements can be added to the above-described embodiments. Also, unless a technical contradiction occurs, the matters described in a particular embodiment can be applied to another embodiment. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE NUMERALS

12: load device; 14: charging device; 52: signal; 54: signal; 82: signal; 86: signal; 88: signal; 92: signal; 94: signal; 100: electric storage system; 102: connection terminal; 104: connection terminal; 106: wire; 110: electric storage module; 112: positive terminal; 114: negative terminal; 120: electric storage module; 122: positive terminal; 124: negative terminal; 140: system control unit; 210: electric storage unit; 212: positive terminal; 214: negative terminal; 222: electric storage cell; 224: electric storage cell; 230: switching unit; 240: module control unit; 250: protecting unit; 260: balance correcting unit; 310: determining unit; 320: receiving unit; 330: signal generating unit; 340: module information acquiring unit; 350: module information storing unit; 360: module information transmitting unit; 410: state managing unit; 420: module selecting unit; 430: signal generating unit; 510: transistor; 512: resistor; 514: resistor; 516: diode; 520: transistor; 522: resistor; 524: resistor; 526: diode; 530: transistor; 532: resistor; 540: transistor; 542: resistor; 552: resistor; 554: resistor; 560: transistor; 570: capacitor; 572: resistor; 580: transistor; 592: switch; 594: switch; 630: switching unit; 632: relay; 710: electric storage module; 730: switching unit; 842: parasitic diode; 844: parasitic diode; 852: logic circuit; 854: logic circuit; 900: electric storage system; 902: diode; 904: diode; 1010: electric storage module; 1020: current detecting element; 1040: module control unit; 1120: current monitoring unit; 1122: current detecting unit; 1124: direction deciding unit; 1260: OR circuit; 1272: AND circuit; 1274: AND circuit; 1282: OR circuit; 1284: OR circuit; 1310: resistor; 1410: electric storage module; 1430: voltage adjusting unit; 1522: transistor; 1524: resistor; 1542: transistor; 1544: resistor; 1552: AND circuit; 1554: AND circuit; 1630: bi-directional DC-DC converter; 1710: electric storage module

What is claimed is:
1. A control device for controlling an adjusting unit that adjusts current flowing between an electric storage unit of an electric storage device configured such that the electric storage device can be connected in parallel with a distinct power supply device, and a wire that electrically connects the electric storage device and the distinct power supply device, wherein the adjusting unit comprises:

a first current adjusting unit
(i) one end of which is electrically connected to the wire, (ii) other end of which is electrically connected to the electric storage unit, and (iii) that adjusts at least magnitude of current flowing between the wire and the electric storage unit in a first direction; and a first bypass unit that is connected in parallel with the first current adjusting unit between the wire and the electric storage unit, wherein the first bypass unit allows passage of current flowing between the wire and the electric storage unit in a second direction and suppresses flow of current between the wire and the electric storage unit in the first direction via the first bypass unit, wherein the second direction is a direction opposite to the first direction, and wherein the control device comprises:

a current detecting unit that detects (i) current flowing between the wire and the electric storage unit in the second direction or (ii) current flowing between the wire and the electric storage unit when the first current adjusting unit electrically disconnects the wire and the electric storage unit; and an operation control unit that controls operation of the first current adjusting unit based on (i) voltage or SOC of the electric storage unit and (ii) a detection result of the current detecting unit.

2. The control device according to claim 1, wherein the operation control unit (a) controls the first current adjusting unit such that the first current adjusting unit electrically connects the wire and the electric storage unit if the voltage or SOC of the electric storage unit satisfies a condition related to a battery characteristic of the electric storage unit, (b) controls the first current adjusting unit such that magnitude of current flowing in the first direction becomes smaller than in a case in which the first current adjusting unit electrically disconnects the wire and the electric storage unit, or in which the voltage or SOC of the electric storage unit satisfies the condition related to the battery characteristic, if the voltage or SOC of the electric storage unit does not satisfy the condition related to the battery characteristic and if the current detecting unit has not detected the current, and (c) controls the first current adjusting unit such that the first current adjusting unit electrically connects the wire and the electric storage unit or such that magnitude of current flowing between the wire and the electric storage unit becomes larger if the current detecting unit has detected the current in a state that the first current adjusting unit electrically disconnects the wire and the electric storage unit, or in a state that the first current adjusting unit is controlled such that magnitude of current flowing in the first direction becomes smaller than in a case in which the voltage or SOC of the electric storage unit satisfies the condition related to the battery characteristic.

3. The control device according to claim 1, wherein the operation control unit controls operation of the first current adjusting unit based on (i) the voltage or SOC of the electric storage unit, (ii) the detection result of the current detecting unit, and (iii) terminal voltage of the adjusting unit.

4. The control device according to claim 3, wherein the operation control unit (a) controls the first current adjusting unit such that the first current adjusting unit electrically connects the wire and the electric storage unit if the terminal voltage of the adjusting unit satisfies a condition related to hot-swap of the electric storage device, (b) controls the first current adjusting unit such that the first current adjusting unit electrically disconnects the wire and the electric storage unit if the terminal voltage of the adjusting unit does not satisfy the condition related to the hot-swap and if the current detecting unit has not detected the current, and (c) controls the first current adjusting unit such that the first current adjusting unit electrically connects the wire and the electric storage unit at least until the terminal voltage of the adjusting unit satisfies the condition related to the hot-swap if the current detecting unit has detected the current in a state that the terminal voltage of the adjusting unit does not satisfy the condition related to the hot-swap.

5. The control device according to claim 1, wherein the adjusting unit further comprises:

a second current adjusting unit that is arranged between the wire and the electric storage unit and adjusts at least magnitude of current flowing between the wire and the electric storage unit in the second direction; and a second bypass unit that is connected in parallel with the second current adjusting unit between the wire and the electric storage unit, wherein the second bypass unit allows passage of current flowing between the wire and the electric storage unit in the first direction and suppresses flow of current between the wire and the electric storage unit in the second direction via the first bypass unit, wherein the second current adjusting unit is connected in series with the first current adjusting unit and the first bypass unit between the wire and the electric storage unit, wherein the second bypass unit is connected in series with the first current adjusting unit and the first bypass unit between the wire and the electric storage unit, wherein the current detecting unit further detects (i) current flowing between the wire and the electric storage unit in the first direction or (ii) current flowing between the wire and the electric storage unit when the second current adjusting unit electrically disconnects the wire and the electric storage unit, wherein the operation control unit controls operation of at least one of the first current adjusting unit and the second current adjusting unit based on (i) the voltage or SOC of the electric storage unit and (ii) the detection result of the current detecting unit, wherein the operation control unit has:

a first deciding unit that decides whether or not the voltage or SOC of the electric storage unit matches a first condition;

a second deciding unit that decides whether or not the voltage or SOC of the electric storage unit matches a second condition;

a third deciding unit that decides whether or not terminal voltage of the adjusting unit matches a third condition; and an output unit that outputs a signal for controlling operation of at least one of the first current adjusting unit and the second current adjusting unit based on (i) a decision result of at least one of the first deciding unit and the second deciding unit, (ii) a decision result of the third deciding unit, and (iii) the detection result of the current detecting unit, and wherein the second condition is a condition different from the first condition.

6. The control device according to claim 5, wherein the output unit (a) outputs to the first current adjusting unit a signal for executing operation for electrically disconnecting the wire and the electric storage unit or operation for reducing current flowing between the wire and the electric storage unit in the first direction if the first deciding unit has decided that the voltage or SOC of the electric storage unit matches the first condition, (b) outputs to the second current adjusting unit a signal for executing operation for electrically disconnecting the wire and the electric storage unit or operation for reducing current flowing between the wire and the electric storage unit in the second direction if the second deciding unit has decided that the voltage or SOC of the electric storage unit matches the second condition, (c-1) outputs to the first current adjusting unit and the second current adjusting unit a signal for executing operation for electrically connecting the wire and the electric storage unit or operation for increasing current flowing between the wire and the electric storage unit, regardless of the decision result of the first deciding unit and the second deciding unit if the third deciding unit has decided that the terminal voltage of the adjusting unit matches the third condition (c-2-1) outputs to the first current adjusting unit a signal for executing operation for electrically connecting the wire and the electric storage unit or operation for increasing current flowing between the wire and the electric storage unit, regardless of the decision result of the first deciding unit if the current detecting unit has detected (i) current flowing between the wire and the electric storage unit in the second direction or (ii) current flowing between the wire and the electric storage unit when the first current adjusting unit electrically disconnects the wire and the electric storage unit, in a case in which the third deciding unit has decided that the terminal voltage of the adjusting unit does not match the third condition, and (c-2-2) outputs to the second current adjusting unit a signal for executing operation for electrically connecting the wire and the electric storage unit or operation for increasing current flowing between the wire and the electric storage unit, regardless of the decision result of the second deciding unit if the current detecting unit has detected (i) current flowing between the wire and the electric storage unit in the first direction or (ii) current flowing between the wire and the electric storage unit when the second current adjusting unit electrically disconnects the wire and the electric storage unit, in a case in which the third deciding unit has decided that the terminal voltage of the adjusting unit does not match the third condition.

7. The control device according to claim 5, wherein the first condition is (i) a condition indicating that the voltage or SOC of the electric storage unit is outside a predetermined first numerical range, (ii) a condition indicating that the voltage or SOC of the electric storage unit is higher than a predetermined first threshold, or (iii) a condition indicating that the voltage or SOC of the electric storage unit is equal to or higher than the first threshold.

8. The control device according to claim 5, wherein the second condition is (i) a condition indicating that the voltage or SOC of the electric storage unit is outside a predetermined second numerical range, (ii) a condition indicating that the voltage or SOC of the electric storage unit is lower than a predetermined second threshold, or (iii) a condition indicating that the voltage or SOC of the electric storage unit is equal to or lower than the second threshold.

9. The control device according to claim 5, wherein the third condition is a (i) condition indicating that the terminal voltage of the adjusting unit is within a predetermined third numerical range, (ii) a condition indicating that the terminal voltage of the adjusting unit is lower than a predetermined third threshold, or (iii) a condition indicating that the terminal voltage of the adjusting unit is equal to or lower than the third threshold.

10. The control device according to claim 5, wherein
the third deciding unit further decides whether or not the terminal voltage of the adjusting unit matches a fourth condition, and
wherein the output unit outputs to at least one of the first current adjusting unit and the second current adjusting unit a signal for executing operation for electrically disconnecting the wire and the electric storage unit or operation for reducing current flowing between the wire and the electric storage unit
if the third deciding unit has decided that the terminal voltage of the adjusting unit matches the fourth condition.

11. The control device according to claim 10, wherein the fourth condition is (i) a condition indicating that the terminal voltage of the adjusting unit is outside a predetermined fourth numerical range, (ii) a condition indicating that the terminal voltage of the adjusting unit is higher than a predetermined fourth threshold, or (iii) a condition indicating that the terminal voltage of the adjusting unit is equal to or higher than the fourth threshold.

12. The control device according to claim 1, wherein one end of the adjusting unit is electrically connected to the wire,
wherein other end of the adjusting unit is electrically connected to one end of the electric storage unit,
wherein the operation control unit further controls operation of a first switching element connected in parallel with the adjusting unit between the wire and the electric storage unit, and
wherein the operation control unit controls operation of the first switching element based on (i) the voltage or SOC of the electric storage unit, (ii) potential of the wire or voltage applied to the wire, and (iii) potential of the one end of the electric storage unit or voltage applied to the one end of the electric storage unit.

13. The control device according to claim 1, wherein one end of the adjusting unit is electrically connected to the wire,
wherein other end of the adjusting unit is electrically connected to one end of the electric storage unit,
wherein the operation control unit further controls operation of a second switching element, one end of which is electrically connected to the one end of the electric storage unit and other end of which is electrically connected to other end of the electric storage unit or reference potential, and wherein the operation control unit controls operation of the second switching element based on (i) the voltage or SOC of the electric storage unit, (ii) potential of the wire or voltage applied to the wire, and (iii) potential of the one end of the electric storage unit or voltage applied to the one end of the electric storage unit.

14. The control device according to claim 1, wherein one end of the adjusting unit is electrically connected to the wire, wherein other end of the adjusting unit is electrically connected to one end of the electric storage unit, and wherein the operation control unit further controls operation of a bi-directional DC-DC converter connected in parallel with the adjusting unit between the wire and the electric storage unit, based on (i) the voltage or SOC of the electric storage unit, (ii) potential of the wire or voltage applied to the wire, and (iii) potential of the one end of the electric storage unit or voltage applied to the one end of the electric storage unit.

15. A control system comprising:
the control device according to claim 1, and
the adjusting unit.

16. An electric storage device comprising:
the control device according to claim 1, and
the electric storage unit.

17. An electric storage device comprising:
the control system according to claim 15, and
the electric storage unit.

18. A non-transitory computer-readable medium for storing instructions that, when executed by a processor, cause the processor to perform operations comprising:

controlling an adjusting unit that adjusts current flowing between an electric storage unit of an electric storage device configured such that the electric storage device can be connected in parallel with a distinct power supply device, and a wire that electrically connects the electric storage device and the distinct power supply device, wherein the adjusting unit comprises:
a first current adjusting unit
(i) one end of which is electrically connected to the wire, (ii) other end of which is electrically connected to the electric storage unit, and (iii) that adjusts at least magnitude of current flowing between the wire and the electric storage unit in a first direction; and a first bypass unit that is connected in parallel with the first current adjusting unit between the wire and the electric storage unit, wherein the first bypass unit allows passage of current flowing between the wire and the electric storage unit in a second direction and suppresses flow of current between the wire and the electric storage unit in the first direction via the first bypass unit, wherein the second direction is a direction opposite to the first direction;

wherein the controlling includes:
detecting (i) current flowing between the wire and the electric storage unit in the second direction or (ii) current flowing between the wire and the electric storage unit when the first current adjusting unit electrically disconnects the wire and the electric storage unit; and controlling operation of the first current adjusting unit based on (i) voltage or SOC of the electric storage unit and (ii) a detection result of the current detecting unit.

* * * * *